United States Patent
Yodawara et al.

(10) Patent No.: US 12,299,862 B2
(45) Date of Patent: May 13, 2025

(54) PERFORMANCE INFORMATION SERVER, CLIENT TERMINAL, WORK MACHINE, AND METHOD FOR ACQUIRING A REQUEST INCLUDING MODEL INFORMATION AND PRESENTING PERFORMANCE INFORMATION INCLUDING DEFORMATION IMAGE OF THE WORK MACHINE BASED ON THE MODEL INFORMATION

(71) Applicant: TADANO LTD., Kagawa (JP)

(72) Inventors: Hideki Yodawara, Kagawa (JP); Toshihisa Aoki, Kagawa (JP); Shozo Hirata, Kagawa (JP); Shunsuke Ueno, Kagawa (JP)

(73) Assignee: TADANO LTD., Kagawa (JP)

( * ) Notice: Subject to any disclaimer, the term of this patent is extended or adjusted under 35 U.S.C. 154(b) by 684 days.

(21) Appl. No.: 17/263,821

(22) PCT Filed: Aug. 2, 2019

(86) PCT No.: PCT/JP2019/030589
§ 371 (c)(1),
(2) Date: Jan. 27, 2021

(87) PCT Pub. No.: WO2020/027334
PCT Pub. Date: Feb. 6, 2020

(65) Prior Publication Data
US 2021/0233230 A1     Jul. 29, 2021

(30) Foreign Application Priority Data
Aug. 2, 2018 (JP) ................................ 2018-146183

(51) Int. Cl.
*G06T 7/00* (2017.01)
*G05B 19/404* (2006.01)
(Continued)

(52) U.S. Cl.
CPC .......... *G06T 7/0004* (2013.01); *G05B 19/404* (2013.01); *G05B 19/406* (2013.01); *G05B 19/41* (2013.01); *G06T 2207/30164* (2013.01)

(58) Field of Classification Search
CPC ........ G06T 7/0004; G06T 2207/30164; G05B 19/404; G05B 19/406; G05B 19/41
See application file for complete search history.

(56) References Cited

U.S. PATENT DOCUMENTS 10,155,198 B2    12/2018    Omori et al.
2002/0013712 A1   1/2002    Nishiyama
(Continued)

FOREIGN PATENT DOCUMENTS

CN    108121849 A  *  6/2018
JP    2001-351029 A   12/2001
(Continued)

OTHER PUBLICATIONS

CN 108121849 A : Machine Translation (Year: 2018).*
Feb. 22, 2022, European Search Report issued for related EP Application No. 19845465.4.

*Primary Examiner* — Hwa Andrew Lee
(74) *Attorney, Agent, or Firm* — Paratus Law Group, PLLC

(57) ABSTRACT

A performance information server comprises: a request acquisition unit that acquires a request including machine-type information for a work machine, and a performance information request to indicate performance information for the work machine; a storage unit that stores specification data for the work machine in association with the type of the work machine; a control unit that acquires the machine type information included in the request and the performance information for the work machine, on the basis of the specification data corresponding to the machine type infor-
(Continued)

mation; and a response presentation unit that presents a response including the performance information acquired by the control unit.

17 Claims, 46 Drawing Sheets

(51) Int. Cl.
*G05B 19/406* (2006.01)
*G05B 19/41* (2006.01)

(56) References Cited

U.S. PATENT DOCUMENTS

2002/0059320 A1 5/2002 Tamaru
2021/0221654 A1* 7/2021 Yodawara ............... B66C 13/48

FOREIGN PATENT DOCUMENTS

| JP | 2002005946 A | * | 1/2002 |
| JP | 2006-318112 A | | 11/2006 |
| JP | 2016-117543 A | | 6/2016 |

* cited by examiner

| OUTRIGGER MAXIMUM OVERHANG (6.6m) | | | | |
|---|---|---|---|---|
| BOOM LENGTH / OPERATING RADIUS | 9.35m | 16.4m | 23.45m | 30.5m |
| 2.5m | 25.0t | 18.0t | 12.5t | |
| 3.0m | 25.0t | 18.0t | 12.5t | |
| 3.5m | 25.0t | 18.0t | 12.5t | 8.0t |
| 4.0m | 23.5t | 18.0t | 12.5t | 8.0t |
| 4.5m | 21.5t | 18.0t | 12.5t | 8.0t |
| 5.0m | 19.6t | 18.0t | 12.5t | 8.0t |
| 5.5m | 17.8t | 17.0t | 12.5t | 8.0t |
| 6.0m | 16.3t | 16.0t | 12.5t | 8.0t |
| 6.5m | 15.1t | 15.0t | 12.25t | 8.0t |
| 7.0m | | 14.0t | 11.5t | 8.0t |
| 8.0m | | 11.4t | 10.2t | 8.0t |
| 9.0m | | 9.3t | 9.0t | 8.0t |
| 10.0m | | 7.8t | 7.6t | 7.15t |
| 11.0m | | 6.5t | 6.65t | 6.4t |

FIG. 7D

| CRANE SELECTION FILTER | | UNIT SELECTION |
|---|---|---|
| SIMPLE / DETAILS | | ● METRIC SYSTEM |
| | | ○ IMPERIAL SYSTEM |

| | |
|---|---|
| CRANE TYPE | TYPE A ▼ |
| CRANE MANUFACTURER | TYPE A |
| JIB TYPE | TYPE B |
| | TYPE C |
| MAXIMUM LIFTING WEIGHT | TYPE D |
| | TYPE E |
| MAXIMUM LIFT ABOVE GROUND LEVEL | TYPE F |
| | TYPE G |
| MAXIMUM OPERATING RADIUS | |
| MAXIMUM BOOM LENGTH | ▼ |
| COUNTERWEIGHT | ▼ |
| HOOK | ▼ |
| REMARKS | |

FIG. 7E

| CRANE SELECTION FILTER | | UNIT SELECTION |
|---|---|---|
| SIMPLE / DETAILS | | ● METRIC SYSTEM |
| | | ○ IMPERIAL SYSTEM |

| | |
|---|---|
| CRANE TYPE | TYPE A ▼ |
| CRANE MANUFACTURER | MANUFACTURER A ▼ |
| JIB TYPE | MANUFACTURER A |
| | MANUFACTURER B |
| MAXIMUM LIFTING WEIGHT | MANUFACTURER C |
| | MANUFACTURER D |
| MAXIMUM LIFT ABOVE GROUND LEVEL | MANUFACTURER E |
| | MANUFACTURER F |
| MAXIMUM OPERATING RADIUS | MANUFACTURER G |
| MAXIMUM BOOM LENGTH | ▼ |
| COUNTERWEIGHT | ▼ |
| HOOK | ▼ |
| REMARKS | |

PLACED CRANE LIST
AA-BBBB ▼

LIFTING MEMBER SELECTION

CRANE ADJUSTMENT

| | | | |
|---|---|---|---|
| MAIN BODY | —————46a●————— | 20 ⇕ | DEGREES |
| ROTATING TABLE | ———46b———●————— | 40 ⇕ | DEGREES |
| BOOM LENGTH | ——46c●——————— | 20 ⇕ | m |
| BOOM ANGLE | ——————46d——●—— | 60 ⇕ | DEGREES |

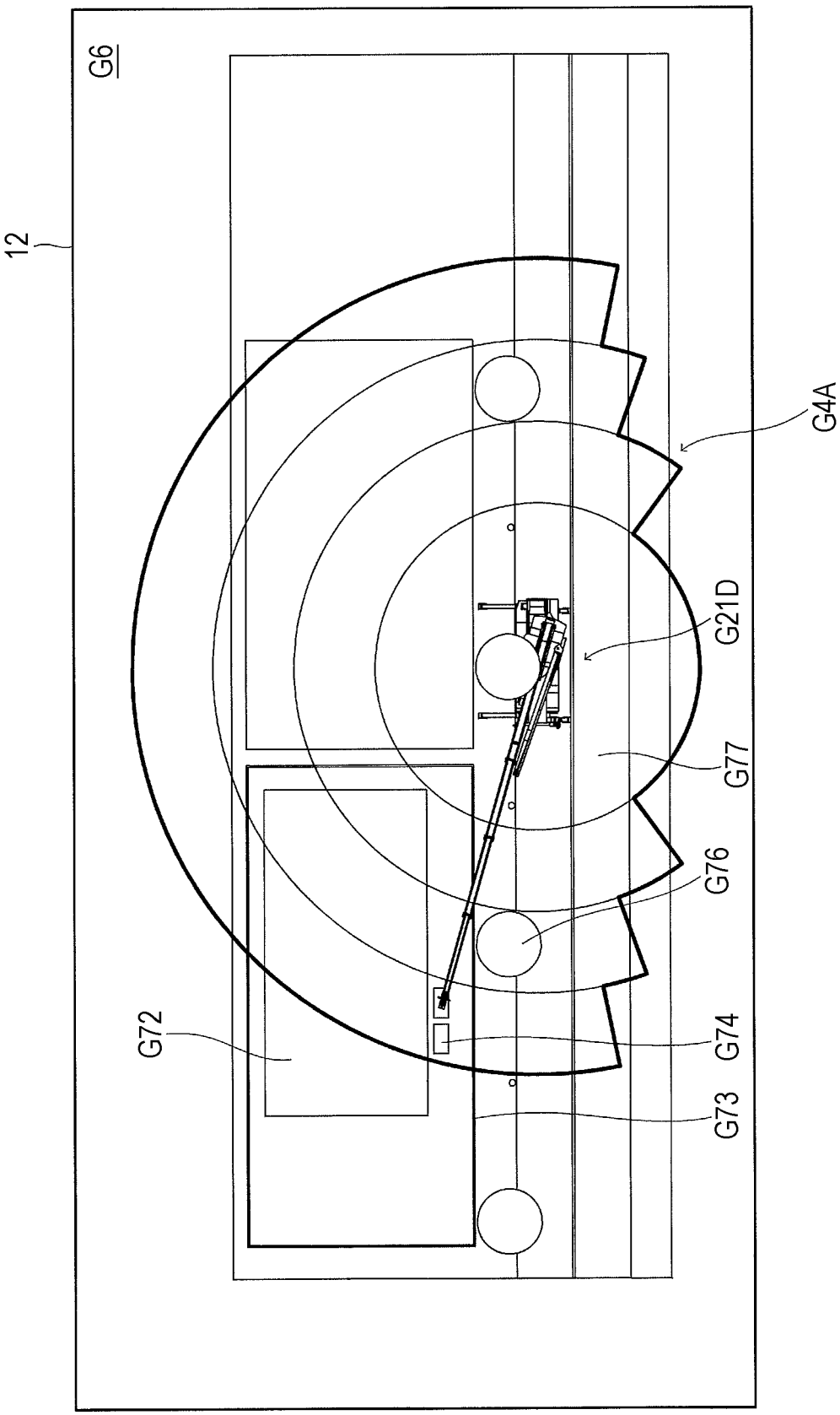

FIG. 23

WORK PLAN RELATED TO MOVEMENT ROUTE R2

1. SLING IN STATE OF TURNING ANGLE 180° AND HOIST ANGLE 60°
2. HOISTING 0m → 20m, LOAD FACTOR 85%, AND OPERATING RADIUS 25m
3. HOIST ANGLE 60° → 75°, LOAD FACTOR 70%, OPERATING RADIUS 15m
4. TURNING ANGLE 180° → 90°, LOAD FACTOR 70%, OPERATING RADIUS 15m
5. HOIST ANGLE 75° → 65°, LOAD FACTOR 80%, OPERATING RADIUS 20m
6. AFTER LOWERING 30m → 25m, UNSLINGING

PERFORMANCE INFORMATION SERVER, CLIENT TERMINAL, WORK MACHINE, AND METHOD FOR ACQUIRING A REQUEST INCLUDING MODEL INFORMATION AND PRESENTING PERFORMANCE INFORMATION INCLUDING DEFORMATION IMAGE OF THE WORK MACHINE BASED ON THE MODEL INFORMATION

CROSS REFERENCE TO PRIOR APPLICATION

This application is a National Stage Patent Application of PCT International Patent Application No. PCT/JP2019/030589 (filed on Aug. 2, 2019) under 35 U.S.C. § 371, which claims priority to Japanese Patent Application No. 2018-146183 (filed on Aug. 2, 2018), which are all hereby incorporated by reference in their entirety.

TECHNICAL FIELD

The present invention relates to a performance information server, a client terminal, a work machine, a method for acquiring performance information, and a method for providing performance information.

BACKGROUND ART

Recently, in the construction industry, applications such as 3D-computer aided design (CAD) and building information modeling (BIM) have been used for building design and work planning (See Patent Literature 1). Such an application generates a 3D image of a building or a work machine and displays it on a display unit. In particular, BIM is also used at the time of creating a work plan using, for example, a crane, a bulldozer, and a truck.

When creating a work plan, the BIM operator refers to a rated total load table provided by the work machine manufacturer in order to obtain performance information (e.g., total load rating) of the work machine (e.g., crane) in a desired work attitude, for example. However, there is a disadvantage that it is cumbersome for the worker to refer to the rated total load table when creating a work plan, and the work efficiency is poor.

Patent Literature 2 discloses a mobile crane having a function of calculating performance information. Such a mobile crane uses an arithmetic expression stored in a storage unit when calculating performance information. The arithmetic expression is sometimes updated to an arithmetic expression corresponding to the latest performance information. Such update of the arithmetic expression is performed by, for example, a maintenance worker for each work machine, but there is a possibility that all the work machines are not updated with the latest arithmetic expression. When the arithmetic expression is different for each work machine, the performance information obtained by the calculation of the work machine may be different even between work machines of the same type disposed in the same work site. Therefore, there is a need for a technology for efficiently obtaining the same performance information between the same type of work machines disposed in the same work site.

CITATION LIST

Patent Literature

Patent Literature 1: JP 2006-318112 A
Patent Literature 2: JP 2016-117543 A

SUMMARY OF THE INVENTION

Problems to be Solved by the Invention

The present invention has been made in view of the above circumstances, and an object thereof is to provide a technology capable of efficiently obtaining performance information of a work machine.

Solutions to Problems

One aspect of a performance information server according to the present invention includes: a request acquisition unit that acquires a request including model information of a work machine and a performance information request that specifies performance information of the work machine; a storage unit that stores specification data of the work machine in association with a model of a work machine; a control unit that acquires performance information of the work machine on the basis of the model information included in the request and the specification data corresponding to the model information; and a response presentation unit that presents a response including the performance information acquired by the control unit.

One aspect of a client terminal according to the present invention is a client terminal connectable to the performance information server described above, and includes: an input unit that receives selection of a work machine to be displayed on a display unit from among a plurality of work machines; a storage unit that stores an address table in which model information of the plurality of work machines and the performance information server corresponding to the model information are associated; and a control unit that selects the performance information server corresponding to the work machine having been selected with reference to the address table, sends a request including a performance information request specifying model information of the work machine having been selected and performance information of the work machine to the performance information server having been selected, and receives a response including the performance information specified by the performance information request from the performance information server.

One aspect of a work machine according to the present invention is a work machine connectable to the performance information server described above, and includes: a storage unit that stores an address table in which model information of the work machine and the performance information server corresponding to the model information are associated; and a control unit that selects the performance information server corresponding to the work machine having been selected with reference to the address table, sends a request including a performance information request specifying model information of the work machine having been selected and performance information of the work machine to the performance information server having been selected, and receives a response including the performance information specified by the performance information request from the performance information server.

One aspect of a method for acquiring performance information according to the present invention is a method for acquiring performance information executed in a terminal connectable to the performance information server described above, in which the terminal has an address table in which model information of a plurality of work machines and the performance information server corresponding to the model information are associated, and the method for acquiring performance information includes a step of receiving selection of a work machine to be displayed on a display unit; a step of selecting the performance information server corresponding to the work machine having been selected with reference to the address table; a step of transmitting a request including a performance information request specifying model information of the work machine having been selected and performance information of the work machine to the performance information server having been selected; and a step of receiving a response including the performance information specified by the performance information request included in the request from the performance information server.

One aspect of a method for providing performance information according to the present invention is a method for providing performance information executed in the performance information server, in which the performance information server stores specification data associated with a model of a work machine, and the method for providing performance information includes: a step of acquiring a request including a performance information request specifying model information of the work machine and performance information of the work machine from a work machine or a terminal on which an image generation application operates; a step of executing a calculation of the performance information having been specified by the performance information request on the basis of the model information and the performance information request acquired from the request and the specification data corresponding to the model information; and a step of presenting, to the work machine or the terminal, a response including the performance information.

Effects of the Invention

According to the present invention, it is possible to efficiently obtain performance information of a work machine.

BRIEF DESCRIPTION OF DRAWINGS

FIG. 5 is a view presenting an example of a performance data table.

FIG. 7D is a view illustrating an example of the crane selection screen.

FIG. 7E is a view illustrating an example of the crane selection screen.

FIG. 7F is a view illustrating an example of a crane adjustment screen.

FIG. 16E is a view illustrating an example of an image displayed on the display unit.

FIG. 23 is a view illustrating an example of a work plan.

DESCRIPTION OF EMBODIMENTS

Figure 1:
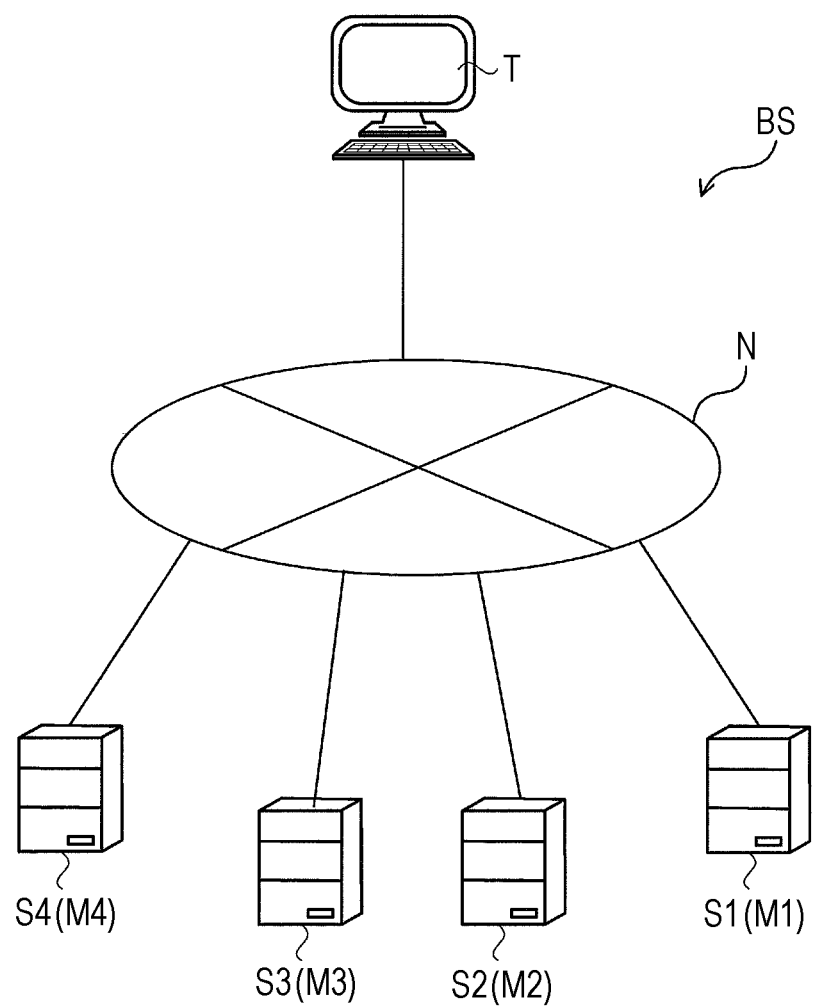
FIG. 1 is a diagram illustrating a configuration of a BIM assistance system according to a first embodiment.

Embodiments of the present invention will be described in detail below with reference to the drawings. The present embodiment will be described below with reference to the drawings. Throughout the present description, identical elements are given the identical reference numerals unless otherwise indicated. The matters described below together with the accompanying drawings are intended to illustrate exemplary embodiments and not intended to illustrate only one embodiment. For example, when an order of the operation is illustrated in an embodiment, the order of the operation may be changed as appropriate to an extent that the overall operation is consistent.

First Embodiment

Figure 2:
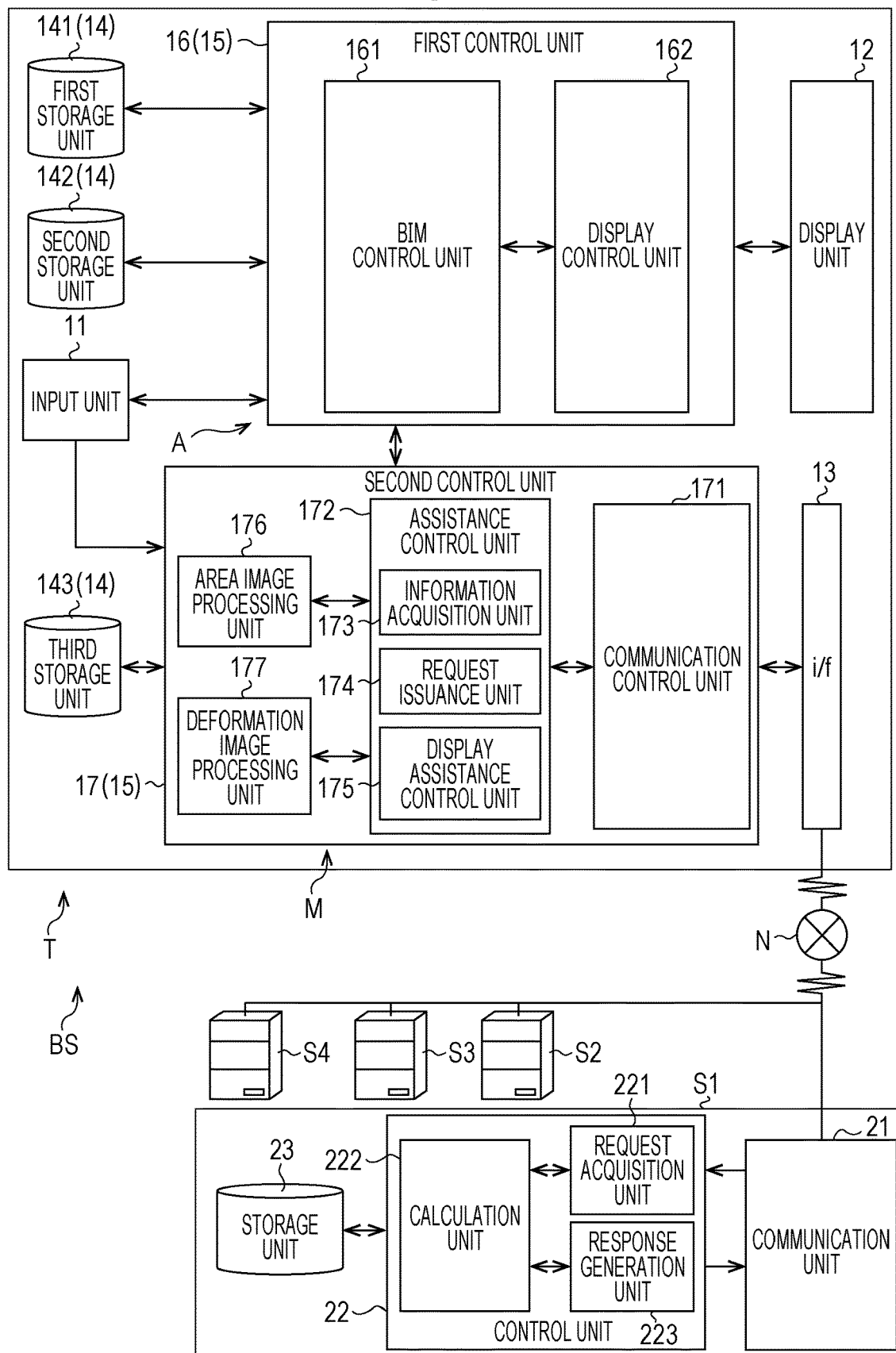
FIG. 2 is a functional block diagram of the BIM assistance system according to the first embodiment.

FIG. 1 is a diagram illustrating the configuration of a BIM assistance system BS according to the first embodiment. FIG. 2 is a block diagram illustrating the configuration of the BIM assistance system BS according to the first embodiment.

<Outline of BIM Assistance System>

The system configuration of the BIM assistance system BS according to the present embodiment will be described below with reference to FIGS. 1 and 2. The BIM assistance system BS corresponds to an example of a performance information calculation system.

The BIM assistance system BS has a client terminal T and a plurality of servers S1 to S4 (also referred to as performance information calculation servers) as a hardware configuration. Note that the BIM assistance system BS of the present embodiment is a client-server type BIM assistance system in which the client terminal T and the servers S1 to S4 are connected via a network N. The number of client terminals and servers in the BIM assistance system BS is not limited to that in the illustrated case.

A BIM application A is installed in the client terminal T. The BIM application A corresponds to an example of an image generation application and an image generation module. The BIM application A has an image generation application assistance module M (hereinafter simply referred to as the "assistance module M") as an add-in. The client terminal T in which the assistance module M is incorporated corresponds to an example of a display assistance device. Note that an application in which the BIM application A and the assistance module M are combined is sometimes referred to as an image generation application.

The BIM application A is software specialized for BIM. The BIM application A may be various software for BIM that can plan, design, build, and/or manage construction (buildings, infrastructure, and the like). Note that the image generation application according to the present invention is not limited to software specialized for BIM, and may be, for example, construction information modeling (CIM), and 2D-CAD and 3D-CAD for design of buildings. The image generation application may be a virtual reality (VR) simulator that simulates a work machine such as a crane in a virtual space. Note that CIM may be considered to be included in BIM.

The assistance module M corresponds to an example of an operation assistance module, and operates in cooperation with the BIM application A that generates an image of a work machine to be displayed on a display unit 12. Such the assistance module M acquires performance information of the work machine displayed on the display unit 12 from the servers S1 to S4 by using a request-response type communication protocol (e.g., HTTPS protocol).

Each of the servers S1 to S4 corresponds to an example of a performance information server, and has a function of acquiring performance information of a work machine on the basis of a request acquired from the assistance module M. The servers S1 to S4 present a response including acquired performance information to the assistance module M whose request has been received.

The above-described performance information includes, for example, information on the rated total load, information on the moment load factor, information on the maximum lowering angle of the boom, information on the operating radius, deformation image information of the boom, deformation image information of the jib, information on the work area image of the work machine, information on the reaction force of the outrigger jack, attitude information of the work machine, information on whether or not work is possible in consideration of the ground strength, and information on the movement route of the hoisting load (see column C in Table 2 described later). The performance information includes a determination result of whether or not the work machine can perform a desired work. When the work machine is a crane, the performance information includes information on the movement route of the hoisting load.

The assistance module M acquires an attitude condition defining the attitude of the work machine in the image of the work machine displayed on the display unit 12. Hereinafter, the image of the work machine is simply referred to as a "work machine image". The attitude of the work machine is simply referred to as an "attitude of the work machine image". Furthermore, an attitude condition defining the attitude of the work machine image is simply referred to as an "attitude condition of the work machine image".

The assistance module M transmits a request including an attitude condition, a performance information request for specifying performance information of the work machine, and model information of the work machine to the specified server from the servers S1 to S4.

In this case, the assistance module M may specify a server to transmit a request by including server specifying information specifying a server corresponding to the work machine image in the request. The server specifying information is the Uniform Resource Identifier (URI) of the server, for example. The assistance module M receives, from the server, a response including performance information specified by the performance information request. Then, the assistance module M reflects the received performance information on the image displayed on the display unit 12 or the work machine image displayed on the display unit 12.

On the other hand, the servers S1 to S4 acquire, from the client terminal T having the assistance module M described above, a request including an attitude condition of the work machine image, a performance information request specifying the performance information of the work machine, and a request including model information. Such the servers S1 to S4 store in advance the calculation expression used for calculation of the performance information and the specification data of the work machine.

After acquiring the request, the servers S1 to S4 execute the calculation of the performance information specified by the performance information request on the basis of the attitude condition, the performance information request, and the model information that are included in the request, and the stored calculation expression and specification data. Then, the servers S1 to S4 present the response including the result of the calculation to the client terminal T.

The calculations performed by such the servers S1 to S4 are calculations having the same accuracy as that of the calculations performed by the calculators included in the actual work machine (e.g., a crane). Since an operator of the BIM application A (hereinafter simply referred to as an "operator") can obtain the same performance information as that of the actual work machine in the BIM application A, a detailed construction plan in consideration of the work machine can be efficiently performed.

<Configuration Example of Client Terminal>

Figure 3:
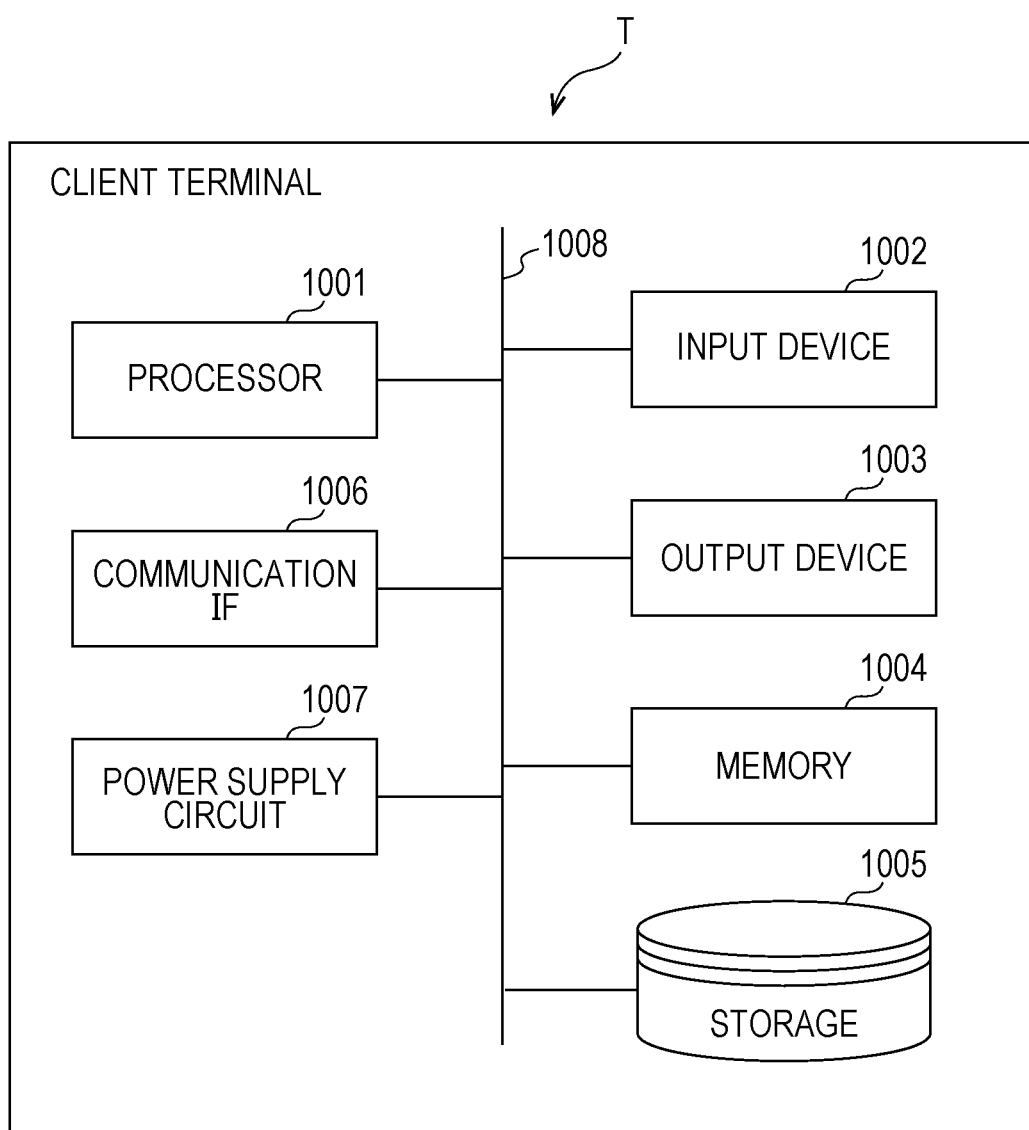
FIG. 3 is a block diagram illustrating an example of a hardware configuration of a client terminal according to the first embodiment.

Next, a configuration example of the client terminal T will be described. FIG. 2 is a functional block diagram illustrating an example of the configuration of the BIM assistance system BS according to the first embodiment. FIG. 3 is a block diagram illustrating an example of the hardware configuration of a client terminal T according to the first embodiment. The client terminal T corresponds to an example of a terminal in which the BIM application is incorporated.

(Functional Configuration Example of Client Terminal)

The client terminal T includes an input unit 11, the display unit 12, a communication unit 13, a storage unit 14, and a control unit 15.

(Input Unit)

The input unit 11 receives input such as information having been input from the operator. The input information by the operator is received by the input unit 11 and sent to the control unit 15. An example of the information received by the input unit 11 will be described below.

The input unit 11 receives input of a performance information request. The performance information request includes information specifying performance information of the work machine acquired by the client terminal T from the servers S1 to S4. In other words, the performance information request includes information specifying performance information of the work machine calculated by the servers S1 to S4 and presented to the client terminal T. Note that the performance information of the work machine specified by the performance information request means performance information of the work machine in the image displayed on the display unit 12. Hereinafter, the work machine in the image displayed on the display unit 12 is also referred to as a "displayed work machine".

The input unit 11 receives an instruction for displaying an image of a building on the display unit 12. Hereinafter, an image of a building is simply referred to as a "building image". An instruction for displaying on the display unit 12 is simply referred to as a "display instruction of a building image".

The display instruction of a building image includes, for example, information specifying the type of the building image. The display instruction of a building image includes information on the size of the building image and/or information on the disposition of the building image.

The input unit 11 receives an instruction for displaying a work machine image on the display unit 12. Hereinafter, an instruction for displaying a work machine image on the display unit 12 will be simply referred to as a "display instruction of a work machine image".

The display instruction of a work machine image includes, for example, information for specifying the model of the work machine to be displayed on the display unit 12. Hereinafter, the information for specifying the model of the work machine is simply referred to as "model information".

The display instruction of a work machine image may include information on the disposition of the work machine image. Information on the disposition of the work machine image includes, for example, coordinates and/or directions (orientation).

The model information includes at least one of a work machine ID (type, specification number, and/or serial number) and a manufacturer name.

The input unit 11 receives an operation of the image displayed on the display unit 12. Hereinafter, the operation of the image displayed on the display unit 12 will be simply referred to as an "image operation".

The image operation includes an operation regarding the building image and/or the work machine image displayed on the display unit 12. Hereinafter, the building image and/or the work machine image displayed on the display unit 12 is sometimes simply referred to as a "display image". The building image in the display image is also simply referred to as a "display building image". The work machine image in the display image is also simply referred to as a "display work machine image".

The image operation includes at least one of an operation of changing the attitude of the display building image, an operation of changing the size (enlargement operation or reduction operation) of the displayed building image, and an operation of changing the disposition of the displayed building image. The image operation includes at least one of an operation of changing the attitude of the display work machine image, an operation of changing the size (enlargement operation or reduction operation) of the displayed work machine image, and an operation of changing the disposition of the displayed work machine image.

The operator performs an image operation by inputting a numerical value on a setting screen displayed on the display unit 12. The operator may perform the image operation by dragging the display building image or the display work machine image.

In the setting screen, the operator changes the attitude of the display work machine image by changing the attitude conditions (specific example will be described later) in the attribute information of the display work machine image.

Alternatively, the operator may change the attitude of the display work machine image by dragging the display work machine image.

In the setting screen, the operator changes the work state of the display work machine by selecting whether or not an attachment (e.g., a crane jib or a man basket) is used (use state or non-use state) in the display work machine. Such an operation corresponds to an example of a change of work state information in attribute information of the display work machine image.

(Display Unit)

The display unit 12 displays information and the like. The information displayed on the display unit 12 may be information stored in the storage unit 14 or information generated by the control unit 15.

Note that the input unit 11 and the display unit 12 may be configured by individual devices or may be integrated into a device capable of inputting and outputting information (display) in parallel, such as a touch screen display.

(Communication Unit)

The communication unit 13 communicates with the servers S1 to S4 via the network N. For this purpose, the communication unit 13 includes a transmission unit and a reception unit (not illustrated) of information. Communication with the servers S1 to S4 is controlled by the control unit 15, for example.

The communication unit 13 transmits a request described later toward the servers S1 to S4, and receives a response to this request from the servers S1 to S4. The communication unit 13 sends the acquired response to the control unit 15 (specifically, an assistance control unit 172 of a second control unit 17).

(Storage Unit)

The storage unit 14 has a first storage unit 141, a second storage unit 142, a third storage unit 143, and the like. Note that the storage units 141 to 143 are configured by one piece of hardware (main storage device). However, the storage units 141 to 143 may be configured by a plurality of pieces of hardware.

The first storage unit 141 is a building image database and stores information on building images. Information on a three-dimensional image of a member constituting a building is stored in the first storage unit 141. Hereinafter, a three-dimensional image of a member constituting a building will be simply referred to as a "building image". Members constituting a building include at least one of a column, a window, a pipe, a door, a floor, a ceiling, and a wall.

Attribute information associated with each image together with the building image is stored in the first storage unit 141. The attribute information of the building image may include at least one of a member ID (model number, serial number, or the like), type, member name, manufacturer name, standard, dimension, and material.

In addition to the building image, the first storage unit 141 may store information on an image of a component of a work site such as a building site or a construction site. Hereinafter, an image of a component of a work site will be simply referred to as a "work site component image". The work site component image may include an image of at least one of, for example, a road (sidewalk or driveway), tree, power line, power pole, car, and person.

The second storage unit 142 is a work machine image database and stores information on work machine images. For example, information on a three-dimensional image of a work machine and/or a member constituting a work machine is stored in the second storage unit 142. Hereinafter, a two-dimensional image or a three-dimensional image of a member constituting a work machine will be simply referred to as a "work machine image".

Work machine images include a work machine image of at least one of a crane, bulldozer, hydraulic excavator, concrete pump vehicle, aerial work vehicle, dump truck, trailer, and a lifter. The work machine image may include a three-dimensional image of the component of each of these work machines.

When the work machine is a crane, the crane includes a mobile crane (rough terrain crane or all terrain crane) and/or a tower crane. The component of the crane includes at least one of a boom, jib, outrigger, vehicle, and hook.

Attribute information associated with each work machine image together with the work machine image may be stored in the second storage unit 142.

The attribute information of the work machine image includes model information of the work machine in the work machine image and/or the attitude condition of the work machine image. The attribute information of the work machine image may include information on the work state of the work machine. Hereinafter, the information on the work state of the work machine will be simply referred to as "work state information". The attribute information of the work machine image may include information on a member constituting the work machine. Hereinafter, the information on the member constituting the work machine will be simply referred to as "component information".

The attitude condition includes at least one of, for example, the hoist angle of the boom, the length of the boom, the turn angle of the boom, the hoist angle of the jib, the length of the jib, and the overhang width of the outrigger.

The work state information includes, for example, information specifying at least one work state of the boom work state, the jib work state, the single top work state, the outrigger work state, the on-tire work state, and the hook work state.

The component information includes information on the type of the members constituting the work machine. The members constituting the work machine are, for example, a boom, a jib, a hook, and a wire. Hereinafter, the information on the type of the member constituting the work machine will be simply referred to as "information on type of component".

The third storage unit 143 stores information specifying the server to send a request. The information specifying the server is also referred to as server specifying information. The server specifying information is stored in the third storage unit 143 in association with the work machine image.

The third storage unit 143 stores the server specifying information in a format capable of specifying the server corresponding to the work machine image from the model information in the attribute information of the work machine image.

Specifically, the third storage unit 143 stores an address table in which the model information included in the attribute information of the plurality of work machine images and the server (server specifying information) corresponding to each model information are associated.

The control unit 15 controls the operation of each of the elements 11 to 14 described above to control the overall operation of the client terminal T. In terms of the function of the BIM assistance system BS, the control unit 15 includes a first control unit 16 and a second control unit 17.

(First Control Unit)

The first control unit 16 includes a BIM control unit 161 and a display control unit 162. The first control unit 16 implements the function of the BIM application A. The first control unit 16 corresponds to an example of an operation control unit of the BIM application A that controls the behavior of the work machine image displayed on the display unit 12 (described later).

(BIM Control Unit)

The BIM control unit 161 acquires information on the display instruction of the building image described above from the input unit 11. Then, the BIM control unit 161 acquires, from the storage unit 14, information on the building image specified by the information on the display instruction of the building image. The BIM control unit 161 sends acquired information on the building image to the display control unit 162 described later.

The BIM control unit 161 acquires information on the display instruction of the work machine image described above from the input unit 11. Then, the BIM control unit 161 acquires, from the storage unit 14, information on the work machine image specified by the model information included in the acquired display instruction of the work machine image. The BIM control unit 161 sends the acquired information on the work machine image to the display control unit 162 described later.

The BIM control unit 161 acquires information on the image operation described above from the input unit 11. The BIM control unit 161 reflects, on the display image, the acquired information on the image operation.

Specifically, the BIM control unit 161 reflects the acquired information on the image operation (e.g., coordinate, dimension, and/or attitude condition) on the display of the display unit 12 by reflecting the acquired information on the image operation on the attribute information of the display image (e.g., display work machine image).

(Display Control Unit)

The display control unit 162 converts the information on the building image acquired from the BIM control unit 161 into a display signal corresponding to the display unit 12 and outputs it, and causes the display unit 12 to display the building image.

The display control unit 162 converts the information on the work machine image received from the BIM control unit 161 into a display signal corresponding to the display unit 12 and outputs it, and causes the display unit 12 to display the work machine image.

(Second Control Unit)

The second control unit 17 has a communication control unit 171, an assistance control unit 172, an area image processing unit 176, a deformation image processing unit 177, and the like. The second control unit 17 implements the function of the assistance module M. The assistance control unit 172 implements the functions of an attitude condition acquisition unit, a performance information acquisition unit, and a drawing assistance unit.

(Communication Control Unit)

The communication control unit 171 controls communication between the client terminal T and the servers S1 to S4 via the communication unit 13.

(Assistance Control Unit)

In terms of the function of the assistance module M, the assistance control unit 172 has an information acquisition unit 173, a request issuance unit 174, a display assistance control unit 175, and the like. Some functions of the assistance control unit 172 implement the function of the performance information acquisition unit. A part of the assistance control unit 172 corresponds to an example of a performance information acquisition unit. The assistance control unit 172 corresponds to an example of an operation assistance unit. The assistance control unit 172 has a function as a response acquisition unit that receives a response including performance information from the server. Therefore, the assistance control unit 172 corresponds also to an example of a response acquisition unit.

(Information Acquisition Unit)

When having acquired a performance information request from the input unit 11, the information acquisition unit 173 acquires, from the BIM control unit 161, information (hereinafter referred to as "parameters") necessary for acquiring, from the servers S1 to S4, the performance information specified by the performance information request.

The parameters acquired by the information acquisition unit 173 constitute the parameters in a request generated by the request issuance unit 174 described later. Note that the parameters included in the request are presented in Table 1 below. The information acquisition unit 173 corresponds to an example of an attitude condition acquisition unit.

TABLE 1

| | Parameters |
|---|---|
| Model information | Serial number, model number, and specification number |
| Work state information | Boom work state |
| | Jib work state |
| | Single top work state |
| | Outrigger work state |
| | On-tire work state |
| | Hook work state |
| Attitude condition | Outrigger width, boom hoist angle, boom length, turn angle, jib hoist angle, and jib length |
| Component information | Information on boom (for example, type) |
| | Information on jib (for example, type) |
| | Information on hook (for example, type) |
| | Information on wire (for example, number of wire hooks) |
| | Information on counterweight (for example, weight) |
| Hoisting load information | Hoisting load value |
| Route information | Information indicating route |
| Other information | Unit |

In Table 1, the serial number, the model number, and the specification number correspond to an example of model information. In Table 1, the outrigger state and the boom/jib selection correspond to an example of the work machine state information. The boom/jib selection is to select one of the work state from, for example, the boom work state, the jib work state and the single top work state.

In Table 1, the outrigger width, the boom hoist angle, the boom length, the turn angle, the jib hoist angle, and the jib length correspond to an example of the attitude condition. The outrigger width may be set for each outrigger.

In Table 1, information on the boom (e.g., type of boom), information on the jib (e.g., type of jib), information on the hook (e.g., type of hook), and information on the wire (e.g., number of wire hooks) correspond to an example of the component information.

In Table 1, the units correspond to an example of other information. The route information includes, for example, a movement route of the hoisting load, a travel movement route of the work machine, and/or a movement route of the tip end portion of the boom.

Specifically, when having acquired a performance information request from the input unit 11, the information acquisition unit 173 acquires model information in the attribute information of the display work machine image from the BIM control unit 161.

When having acquired a performance information request from the input unit 11, the information acquisition unit 173 acquires, from the BIM control unit 161, work state information for specifying the work state of the work machine of the attribute information of the display work machine image.

When having acquired a performance information request from the input unit 11, the information acquisition unit 173 acquires, from the BIM control unit 161, an attitude condition corresponding to the acquired performance information request of the attribute information of the display work machine image.

When having acquired a performance information request from the input unit 11, the information acquisition unit 173 acquires, from the BIM control unit 161, component information that is information on the component of the work machine of the attribute information of the display work machine image.

The information acquisition unit 173 acquires, from the BIM control unit 161, information on the hoisting load hoisted by the work machine in the display work machine image. Hereinafter, the information on the hoisting load will be simply referred to as "lifting load information". The lifting load information corresponds to an example of hoisting load information.

The information acquisition unit 173 acquires, from the BIM control unit 161, route information of the hoisting load lifted by the work machine in the display work machine image. Hereinafter, the route information of the hoisting load will be simply referred to as "route information".

The information acquired by the information acquisition unit 173 as described above may be stored in the storage unit 14 in advance as attribute information of the work machine image, or may be information acquired from the servers S1 to S4. Note the a specific example of the information acquired by the information acquisition unit 173 will be presented in Table 2 described later and the operation description of the BIM assistance system BS described later.

Note the as an example of the method for acquiring parameters, the information acquisition unit 173 acquires, from the BIM control unit 161, only the parameters necessary for calculation of the performance information specified by the acquired performance information request of the parameters presented in Table 1.

As an example of the method for acquiring parameters, the information acquisition unit 173 acquires, from the BIM control unit 161, a predetermined type of parameter information of the parameters presented in Table 1 regardless of the performance information specified by the performance information request. The predetermined type of parameter information is all the information on the model information, the attitude condition, the work state information, and the component information in the attribute information, for example.

The information acquisition unit 173 sends the acquired information to the request issuance unit 174.

(Request Issuance Unit)

On the basis of the model information acquired from the information acquisition unit 173, the request issuance unit 174 acquires server specifying information for specifying the server corresponding to the model information from the third storage unit 143.

Specifically, the request issuance unit 174 acquires the server specifying information corresponding to the model information acquired from the information acquisition unit 173 with reference to the address table stored in the third storage unit 143.

Then, the request issuance unit 174 generates a request including the acquired server specifying information, performance information request, and parameter.

The request is in the form of request message of HTTPS protocol, for example. The HTTP method used in the request is the GET method, for example. The request issuance unit 174 sends the generated request to the communication control unit 171.

Expression 1 presents an example of a request. The request includes the URI, the performance information request, and the parameter, in order from the head. The parameter includes at least one of the model information, work state information, attitude condition, component information, hoisting load information, route information, and other information presented in Table 1 above. The parameter is only required to include at least a parameter necessary for calculation of the performance information to be specified in the performance information request.

Specifically, in Expression 1, "https:// . . . /bimapi/v1.0/Simulation/" corresponds to an example of a URI. In Expression 1, "RatedWeight" corresponds to an example of a performance information request. In Expression 1, "Model={model}& BoomState={boom jib type}&BoomLength={boom length}& . . . " corresponds to an example of a parameter. Note that "model", "boom jib type", and "boom length" in Expression 1 may be replaced with a symbol, a character string, or a numerical value as in Expression 2.

[Expression 1]

$$\text{http:// . . . /bimapi/v1.0/Simulation/} \\ \text{RatedWeight?Model=\{model\}\&Boom} \\ \text{State=\{boom jib type\}\&BoomLength=\{boom} \\ \text{length\}\& . . .} \quad (1)$$

[Expression 2]

$$\text{http:// . . . /bimapi/v1.0/Simulation/} \\ \text{RatedWeight?Model=GR-750XL-} \\ \text{2\&BoomState=B\&BoomLength=23.45\& . . .} \quad (2)$$

(Display Assistance Control Unit)

The display assistance control unit 175 analyzes the response acquired from the communication control unit 171 and reflects the calculation results of the servers S1 to S4 included in the response on the display of the display unit 12. The display assistance control unit 175 sends the calculation results of the servers S1 to S4 included in the response to the BIM control unit 161, and reflects them on the image to be displayed on the display unit 12 or the image having been displayed on the display unit 12. The display assistance control unit 175 corresponds to an example of a response acquisition unit and a drawing assistance unit.

The display assistance control unit 175 may reflect the calculation results on the display of the display unit 12 by updating the attribute information of the display work machine image on the basis of the calculation results of the servers S1 to S4 included in the response.

When the response includes information on the area image, the display assistance control unit 175 sends the information on the area image to the area image processing unit 176.

The display assistance control unit 175 sends the area image acquired from the area image processing unit 176 to the BIM control unit 161, and reflects the area image on the display of the display unit 12. Note that the area image is an image on which the calculation results (i.e., information on the area image) of the servers S1 to S4 included in the response are reflected.

When the response includes information on a deformation image, the display assistance control unit 175 sends the information on the deformation image to the deformation image processing unit 177.

The display assistance control unit 175 sends the deformation image acquired from the deformation image processing unit 177 to the BIM control unit 161, and reflects the deformation image on the display of the display unit 12. Noted that the deformation image may be regarded as an image on which the calculation results (i.e., information on the deformation image) of the servers S1 to S4 included in the response are reflected.

The processing of the display assistance control unit 175 is sometimes referred to as display assistance processing. A specific example of the display assistance processing will be presented in the operation description of the BIM assistance system BS.

(Area Image Processing Unit)

The area image processing unit 176 generates an area image on the basis of information on the area image acquired from the display assistance control unit 175. Such the area image processing unit 176 corresponds to an example of an area image generation unit. Then, the area image processing unit 176 sends the generated area image to the display assistance control unit 175. The area image processing unit 176 may be regarded as an example of a deformation image generation unit.

The area image is an image in which the range (hereinafter referred to as a "movable area of the hook") in which the hook of the work machine can be moved in the attitude of the work machine displayed on the display unit 12 is illustrated in a two-dimensional and/or three-dimensional manner. That is, it can be regarded that the work machine includes the hook.

When the work machine displayed on the display unit 12 is lifting the hoisting load, the lifting tool and the hoisting load may be regarded to be included in the work machine. In this case, the area image is an image in which the range (hereinafter referred to as a "movable area of the lifting tool") in which the lifting tool can be moved and/or the range (hereinafter referred to as a "movable area of the hoisting load") in which the hoisting load can be moved are illustrated in a two-dimensional and/or three-dimensional manner. A specific example of the area image will be presented in the operation description of the BIM assistance system BS. Note that the area image generated by the area image processing unit 176 may be regarded as an example of a deformation image related to the work machine image.

(Deformation Image Processing Unit)

The deformation image processing unit 177 generates a deformation image on the basis of information on the deformation image acquired from the display assistance control unit 175. The deformation image processing unit 177 corresponds to an example of a deformation image generation unit. Then, the deformation image processing unit 177 sends the generated deformation image to the display assistance control unit 175. A specific example of the deformation image will be presented in the operation description of the BIM assistance system BS. Note that the deformation image to be generated by the deformation image processing unit 177 may be regarded as an example of a deformation image related to the work machine image.

Note that the BIM application A and the assistance module M incorporated in the client terminal T as described above may be incorporated in a cloud server (not illustrated) and executed. The cloud server is connected to the servers S1 to S4 via the network N.

The cloud server is connected via the network N to a client terminal (not illustrated) in which a viewer is incorporated. The viewer is an application that displays an image generated by the BIM application A executed on the cloud server.

The operator operates the image generated by the BIM application A via the viewer of the client terminal. Such a system corresponds to an example of a cloud type BIM assistance system. In the cloud type BIM assistance system, a cloud server corresponds to an example of a terminal in which an image generation application is incorporated.

(Hardware Configuration Example of Client Terminal)

As illustrated in FIG. 3, the client terminal T is a desktop computer (personal computer, workstation, and the like), a laptop computer (personal computer, workstation, and the like), a tablet terminal, a mobile device such as a smartphone, or the like.

In terms of the hardware configuration, the client terminal T includes a processor 1001, an input device 1002, an output device 1003, a memory 1004, and a storage 1005 that are included in a general desktop computer or laptop computer.

The client terminal T includes a communication interface (IF) 1006 and a power supply circuit 1007. These elements 1001 to 1007 may be connected by a bus 1008, for example.

The processor 1001 controls the operation of the client terminal T. The processor 1001 is an example of a circuit or device including a calculation ability. For the processor 1001, at least one of, for example, a central processing unit (CPU), a micro processing unit (MPU), and a graphics processing unit (GPU) may be used.

The input device 1002 may include the input unit 11 presented in FIG. 2. The input device 1002 may include at least one device used to input information to the client terminal T, such as a keyboard, touch screen, and mouse. Through the input device 1002, information may be input to the processor 1001.

The output device 1003 may include the display unit 12 presented in FIG. 2. Specifically, the output device 1003 may include a display (or monitor) corresponding to the display unit 12. The display may be a touch screen type display. The touch screen type display may be regarded as corresponding to both the input device 1002 and the output device 1003.

The memory 1004 stores, for example, a program executed by the processor 1001 and data or information processed in response to the execution of the program. The memory 1004 includes a random access memory (RAM) and a read only memory (ROM). The RAM may be used for the work memory of the processor 1001. The "program" is referred to as "software" or "application".

The storage 1005 stores, for example, a program executed by the processor 1001 and data or information processed in response to the execution of the program. The storage 1005 stores information on the BIM assistance system BS such as information on the building image described earlier, information on the work machine image, and the server specifying information.

The storage 1005 includes a semiconductor drive device such as a hard disk drive (HDD) or a solid state drive (SSD). In addition to or in place of a semiconductor drive device, a non-volatile memory such as flash memory may be included in the storage 1005. The memory 1004 and the storage 1005 correspond to the storage unit 14 of FIG. 2.

The program includes a program (hereinafter referred to as a "BIM program") that embodies the BIM application A and the assistance module M as described above. The entire or part of the program code constituting the BIM program may be stored in the memory 1004 and/or the storage 1005, or may be incorporated into part of an operating system (OS).

The program and/or data may be provided in a form recorded in a recording medium readable by the processor 1001. Examples of the recording medium include a flexible disk, a CD-ROM, a CD-R, a CD-RW, an MO, a DVD, a Blu-ray disk, and a portable hard disk. A semiconductor memory such as a universal serial bus (USB) memory is also an example of a recording medium.

The program and/or information may be provided (downloaded) from an application server (not illustrated) to the client terminal T via the network N. Through the communication IF 1006, the program and/or information may be provided to the client terminal T and stored in the memory 1004 and/or the storage 1005. The program and/or data may also be provided to the client terminal T through the input device 1002 and stored in the memory 1004 and/or the storage 1005.

The communication IF 1006 corresponds to the communication unit 13 of FIG. 2 and is an interface for communicating with the network N. The communication IF 1006 may include a wireless interface for wireless communication. The communication IF 1006 may include a wired interface for wired communication.

When the processor 1001 reads and executes the BIM program stored in the storage unit 14, the client terminal T functions as an example of a display processing device that implements the functions of the BIM application A and the assistance module M as described above.

When the processor 1001 executes the BIM program, each of the elements 161 to 172 of the control unit 15 illustrated in FIG. 2 is embodied.

The power supply circuit 1007 supplies electric power for operating each of the elements 1001 to 1006 illustrated in FIG. 3 to each of the elements 1001 to 1006.

<Server>

The BIM assistance system BS illustrated in FIG. 1 exemplarily includes the plurality of servers S1 to S4. FIG. 1 illustrates the four servers S1 to S4 as a non-limiting example. The number of servers may be one or more and three or less or five or more.

The servers S1 to S4 are provided for each work machine manufacturer, for example. The server S1 of the servers S1 to S4 will be described below. The configuration of the servers S2 to S4 is the same as that of the server S1, and it is therefore omitted. The server S1 is a server corresponding to a work machine manufacturer M1, for example. The servers S2 to S4 are server corresponding to the work machine manufacturers M2 to M4, respectively.

(Functional Configuration Example of Server)

The server S1 has a communication unit 21, a storage unit 23, a control unit 22, and the like.

(Communication Unit)

The communication unit 21 communicates with the client terminal T via the network N. For this purpose, the communication unit 21 includes a transmission unit and a reception unit (not illustrated) of information. Communication with the client terminal T is controlled by a control unit (not illustrated).

Note that the communication unit 21 communicates between the server S1 and the servers S2 to S4 via the network N.

In the case of the present embodiment, the server S1 is connected with the client terminal T via the Internet. The server S1 and the client terminal T communicate with each other using a TCP/IP protocol such as an HTTPS protocol. Note that the communication protocol between the server S1 and the client terminal T is not limited to the HTTPS protocol, and may be various communication protocols of a so-called request-response type.

The communication unit 21 sends the request received from the client terminal T to the control unit 22. The communication unit 21 transmits the response acquired from the control unit 22 to the client terminal T.

(Storage Unit)

The storage unit 23 stores a calculation expression (not illustrated) used in the calculation performed by a calculation unit 222. The calculation expression is used for the calculation of the performance information to be specified by the performance information request included in the request. The storage unit 23 stores an interpolation calculation expression used for the interpolation calculation described later.

The storage unit 23 stores performance data (e.g., rated total load) used for the calculation performed by the calculation unit 222. The storage unit 23 stores, for example, performance data as a performance table in a tabular format. The performance table is a table (hereinafter referred to as a "performance data table") in which parameters such as the attitude condition (boom hoist angle, boom length, boom turn angle, jib hoist angle, jib length, and outrigger overhang width) of the work machine image, the work state of the crane, and the operating radius of the crane are associated with performance data.

(Example of Performance Data Table) The performance data table corresponds to an example of a performance table, and is a table for obtaining performance data (e.g., rated total load) from the attitude condition, work state information, operating radius, and the like. Such the performance data table is stored in the storage unit 23 for each model of the work machine.

An example of the performance data table is presented in FIG. 5. FIG. 5 illustrates a performance data table 24 related to the boom length and the operating radius, and the rated total load, which is performance data, in a boom work state and an outrigger work state and in a case where the overhang width of each outrigger is maximum.

For example, in the performance data table 24 presented in FIG. 5, when the boom length (e.g., 9.35 m) and the operating radius (e.g., 2.5 m) are given as parameters, the rated total load (25 t) corresponding to each of those parameter is obtained. Note that the performance data table is provided for each piece of work state information such as the jib work state, the on-tire state, and/or the outrigger state. A plurality of performance data tables are provided in accordance with the overhang width of the outrigger.

The performance data table 24 presented in FIG. 5 includes the boom lengths and operating radii arranged at predetermined intervals, and the rated total load. The smaller the predetermined interval is, the more accurate the performance data table becomes. For example, with the boom lengths (e.g., 9.35 m, 16.4 m, and the like) and the operating radii (e.g., 2.5 m and 3.0 m) whose values are presented in the performance data table 24 presented in FIG. 5, the rated total load can be obtained from the performance data table.

However, in the case of the boom length (e.g., 12 m) not illustrated in the performance data table 24 presented in FIG. 5, the rated total load at the operating radius 2.5 m cannot be obtained from the performance data table 24. The rated total load, which cannot be directly obtained from the performance data table 24, is obtained by interpolation calculation by the calculation unit 222. The calculation unit 222 executes this interpolation calculation by using the interpolation calculation expression acquired from the storage unit 23.

The performance data table 24 may be, for example, a performance data table related to the reaction force of the outrigger jack or a performance data table related to bending of the boom. The performance data table related to the bending of the boom stores, for example, the type of the boom or jib, the attitude condition of the crane, and the bending amount of the tip of the boom or jib in accordance with the lifting load in association with each other. The attitude conditions of the crane are, for example, the boom length, boom hoist angle, jib length, and jib offset angle (jib hoist angle).

The storage unit 23 stores the specification data for each work machine. The storage unit 23 stores the specification data in association with model information. The specification data is used for the calculation performed by the calculation unit 222.

The specification data in the case where the work machine is a mobile crane includes the weight gravity center position and weight of the carrier portion (also referred to as a lower travel body) of the mobile crane. The specification data includes the weight gravity center position and weight of each outrigger with respect to the overhang length of each outrigger.

The specification data includes the turn center coordinate, weight gravity center position, and/or weight of the upper turn table. The specification data includes the rotation center coordinate, weight gravity center position, and/or weight of the base boom with respect to the reference coordinate of the upper turn table.

The specification data includes the attachment origin coordinate, weight gravity center position, and/or weight of the second boom with respect to the base boom. Furthermore, the specification data includes the weight per unit length of a wire rope. Note that the specification data is not limited to the example described above.

(Control Unit)

The control unit 22 has a request acquisition unit 221, the calculation unit 222, a response issuance unit 223, and the like.

(Request Acquisition Unit)

The request acquisition unit 221 analyzes the request acquired from the communication unit 21. In the case of the present embodiment, the request is in the form of HTTP message of HTTPS protocol. The HTTP method used in the request is the GET method.

Specifically, the request acquisition unit 221 extracts a performance information request and a parameter from the request. The parameter is a parameter corresponding to the performance information request, and is information of at least one of model information, attitude condition, work state information, component information, hoisting load information, route information, and other information presented in Table 1 above.

An example of a method for extracting a parameter from a request will be described. When the parameter included in the request is only a parameter necessary for the calculation of the performance information specified by the performance information request included in the request, the request acquisition unit 221 extracts all the parameters included in the request.

Another example of a method for extracting an attitude condition from a request will be described. When the parameter included in the request is a predetermined type of parameter, the request acquisition unit 221 selects and extracts a parameter necessary for the calculation of the performance information specified by the performance information request included in the request of the parameters included in the request.

Note that the performance information request corresponds to each item of the column A in Table 2 below. The column B in Table 2 presents the parameters (e.g., model information, attitude condition, work state information, component information, hoisting load information, route information, and other information presented in Table 1 above) included in the request.

In the description of Table 2, column numbers A to C and row numbers 1 to 10 are used when referring to the items in Table 2. For example, the item in the column A, the row 1 of Table 2 is indicated as A-1 of Table 2. In a work state where jib is not used, information on the jib may be omitted.

For example, in a case of use of a fixed-length jib, the length of the jib may or may not be included in the parameter. In case of not including the length of the jib in the parameter, the length of the jib included in the specification data may be used for the calculation described later.

TABLE 2

|   | A (performance information request) | B (parameters) | C (performance information) |
|---|---|---|---|
| 1 | Display request for rated total load | Work machine id (model, specification number, or serial number) Work state (on-tire work and outrigger work) Outrigger overhang width Boom information (type, hoist angle, length, and turn angle) Jib information (type, hoist angle, and jib length) Hook information Number of wire hooks Counterweight information | Rated total load |
| 2 | Display request for moment load factor | Work machine id (model, specification number, for serial number) Work state (on-tire work and outrigger work) | Moment load factor |

TABLE 2-continued

| | A (performance information request) | B (parameters) | C (performance information) |
|---|---|---|---|
| | | Outrigger overhang width<br>Boom information (type, hoist angle, length, and turn angle)<br>Jib information (type, hoist angle, and length)<br>Hook information<br>Number of wire hooks<br>Lifting load<br>Counterweight information | |
| 3 | Display request for rated total load at maximum moment load factor | Work machine id (model, specification number, or serial number)<br>Work state (on-tire work and outrigger work)<br>Outrigger overhang width<br>Boom information (type, hoist angle, length, and turn angle)<br>Jib information (type, hoist angle, and jib length)<br>Hook information<br>Number of wire hooks<br>Moment load factor<br>Counterweight information | Rated total load |
| 4 | Display request for maximum lowering angle and maximum operating radius of boom | Work machine id (model, specification number, or serial number)<br>Work state (on-tire work and outrigger work)<br>Outrigger overhang width<br>Boom information (type, length, and turn angle)<br>Jib information (type, hoist angle, and length)<br>Hook information<br>Number of wire hooks<br>Lifting load<br>Counterweight information | Maximum lowering angle and operating radius of boom |
| 5 | Display request for deformation image of boom and deformation image of jib | Work machine id (model, specification number, or serial number)<br>Work state (on-tire work and outrigger work)<br>Outrigger overhang width<br>Boom information (type, hoist angle, length, and turn angle)<br>Jib information (type, hoist angle, and length)<br>Hook information<br>Number of wire hooks<br>Lifting load<br>Counterweight information | Deformation image information of boom and deformation image information of jib |
| 6 | Display request for work area work machine image | Work machine id (model, specification number, or serial number)<br>Work state (on-tire work and outrigger work)<br>Outrigger overhang width<br>Boom information (type)<br>Jib information (type)<br>Hook information<br>Number of wire hooks<br>Lifting load<br>Counterweight information | Information on work area work machine image |

TABLE 2-continued

| | A (performance information request) | B (parameters) | C (performance information) |
|---|---|---|---|
| 7 | Display request for attitude condition of work machine, moment load factor, and Whether or not work is possible | Work machine id (model, specification number, or serial number)<br>Work state (on-tire work and outrigger work)<br>Outrigger overhang width<br>Boom information (type)<br>Jib information (type)<br>Hook information<br>Number of wire hooks<br>Lifting load<br>Hoisting load route (via position) information<br>Counterweight information | Boom hoist angle<br>Boom length<br>Turn angle<br>Jib length<br>Jib hoist angle<br>Moment load factor<br>Determination result on whether or not work is possible |
| 8 | Display request for reaction force of outrigger jack | Work machine id (model, specification number, or serial number)<br>Outrigger overhang width<br>Boom information (type, hoist angle, length, and turn angle)<br>Jib information (type, hoist angle, and length)<br>Hook information<br>Number of wire hooks<br>Lifting load<br>Counterweight information | Reaction force value of outrigger jack |
| 9 | Display request for whether or not work is possible in consideration of ground strength | Work machine id (model, specification number, serial number)<br>Outrigger overhang width<br>Boom information (type, hoist angle, length, and turn angle)<br>Jib information (type, hoist angle, and length)<br>Hook information<br>Number of wire hooks<br>Lifting load<br>Ground strength<br>Counterweight information | Reaction force value of outrigger jack<br>Determination result on whether or not work is possible<br>Workable installation position |
| 10 | Movement route of hoisting load | Work machine id (model, specification number, or serial number)<br>Outrigger overhang width<br>Hook information<br>Number of wire hooks<br>Lifting load<br>Information on building image<br>Start point of hoisting load<br>End point of hoisting load<br>Counterweight information | Movement route of hoisting load |

The request acquisition unit 221 sends the information extracted from the request to the calculation unit 222. Note that the processing of the request acquisition unit 221 may be carried out by the calculation unit 222 described later.

(Calculation Unit)

The calculation unit 222 calculates performance information specified by the performance information request included in the request on the basis of the information acquired from the request acquisition unit 221 and the information acquired from the storage unit 23.

The calculation unit 222 selects a calculation expression to be used for calculation on the basis of the information included in the request. Then, the calculation unit 222 acquires the selected calculation expression from the storage unit 23.

As an example of the method for selecting a calculation expression, the calculation unit 222 selects a calculation expression to be used for the calculation on the basis of the performance information request included in the request.

As an example of the method for selecting a calculation expression, the calculation unit 222 selects a calculation expression to be used for the calculation on the basis of the performance information request included in the request and information other than the performance information request included in the request. The information other than the performance information request includes, for example, model information, attitude condition, work state information, and/or component information (information on type of component).

The calculation unit 222 selects the specification data of the work machine used for the calculation on the basis of the information included in the request. Then, the calculation unit 222 acquires the selected specification data from the storage unit 23.

As an example of the method for selecting the specification data, the calculation unit 222 selects the specification data of the work machine to be used for the calculation on the basis of the model information included in the request.

As an example of the method for selecting the specification data, the calculation unit 222 selects the specification data of the work machine to be used for the calculation on the basis of the model information included in the request and information (e.g., performance information request and/or attitude condition) other than the model information included in the request.

(Regarding First Calculation)

As an example of the calculation performed by the calculation unit 222, the calculation unit 222 calculates the performance information specified by the performance information request on the basis of the performance information request and parameter (model information, attitude condition, and the like) acquired from the request acquisition unit 221 and the calculation expression and specification data acquired from the storage unit 23.

Such a calculation is referred to as a first calculation. Throughout the present description, the first calculation means a calculation that does not use the performance data (performance data table) stored in the storage unit 23.

(Regarding Second Calculation)

As an example of the calculation performed by the calculation unit 222, the calculation unit 222 calculates the performance information specified by the performance information request on the basis of the performance information request and parameter (model information, attitude condition, and the like) acquired from the request acquisition unit 221 and the calculation expression, the performance data table, and the specification data acquired from the storage unit 23.

Such a calculation is referred to as a second calculation or an interpolation calculation. Throughout the present description, the second calculation and the interpolation calculation mean a calculation that uses the performance data (performance data table) stored in the storage unit 23.

Note that throughout the present description, the interpolation calculation sometimes means a calculation that interpolates performance data (e.g., rated total load) between data in the performance data table. Such interpolation calculation is performed by an interpolation method such as linear interpolation. Such interpolation calculation is performed by an interpolation method based on the unique expertise of each work machine manufacturer. The calculation unit 222 sends the calculation result to the response issuance unit 223.

(Response Issuance Unit)

The response issuance unit 223 generates a response including the calculation result acquired from the calculation unit 222. The response issuance unit 223 sends the generated response to the communication unit 21.

The response is in the form of response message of HTTPS protocol, for example. The calculation result is described in the message body of the response.

Figure 6:
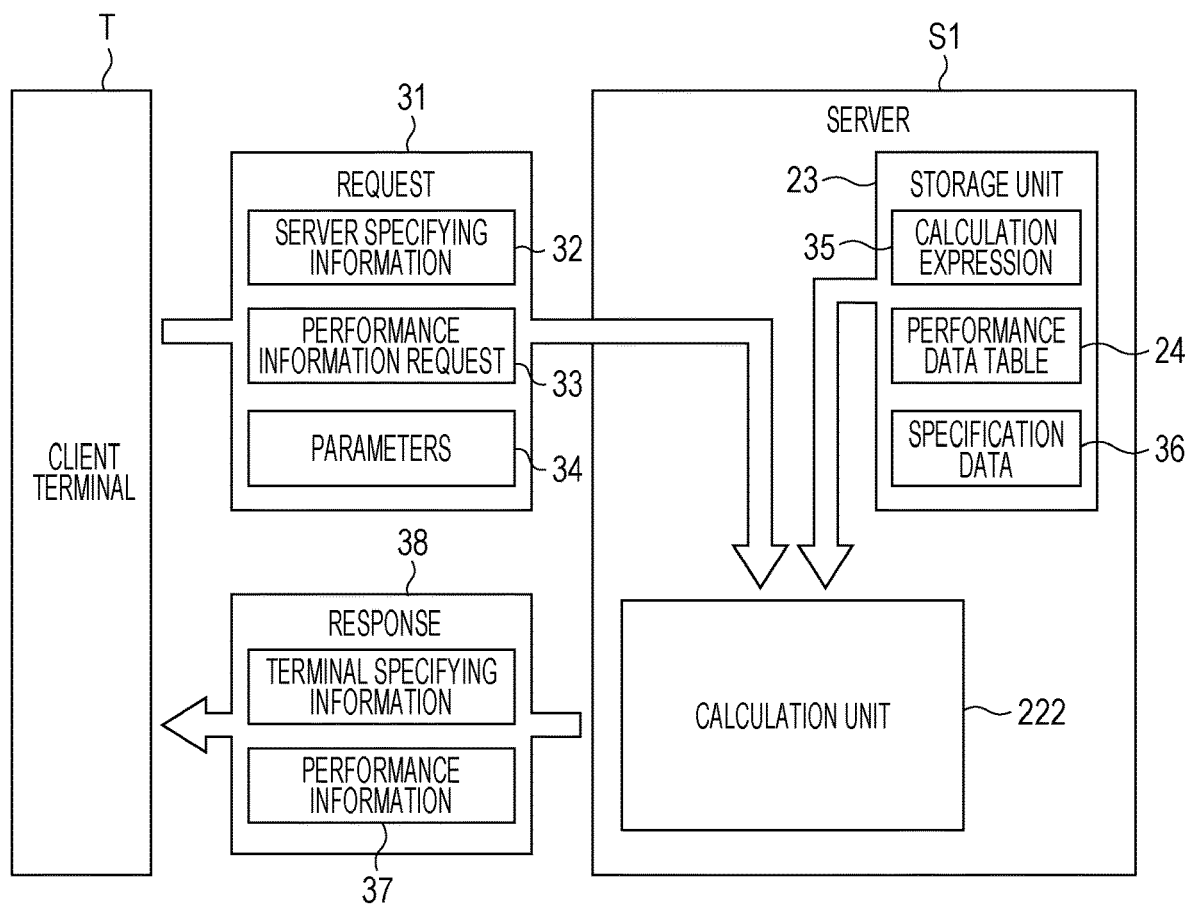
FIG. 6 is a diagram illustrating a flow of data between the client terminal and the server.

Here, referring to FIG. 6, an example of the calculation performed by the calculation unit 222 will be described in terms of the flow of data between the client terminal T and the server S1. FIG. 6 is a diagram simply illustrating the flow of data between the client terminal T and the server S1.

As illustrated in FIG. 6, first, the client terminal T transmits a request 31 to the server S1. The request 31 includes server specifying information 32 for specifying the server S1, a performance information request 33, and a parameter 34. The parameter 34 includes, for example, at least one of model information, attitude condition, work state information, component information, hoisting load information, route information, and other information. Note that the parameter 34 is only required to include at least information necessary for the calculation of the performance information specified by the performance information request 33.

The server S1 calculates the performance information specified by the performance information request 33 included in the request 31 on the basis of the parameter 34 included in the request 31 acquired from the client terminal T, a calculation expression 35 acquired from the storage unit 23 of the server S1, the performance data table 24 (see FIG. 5), and specification data 36.

Specifically, the calculation unit 222 acquires, from the storage unit 23, the performance information request 33 acquired from the request acquisition unit 221 and the calculation expression 35 corresponding to the model information included in the parameter 34.

The calculation unit 222 acquires, from the storage unit 23, the performance data table 24 (see FIG. 5) corresponding to the parameter 34 (model information, attitude condition, and/or work state) acquired from the request acquisition unit 221. At this time, the calculation unit 222 acquires a plurality of performance data tables corresponding to the acquired parameters 34 (model information, attitude condition, and/or work state) from the storage unit 23. The performance data table 24 corresponds to an example of a performance information table.

Furthermore, the calculation unit 222 acquires the specification data 36 corresponding to the work machine specified by the model information of the acquired parameter 34 from the storage unit 23.

Then, the calculation unit 222 calculates performance information 37 specified by the performance information request 33 acquired from the client terminal T on the basis of the parameter 34 acquired from the client terminal T, the calculation expression 35 acquired from the storage unit 23, the performance data table 24, and the specification data 36.

Then, the server S1 transmits a response 38 including the calculation result (performance information 37) to the client terminal T. The response 38 includes terminal specifying information specifying the client terminal T, together with the performance information 37.

The calculation unit 222 can perform calculation with substantially the same accuracy as that of the calculation unit mounted on the actual machine of the work machine. In other words, the calculation expression, performance data table, and specification data used by the calculation unit 222 are the same as the calculation expression, performance data table, and specification data used by the calculation unit mounted on the actual machine of the work machine.

Note that in the actual machine of the work machine, the jack reaction force of the outrigger is a detection value of a jack reaction force detection means. On the other hand, in the present embodiment, the jack reaction force of the outrigger is obtained by simulation calculation.

(Hardware Configuration Example of Server)

Figure 4:
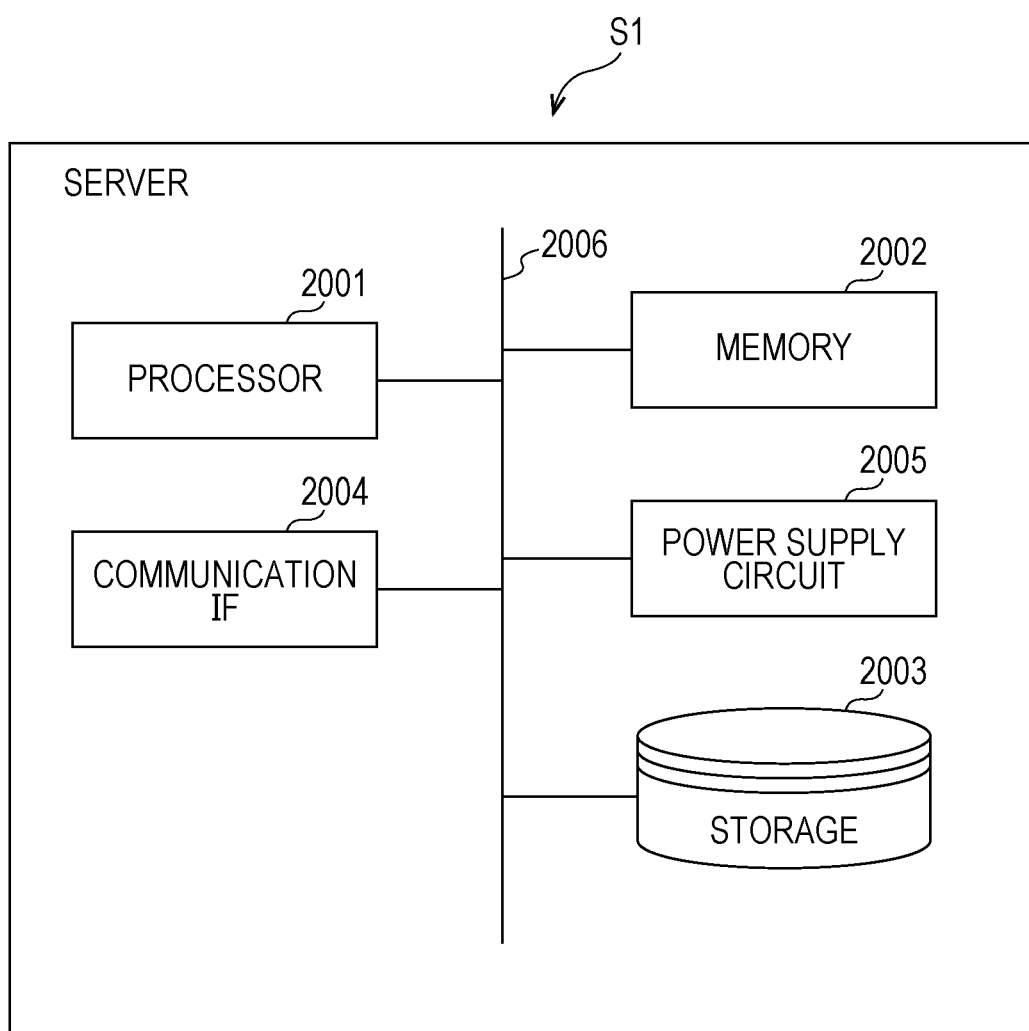
FIG. 4 is a block diagram illustrating an example of a hardware configuration of a server according to the first embodiment.

As illustrated in FIG. 4, in terms of the hardware configuration, the server S1 includes a processor 2001, a memory 2002, and a storage 2003. The server S1 includes a communication IF 2004 and a power supply circuit 2005. Furthermore, the server S1 may include an input device (not illustrated) and an output device (not illustrated). These elements 2001 to 2005 are connected by a bus 2006, for example.

The processor 2001 controls the operation of the server S1. The processor 2001 is an example of a circuit or device including a calculation ability. For the processor 2001, for example, at least one of a CPU, an MPU, and a GPU is used.

The memory 2002 stores a program executed by the processor 2001 and data or information processed in accordance with the execution of the program. The memory 2002 includes a RAM and a ROM. The RAM is used for the work memory of the processor 2001.

The storage 2003 stores a program executed by the processor 2001. The storage 2003 stores data, information, or the like processed in accordance with the execution of the program. The storage 2003 stores the above-described calculation expression, performance data table, and specification data.

The storage 2003 includes a semiconductor drive device such as a hard disk drive (HDD) or a solid state drive (SSD). In addition to or in place of a semiconductor drive device, a non-volatile memory such as flash memory may be included in the storage 2003.

The memory 2002 and the storage 2003 may be regarded as corresponding to the storage unit 23 of FIG. 2.

The entire or part of the program code constituting a program (hereinafter referred to as a "performance information calculation program") implementing the function of the server S1 may be stored in the memory 2002 and/or the storage 2003, or may be incorporated into part of an operating system (OS).

The program and/or data may be provided in a form recorded in a recording medium readable by the processor 2001. Examples of the recording medium include a flexible disk, a CD-ROM, a CD-R, a CD-RW, an MO, a DVD, a Blu-ray disk, and a portable hard disk. A semiconductor memory such as a USB memory is also an example of a recording medium.

The communication IF 2004 corresponds to the communication unit 21 of FIG. 2 and is an interface for communicating with the network N. The communication IF 2004 includes a wired interface for wired communication with the network N.

When the processor 2001 reads and executes the performance information calculation program stored in the storage unit 23, the server S1 functions as an example of a performance information calculation server device.

For example, when the processor 2001 executes the performance information calculation program, the control unit 22 and each of the elements 221 to 223 of the control unit 22 illustrated in FIG. 2 are embodied.

The power supply circuit 2005 supplies electric power for operating each of the elements 2001 to 2004 illustrated in, for example, FIG. 4 to each of the elements 2001 to 2004.

Note that the functional configuration and hardware configuration of the servers S2 to S4 may be equal to the functional configuration and hardware configuration of the server S1.

(Example of Calculation Performed by Server)

An example of the calculation performed by the calculation unit 222 of the server S1 will be briefly described here with reference to Table 2 described above.

The calculation unit 222 calculates and obtains the value of each performance information when the performance information request is a display request for the rated total load (see A-1 of Table 2), a display request for the moment load factor (see A-2 of Table 2), a display request for the rated total load at the maximum moment load factor (see A-3 of Table 2), and a display request for the boom maximum lowering angle and operating radius (see A-4 of Table 2).

Note that the calculation expression for calculating the rated total load, the calculation expression for calculating the moment load factor, the calculation expression for calculating the boom maximum lowering angle, and the calculation expression for calculating the operating radius are stored in the storage unit 23.

For example, when the performance information request is a display request for a deformation image of the boom and a deformation image of the jib (see A-5 of Table 2), the calculation unit 222 calculates and obtains the deformation image information of the boom and the deformation image information of the jib. These pieces of deformation image information are used for generation of a deformation image by the deformation image processing unit 177. The deformation image information of the boom and the deformation image information of the jib are, for example, numerical data for drawing a deformation image of the boom or the jib. The calculation unit 222 calculates the numerical data by using a calculation expression for an image.

The calculation unit 222 calculates and obtains area image information when the performance information request is a display request for an area image (see A-6 of Table 2) The area image information is used for generation of an area image by the area image processing unit 176.

Furthermore, when the performance information request is a display request for the attitude condition of the work machine, the moment load factor, and whether or not the work is possible (see A-7 of Table 2), the calculation unit 222 calculates and obtains the attitude condition of the work machine such as the boom hoist angle and the boom length, the moment load factor, and the determination result on whether or not the work is possible.

<Operation Example of BIM Assistance System>

An operation example of the BIM assistance system BS will be described below.

Operation Example 1

Figure 7A:
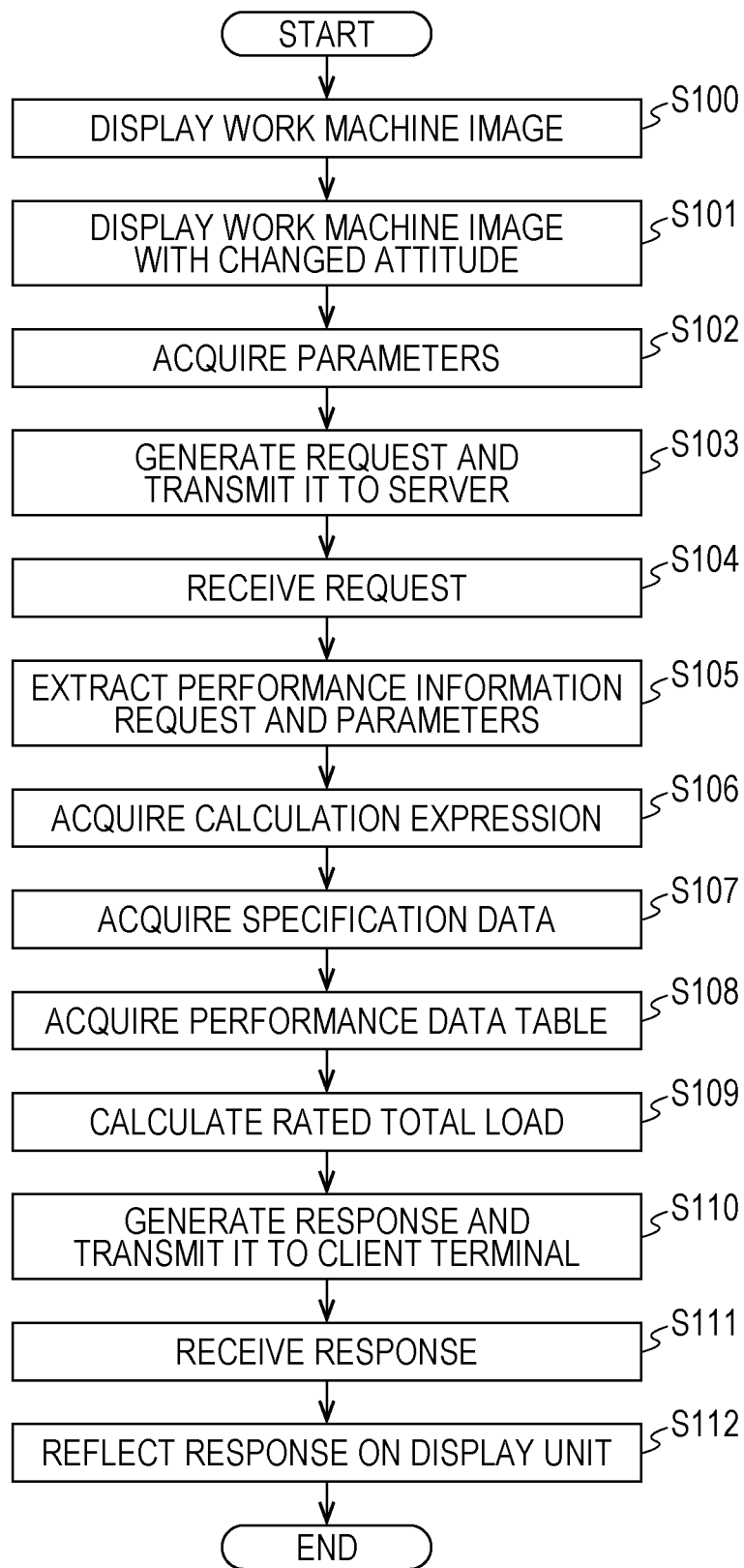
FIG. 7A is a flowchart presenting an example of the operation of the BIM assistance system.

An example of the operation of the BIM assistance system BS will be described with reference to FIGS. 7A, 8A, and 8B. FIG. 7A is a flowchart presenting the operation of the BIM assistance system BS when the rated total load of the work machine (crane) displayed on the display unit 12 is displayed on the display unit 12 (see A-1 of Table 2).

In the operation example 1, after deciding the attitude of the work machine image displayed on the display unit 12, the operator requests the rated total load corresponding to the attitude of the work machine image to one server selected from the servers S1 to S4. In this manner, when the attitude of the work machine image is changed, the operator requests the rated total load to the server.

By comparing the rated total load acquired from the server with the weight of the hoisting load to be conveyed, the operator can determine whether or not the crane can convey the hoisting load to the conveyance target position in the attitude decided by the operator. The operation of the BIM assistance system BS in this operation example will be described below.

Figure 8A:
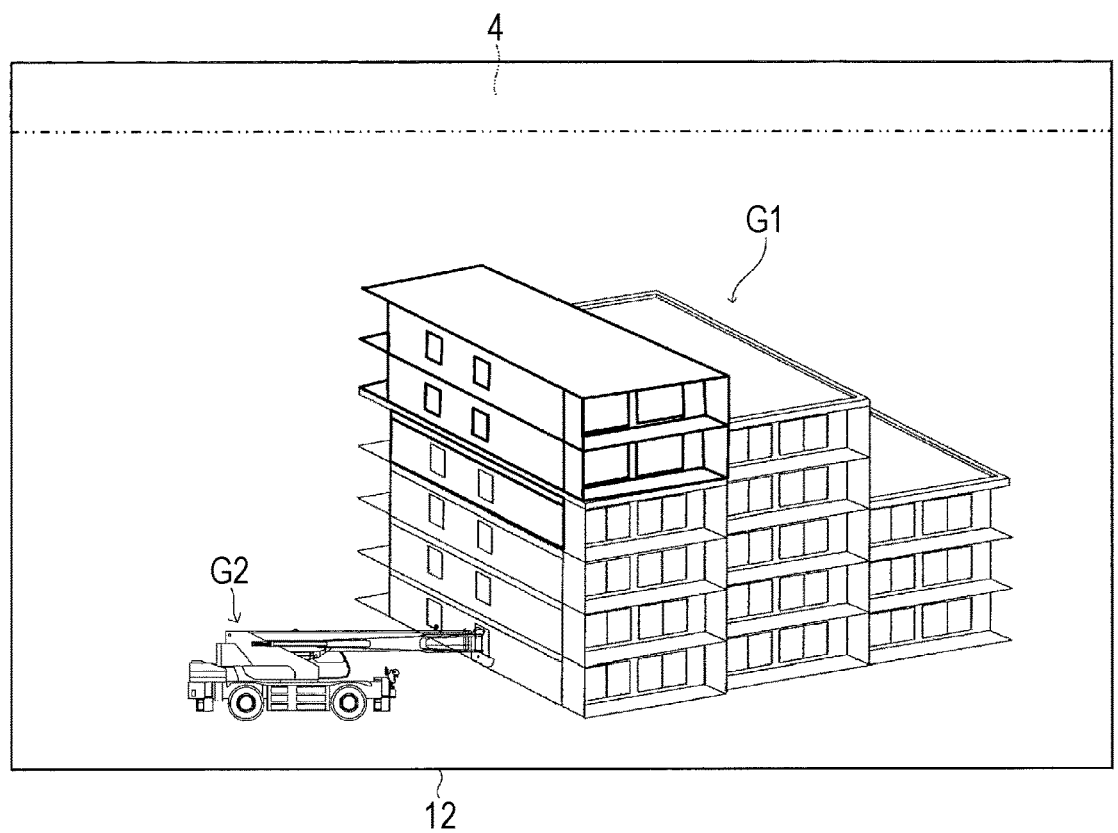
FIG. 8A is a view illustrating an example of an image displayed on the display unit.
Figure 8B:
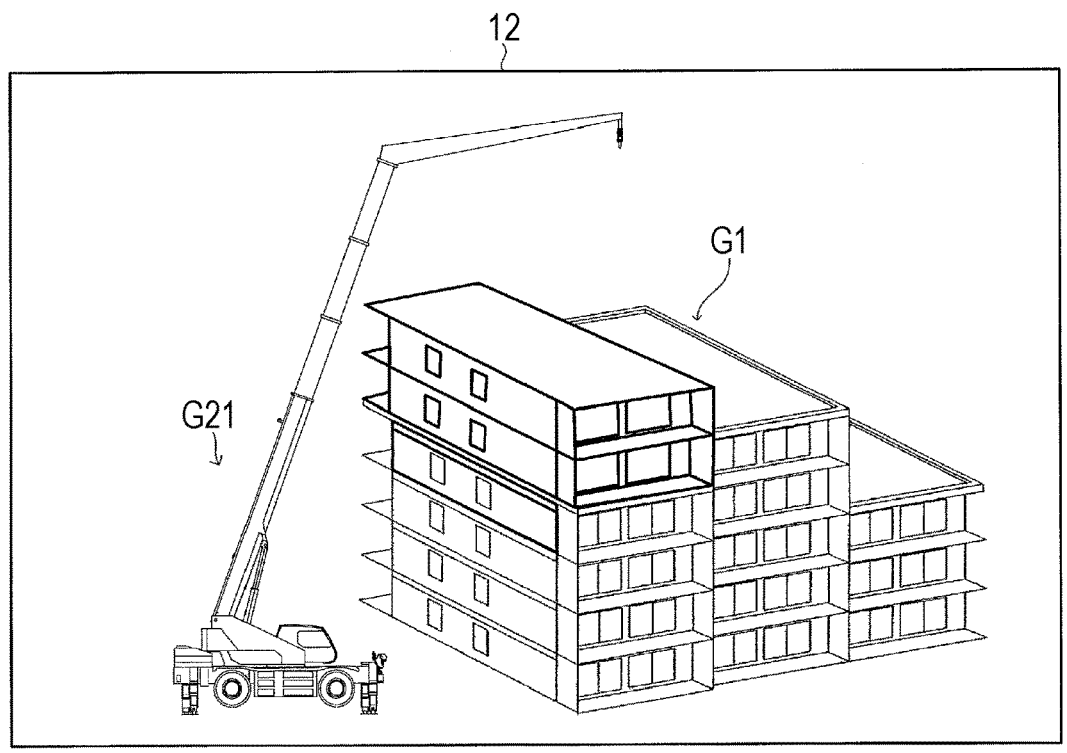
FIG. 8B is a view illustrating an example of an image displayed on the display unit.

In step S100 of FIG. 7A, only a building image G1 illustrated in FIG. 8A is displayed on the display unit 12. That is, in step S100, a work machine image G2 illustrated in FIG. 8A is not displayed on the display unit 12. The building image G1 may be an image created by the operator by using the BIM application A or may be an image displayed by reading the information stored in the storage unit 14.

In step S100, in order to display the work machine image G2 on the display unit 12, the operator inputs a display instruction of the work machine image from the input unit 11.

In step S100, when the input unit 11 receives the display instruction of the work machine image, the BIM control unit 161 causes the display unit 12 to display the work machine image G2 specified by the model information included in the display instruction of the work machine image.

In step S100, the BIM control unit 161 acquires the work machine image G2 from the second storage unit 142. Specifically, the BIM control unit 161 acquires, from the second storage unit 142, the work machine image corresponding to the model information included in the display instruction of the work machine image. The attitude of the work machine image acquired from the second storage unit 142 is the basic attitude of the work machine image.

Here, an example of the operation of the operator in step S100 will be described. In step S100, the operator operates the BIM application A in order to display the work machine image G2 related to the desired work machine on the display unit 12.

In the state before the operator executes the operation in step S100, the building image G1 is displayed on the display unit 12, and the work machine image G2 is not displayed. A window of the BIM application A is displayed on the display unit 12, and a toolbar 4 (see FIG. 7B) of the BIM application A is displayed on the upper part of the window. The toolbar 4 includes an icon and the like for operating the BIM application A.

Figures 7B, 7C:
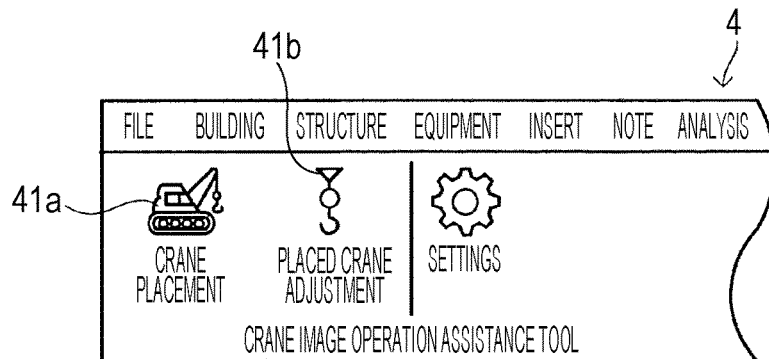
FIG. 7B is a view illustrating a part of a toolbar of a BIM application.
FIG. 7C is a view illustrating an example of a crane selection screen.

FIG. 7B is a view illustrating a part of the toolbar 4 of the BIM application A. The toolbar 4 may include various tabs, icons, and buttons in addition to the tabs and icons illustrated in FIG. 7B.

First, the operator selects the model of the work machine to be displayed on the display unit 12. Specifically, the operator selects an icon 41a related to crane placement of the toolbar 4 illustrated in FIG. 7B. The icon 41a is an icon that the operator operates for selecting the desired crane.

Then, the BIM application A displays a crane selection screen 42 as illustrated in FIG. 7C on the display unit 12. The crane selection screen 42 has a mode selection section 42a for selecting "Simple Mode" and "Details Mode". FIG. 7C illustrates a crane selection screen of the simple mode. Although the description of the crane selection screen of the details mode (not illustrated) is omitted, the crane selection screen of the details mode can receive, from an operator, input of setting of the crane more detailed than that the crane selection screen of the simple mode receives.

The crane selection screen 42 has a condition input section 43. The condition input section 43 receives input related to the condition of the crane from the operator.

The condition input section 43 has a first selection section 43a for selecting the crane type, a second selection section 43b for selecting the crane manufacturer, and a third selection section 43c for selecting the jib type.

The condition selection section 43 has a fourth selection section 43d for selecting the maximum lifting weight, a fifth selection section 43e for selecting the maximum lift above ground level, and a sixth selection section 43f for selecting the maximum operating radius.

The condition selection section 43 has a seventh selection section 43g for selecting the maximum boom length, an eighth selection section 43h for selecting the weight of the counterweight, and a ninth selection section 43i for selecting the weight of the hook.

The operator inputs a condition related to the desired crane to any selection section of the condition selection section 43. FIG. 7D is a view illustrating a display mode of the first selection section 43a when the operator selects the condition of the crane type. The first selection section 43a is a pull-down type selection section. The operator selects a desired crane type from a plurality of crane types displayed on the first selection section 43a.

The crane type includes, for example, a rough terrain crane, an all terrain crane, a cargo crane, and a tower crane.

FIG. 7E is a view illustrating a display mode of the second selection section 43b when the operator selects the condition of the crane manufacturer. The second selection section 43b is a pull-down type selection section. The operator selects a desired crane manufacturer from a plurality of crane manufacturers displayed on the second selection section 43b.

When the operator finishes selection of the conditions of the crane, the crane satisfying the conditions of the crane selected by the condition selection section 43 is displayed on a list display section 44 of the crane selection screen 42. The operator selects the desired crane from the cranes displayed on the list display section 44. When the operator selects the crane, the work machine image G2 of the selected crane is displayed on the display unit 12.

In step S101, the operator inputs an attitude condition from the input unit 11 in order to decide the attitude of the work machine in the work machine image G2 displayed on the display unit 12. The operator inputs the attitude condition of the work machine image G2 from a crane adjustment screen 45 (described later) displayed on the display unit 12 of the work machine image G2, for example. The operator may decide the attitude of the work machine in the work machine image G2 by dragging the work machine image G2. The operation performed by the operator in step S101 is referred to as an attitude decision operation.

In step S101, if there is an attitude condition having not been decided of the attitude conditions of the work machine in the work machine image G2, the operator may omit input of the attitude condition (e.g., boom hoist angle) corresponding to this attitude condition having not been decided. Hereinafter, the attitude condition having not been decided will be simply referred to as an "undecided attitude condition". In this operation example, a case where there is no undecided attitude condition will be described.

In step S101, when the input unit 11 receives the input of the attitude decision operation, the BIM control unit 161 reflects the attitude decision operation on the work machine image G2 of the display unit 12. Then, as illustrated in FIG. 8B, the display unit 12 displays a work machine image G21 in which the attitude is changed from that in the work machine image G2 illustrated in FIG. 8A.

In step S101, the input unit 11 receives input of at least one attitude condition of, for example, the boom hoist angle, boom length, boom turn angle, jib hoist angle, jib length, outrigger overhang width, and the like. The work machine image G21 illustrated in FIG. 8B is an image in which the attitude condition received by the input unit 11 in step S101 is reflected on the work machine image G2 illustrated in FIG. 8A.

Here, an example of the operation of the operator in step S101 will be described. After the processing of step S100 described above, the attitude of the work machine image G2 displayed on the display unit 12 is the basic attitude (see FIG. 8A). If the work machine image G2 is an image of the crane, the boom is in a fully lowered state and fully contracted state in the basic attitude of the crane. In the basic attitude of the crane, the turn angle of the boom is zero, and the overhang width of the outrigger is zero.

In step S101, the operator operates the BIM application A in order to decide the attitude of the work machine image G2 displayed on the display unit 12. In step S101, the operator decides, for example, the turn angle of the boom, the hoist angle of the boom, the expansion and contraction length of the boom, the overhang width of the outrigger, and the like.

Specifically, the operator selects an icon 41*b* related to the placed crane adjustment of the toolbar 4 illustrated in FIG. 7B. The icon 41*b* is an icon operated in order to decide the attitude of the work machine image displayed on the display unit 12.

Then, the BIM application A displays the crane adjustment screen 45 as illustrated in FIG. 7F on the display unit 12. The crane adjustment screen 45 has an attitude adjustment section 46. The attitude adjustment section 46 receives input related to the attitude of the crane from the operator.

The attitude adjustment section 46 has a first adjustment section 46*a*, a second adjustment section 46*b*, a third adjustment section 46*c*, and a fourth adjustment section 46*d*.

The first adjustment section 46*a* is a slide bar, and is an adjustment section for the operator to adjust the angle of the crane (i.e., work machine image G2). The angle of the crane is defined as the inclination angle of the center axis of the boom with respect to the reference direction (e.g., upper part of the display unit 12).

The second adjustment section 46*b* is a slide bar, and is an adjustment section for the operator to adjust the angle of the turn table (i.e., turn angle of the crane).

The third adjustment section 46*c* is a slide bar, and is an adjustment section for the operator to adjust the boom length. The fourth adjustment section 46*d* is a slide bar, and is an adjustment section for the operator to adjust the hoist angle of the boom.

The attitude adjustment section 46 has a first input section 46*e*, a second input section 46*f*, a third input section 46*g*, and a fourth input section 46*h*.

The first input section 46*e* displays the angle of the crane selected by the first adjustment section 46*a*. The first input section 46*e* receives direct input related to the angle of the crane from the operator.

The second input section 46*f* displays the turn angle of the crane selected by the second adjustment section 46*b*. The second input section 46*f* receives direct input related to the turn angle of the crane from the operator.

The third input section 46*g* displays the boom length of the crane selected by the third adjustment section 46*c*. The third input section 46*g* receives direct input related to the boom length from the operator.

The fourth input section 46*h* displays the hoist angle of the boom selected by the fourth adjustment section 46*d*. The fourth input section 46*h* receives direct input related to the hoist angle of the boom from the operator.

In step S101, the operator inputs the attitude condition of the crane by operating the first adjustment section 46*a*, the second adjustment section 46*b*, the third adjustment section 46*c*, and the fourth adjustment section 46*d*. In step S101, the operator may directly input the attitude condition of the crane to the first input section 46*e*, the second input section 46*f*, the third input section 46*g*, and the fourth input section 46*h*.

When the operator inputs the attitude condition of the crane from the attitude adjustment section 46, the input attitude condition is immediately reflected on the work machine image G2 displayed on the display unit 12. As a result, the work machine image G2 transitions to the work machine image G21 (see FIG. 8B).

Next, in step S102, the operator performs an operation of obtaining the rated total load of the work machine image G21 whose attitude has been decided in step S101. For example, the operator inputs a display request (performance information request) for the rated total load from the input screen popped up on the display unit 12.

Note that the operation of the operator for displaying the rated total load on the display unit 12 ends in step S102. The subsequent processing is automatically performed between the client terminal T and the servers S1 to S4. That is, in this operation example, when the operator inputs a display request for the rated total load via the BIM application A, the rated total load is automatically displayed on the display unit 12.

Note that in the above example, the operator manually inputs the display request for the rated total load via the input unit 11. However, the input operation of the display request for the rated total load by the operator may be omitted. In this case, in step S101, when the input unit 11 receives input of the attitude decision operation, the BIM control unit 161 reflects the attitude decision operation on the work machine image G2 of the display unit 12, and automatically sends the display request (performance information request) for the rated total load to the information acquisition unit 173. The BIM control unit 161 sends, to the information acquisition unit 173, the performance information request and the parameter corresponding to the calculation of the performance information specified by the performance information request.

In step S102, when the input unit 11 receives the performance information request, the information acquisition unit 173 acquires, from the BIM control unit 161, the parameters (model information, attitude condition, work state information, component information, and other information) corresponding to the acquired performance information request.

In step S102, the information acquisition unit 173 acquires, from the BIM control unit 161, at least the parameter necessary for the calculation of the performance information specified in the performance information request.

In step S102, also when the information acquisition unit 173 receives the performance information request from the BIM control unit 161, the information acquisition unit 173 may acquire, from the BIM control unit 161, the parameter corresponding to the acquired performance information request.

The parameter automatically acquired by the information acquisition unit 173 in step S102 is the parameter presented in column B of Table 3 below (parameter presented in 1-B of Table 2).

TABLE 3

| A (performance information request) | B (parameters) | C (performance information) |
|---|---|---|
| 1 Display request for rated total load | Work machine id (model, specification number, or serial number) Work state (on-tire work and outrigger work) Outrigger overhang width Boom information (type, hoist angle, length, and turn angle) Jib information (type, hoist angle, and jib length) Hook information Number of wire hooks Counterweight information | Rated total load |

Specifically, the attitude conditions of the acquired parameters are the boom hoist angle, boom length, boom turn angle, jib hoist angle, and jib length.

The work state information of the acquired parameters includes information on the outrigger state (on-tire work state or outrigger state). The work state information of the acquired parameters includes information on boom/jib selection (see Table 1).

The component information of the acquired parameters includes at least one information of information on the boom (e.g., the type of boom), information on the jib (e.g., the type of jib), information on the hook (e.g., the type of hook), information on the wire (e.g., the number of wire hooks), information on the counterweight (e.g., the weight of the counterweight), and the like.

Note that in step S102, the information automatically acquired by the information acquisition unit 173 is information on the items described in 1-B of Table 2. Then, the information acquisition unit 173 sends the acquired information to the request issuance unit 174.

In step S103, the request issuance unit 174 acquires, from the third storage unit 143, the server specifying information (e.g., the URI of the server) for specifying the server corresponding to the work machine image (i.e., the work machine image G21 of FIG. 8B) specified by the acquired model information.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information.

Note that the request generated in step S103 is in the form of request message of HTTPS protocol. Such request includes the URI, the performance information request, and the parameter, in order from the head (see Expression 1 above).

Of the request, the URI is server specifying information acquired from the third storage unit 143 in step S103. Of the request, the performance information request is a display request for the rated total load having been input from the operator in step S102. Furthermore, of the request, the parameter is a parameter automatically acquired by the information acquisition unit 173 in step S102.

The processing of the server S1 having received a request from the client terminal T will be described below.

In step S104, the communication unit 21 receives the request. Then, the communication unit 21 sends the request to the request acquisition unit 221.

In step S105, the request acquisition unit 221 extracts a performance information request and a parameter from the acquired request. Then, the request acquisition unit 221 sends the extracted information to the calculation unit 222.

In step S106, the calculation unit 222 acquires, from the storage unit 23, the calculation expression corresponding to the performance information request and model information acquired from the request acquisition unit 221. In step S106, the calculation expression acquired by the calculation unit 222 is an interpolation calculation expression for performing the above-described interpolation calculation.

In step S107, the calculation unit 222 acquires, from the storage unit 23, the specification data corresponding to the work machine specified by the acquired model information.

In step S108, the calculation unit 222 acquires, from the storage unit 23, the performance data table corresponding to the attitude condition and/or work state information acquired from the request acquisition unit 221. At this time, the calculation unit 222 may acquire, from the storage unit 23, a plurality of performance data tables corresponding to the acquired attitude condition and/or work state information.

Note that in step S108, the calculation unit 222 may acquire, from the storage unit 23, the performance data table on the basis of the specification data acquired in step S107 together with the attitude condition and/or work state information.

In step S109, the calculation unit 222 calculates the rated total load on the basis of the parameter acquired from the client terminal T, the calculation expression (interpolation calculation expression) acquired from the storage unit 23, the performance data table, and the specification data. Then, the calculation unit 222 sends the calculation result to the response issuance unit 223.

In step S109, if the rated total load corresponding to the parameter included in the request can be directly obtained from the performance data table, the calculation unit 222 may not use the calculation expression (interpolation calculation expression) in step S109. However, if the rated total load corresponding to the parameter included in the request cannot be directly obtained from the performance data table, the calculation unit 222 acquires the rated total load by performing the above-described interpolation calculation using the calculation expression (interpolation calculation expression).

In step S110, the response issuance unit 223 generates a response on the basis of the calculation result acquired from the calculation unit 222. Then, the response issuance unit 223 transmits the generated response to the client terminal T via the communication unit 21.

The above is the processing of the server S1 having received the request from the client terminal T. Next, the processing of the client terminal T (assistance module M) having received the response from the server S1 will be described.

In step S111, the communication unit 13 receives a response from the server S1. Then, the communication unit 13 sends the received response to the second control unit 17. The response is sent to the display assistance control unit 175 of the assistance control unit 172 via the communication control unit 171.

In step S112, the display assistance control unit 175 analyzes the response acquired from the communication control unit 171, and reflects the calculation result (in the case of this operation example, rated total load) of the server S1 included in the response on the display of the display unit 12.

Figure 8C:
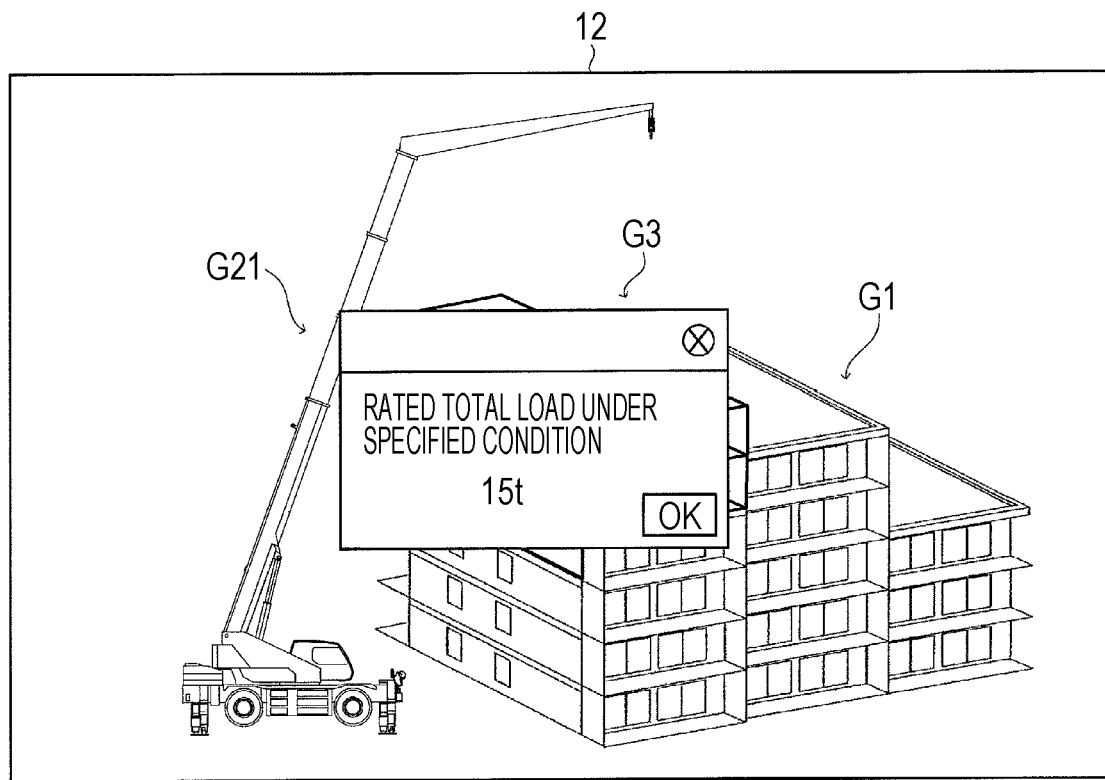
FIG. 8C is a view illustrating an example of an image displayed on the display unit.

For example, the display assistance control unit 175 causes the display unit 12 to display a notification image G3 notifying the rated total load presented in FIG. 8C. Note that the notification image G3 may be generated by the assistance module M (e.g., display assistance control unit 175) or by the BIM application A (e.g., BIM control unit 161).

In the case where the notification image G3 is generated by the BIM application A, the display assistance control unit 175 sends in step S112 the calculation result of the server S1 (in the case of this operation example, rated total load) to the BIM application A (specifically, BIM control unit 161). In the operation of the BIM assistance system BS in this operation example as described above, the order of the operations may be appropriately changed within a technically consistent range.

(Action/Effect of Operation Example 1)

According to this operation example as described above, only by inputting the performance information request (display request for rated total load) from the BIM application A, the operator can find the rated total load of the work machine image G21 (see FIG. 8B) whose attitude has been decided in the display unit 12. Thus, the operator can know the rated total load of the crane displayed on the display unit 12 without performing a cumbersome work such as referring to the rated total load table provided from the work machine manufacturer. Therefore, the operator can efficiently perform a more detailed construction plan work in consideration of the rated total load of the crane.

In the construction plan work, the operator sometimes judges whether or not the crane work is possible by comparing the rated total load acquired from the server with the hoisting load. The operator can efficiently judge whether or not the crane work is possible by performing the operation described in the operation example 1 in the BIM application A. When it is judged that the crane work cannot be carried out, the operator can efficiently decide the optimum work state by performing and reexamining change of the attitude of the crane, change of the work state of the crane, change of the installation place of the crane, and/or change of the model of the crane, and the like.

Note that when the operator makes a display request for the moment load factor (see A-2 of Table 2) by the BIM assistance system BS, the basic operation of the BIM assistance system is the same as that of the operation example 1 described above. When the operator makes a display request for the moment load factor, the parameter automatically acquired by the information acquisition unit 173 in step S102 of FIG. 7A is the parameter (parameter presented in 2-B of Table 2) presented in column B of the Table 4 below.

TABLE 4

| A (performance information request) | B (parameters) | C (performance information) |
|---|---|---|
| 2 Display request for moment load factor | Work machine id (model, specification number, or serial number) Work state (on-tire work and outrigger work) Outrigger overhang width Boom information (type, hoist angle, length, and turn angle) Jib information (type, hoist angle, and length) Hook information Number of wire hooks Lifting load Counterweight information | Moment load factor |

When the operator makes a display request (see A-3 of Table 2) for the rated total load at the maximum moment load factor in the BIM assistance system BS, the basic operation of the BIM assistance system is the same as that of the operation example 1 described above. When the operator makes a display request for the rated total load at the maximum moment load factor, the parameter automatically acquired by the information acquisition unit 173 in step S102 of FIG. 7A is the parameter (parameter presented in 3-B of Table 2) presented in column B of Table 5 below.

TABLE 5

| A (performance information request) | B (parameters) | C (performance information) |
|---|---|---|
| 3 Display request for rated total load at maximum moment load factor | Work machine id (model, specification number, or serial number) Work state (on-tire work and outrigger work) Outrigger overhang width Boom information (type, hoist angle, length, and turn angle) Jib information (type, hoist angle, and jib length) Hook information Number of wire hooks Moment load factor Counterweight information | Rated total load |

Furthermore, when the operator makes an outrigger jack reaction force display request (see A-8 of Table 2) by the BIM assistance system BS, the basic operation of the BIM assistance system is the same as that of the operation example 1 described above. When the operator makes a display request for an outrigger jack reaction force, the parameter automatically acquired by the information acquisition unit 173 in step S102 of FIG. 7A is the parameter (parameter presented in 8-B of Table 2) presented in column B of Table 6 below.

TABLE 6

| A (performance information request) | B (parameters) | C (performance information) |
|---|---|---|
| 8 Display request for reaction force of outrigger jack | Work machine id (model, specification number, or serial number) Outrigger overhang width Boom information (type, hoist angle, length, and turn angle) Jib information (type, hoist angle, and length) Hook information Number of wire hooks Lifting load Counterweight information | Reaction force value of outrigger jack |

Addition of Operation Example 1

Note that the display assistance control unit 175 may determine whether or not the crane work can be performed on the basis of the acquired rated total load and hoisting load. As a result, when it is determined that the crane work cannot be performed, information notifying that the crane work cannot be performed may be displayed on the display unit 12.

In the operation example 1 described above, the operator can request, to the server S1, a determination result of whether or not the work machine displayed on the display unit 12 can perform the lifting work (hereinafter referred to as a "determination on whether or not the work is possible"). When requesting the result of determination on whether or not the work is possible, the parameter included in the request includes work information. The work information is information indicating a work scheduled to be executed by the work machine displayed on the display unit 12.

Specifically, in step S102, the operator inputs, from the input unit 11, a display request (performance information request) for determination on whether or not the work is possible. Then, in step S102, the information acquisition unit 173 acquires, from the BIM control unit 161, the parameter corresponding to the acquired performance information request. Note that the parameter acquired in step S102 includes hoisting load information.

Next, on the basis of the rated total load calculated in step S109 and the hoisting load information included in the request, the server S1 having received the request determines whether or not the lifting work is possible. Then, the response including the determination result (performance information) is transmitted to the client terminal T.

The display assistance control unit 175 having acquired the response displays the determination result included in the response on the display unit 12. In accordance with the determination result, the display unit 12 displays information indicating that the lifting work is possible or information indicating that the lifting work is impossible.

Operation Example 2

Figure 9:
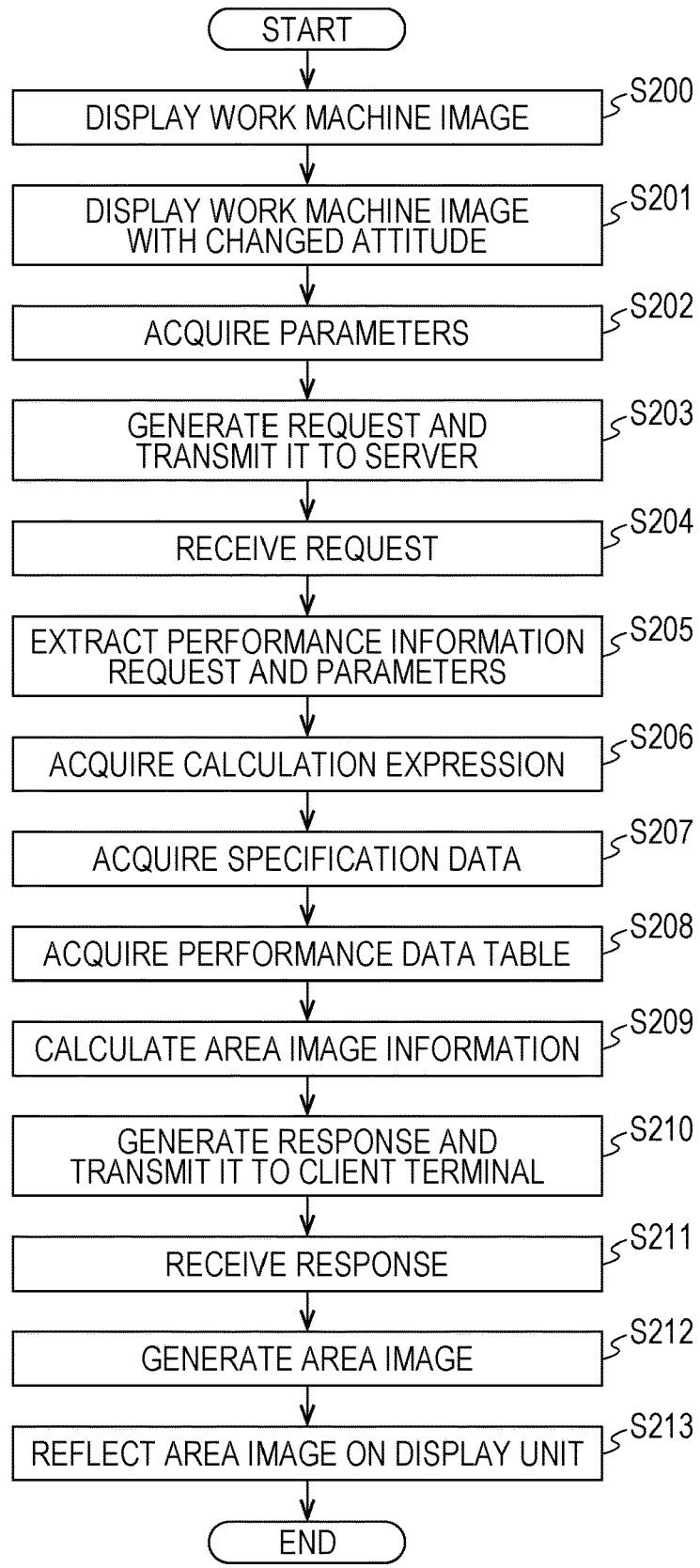
FIG. 9 is a flowchart presenting an example of the operation of the BIM assistance system.

Next, an example of the operation of the BIM assistance system BS will be described with reference to FIGS. 9 and 10A to 10C. FIG. 9 is a flowchart presenting the operation of the BIM assistance system BS when an area image indicating the movement range of the hoisting load lifted by the work machine in the image displayed on the display unit 12 (hereinafter referred to as an "area image") is displayed on the display unit 12 (see A-6 of Table 2).

In the operation example 2, after deciding the work state of the work machine displayed on the display unit 12, the operator requests an image indicating the movable range corresponding to the work state of the work machine (area image presenting the movement range) to one server selected from the servers S1 to S4. In the description of this operation example, the work state of the work machine means a state in which the attitude of the work machine has been decided and a state in which the hoisting load to be conveyed by the work machine has been decided.

By comparing the area image showing the acquired movement range with the conveyance target position of the hoisting load, the operator can determine whether or not the crane can convey the hoisting load to the conveyance target position in the work state of the work machine decided by the operator. The operation of the BIM assistance system BS in this operation example will be described below.

Figure 10A:
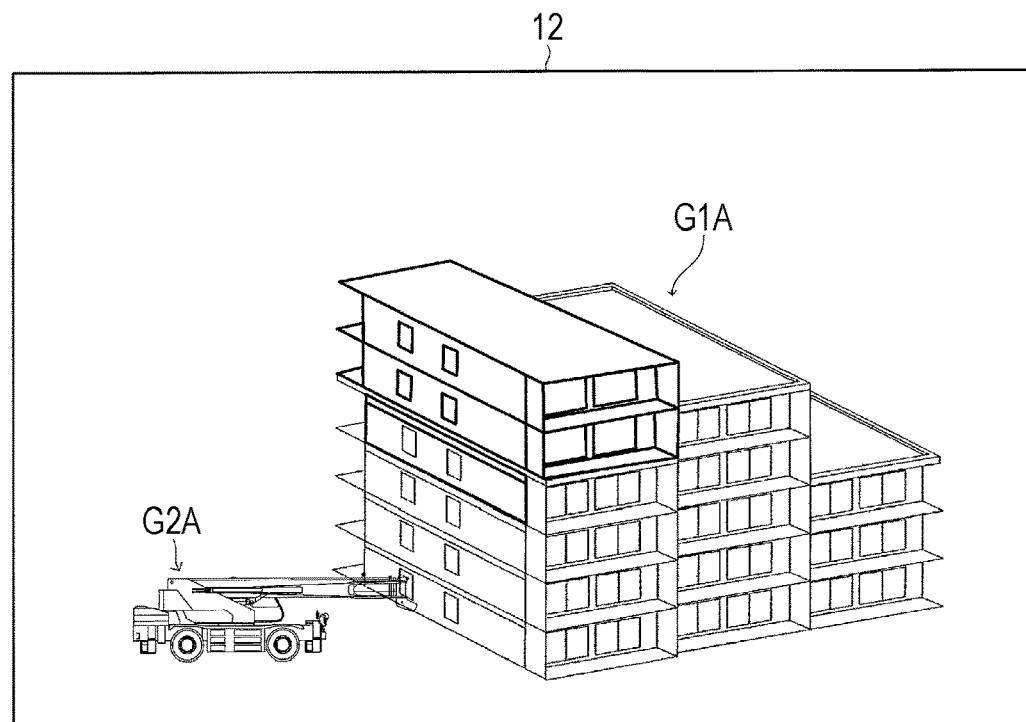
FIG. 10A is a view illustrating an example of an image displayed on the display unit.

First, in step S200, only a building image G1A illustrated in FIG. 10A is displayed on the display unit 12. Such the building image G1A may be an image created by the operator by using the BIM application A or may be an image displayed by reading the information stored in the storage unit 14.

In step S200, in order to display the work machine image on the display unit 12, the operator inputs a display instruction of the work machine image from the input unit 11.

In step S200, when the input unit 11 receives input of a display instruction of the work machine image, the BIM control unit 161 controls the display control unit 162 to cause the display unit 12 to display the work machine image G2A illustrated in FIG. 10A. Note that the operation of the operator and the processing of the BIM assistance system BS in step S200 are the same as those in step S100 of FIG. 7A described earlier.

In step S201, the operator inputs the attitude decision operation described earlier.

Figure 10B:
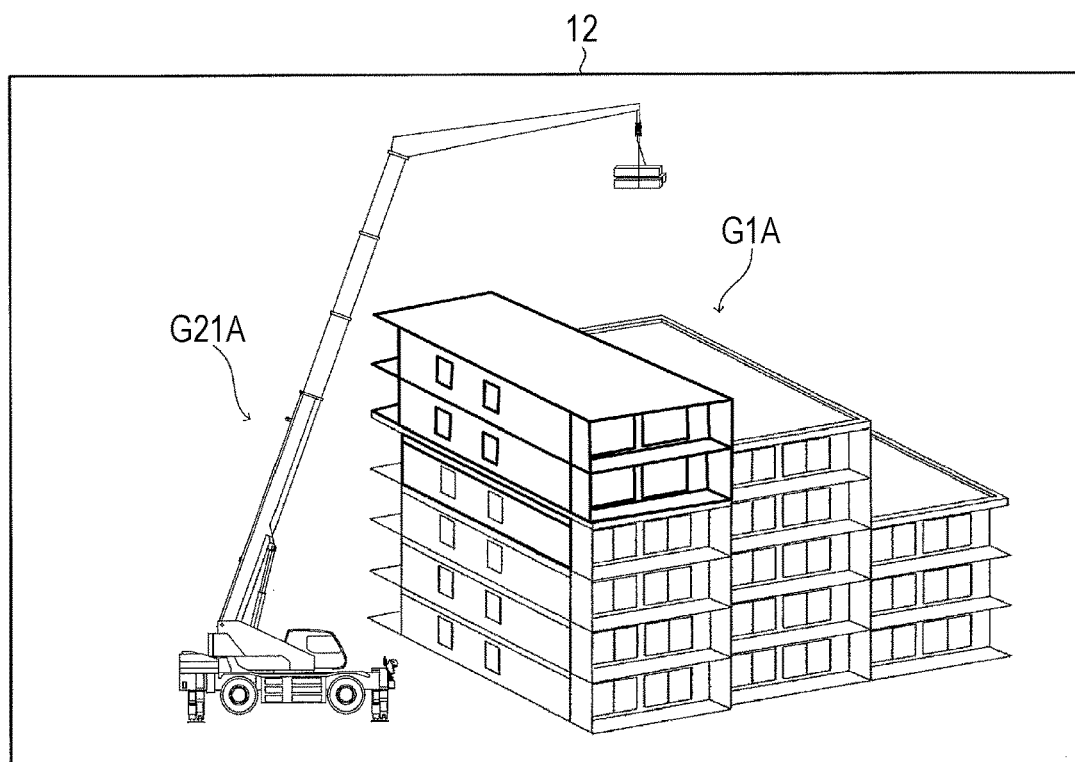
FIG. 10B is a view illustrating an example of an image displayed on the display unit.

In step S201, when the input unit 11 receives the input of the attitude decision operation, the BIM control unit 161 reflects the attitude decision operation on the work machine image G2A of the display unit 12. Then, as illustrated in FIG. 10B, the display unit 12 displays a work machine image G21A in which the attitude is changed from that in the work machine image G2A illustrated in FIG. 10A. Note that the operation of the operator and the processing of the BIM assistance system BS in step S201 are the same as those in step S101 of FIG. 7A described earlier.

In step S202, the operator inputs, from the input unit 11, a display request (performance information request) for the area image to the display unit 12. For example, the operator inputs a display request for the area image from the input screen popped up on the display unit 12.

In step S202, when the input unit 11 receives the performance information request, the information acquisition unit 173 acquires, from the BIM control unit 161, the parameters corresponding to the acquired performance information request. In step S202, the information acquisition unit 173 is only required to acquire, from the BIM control unit 161, at least the parameter necessary for the calculation of the performance information specified in the performance information request.

The parameter automatically acquired by the information acquisition unit 173 in step S202 is the parameter (see 6-B of Table 2) presented in column B of Table 7 below.

TABLE 7

| A (performance information request) | B (parameters) | C (performance information) |
|---|---|---|
| 6 Display request for work area work machine image | Work machine id (model, specification number, or serial number) Work state (on-tire work and outrigger work) Outrigger overhang width Boom information (type) Jib information (type) Hook information Number of wire hooks Lifting load Counterweight information | Information on work area work machine image |

Then, the information acquisition unit 173 sends the acquired information to the request issuance unit 174. Note that the operation of the operator for displaying the area image on the display unit 12 ends at step S202. The subsequent processing is automatically performed between the client terminal T and the servers S1 to S4. That is, in this operation example, when the operator inputs a display request for the area image via the BIM application A, the area image is automatically displayed on the display unit 12.

In step S203, the request issuance unit 174 acquires, from the third storage unit 143, the server specifying information (e.g., the URI of the server) for specifying the server corresponding to the work machine image (i.e., the work machine image G21 of FIG. 8B) specified by the acquired model information.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information.

The processing of the server S1 having received a request from the client terminal T will be described below.

In step S204, the communication unit 21 receives the request. Then, the communication unit 21 sends the request to the request acquisition unit 221.

In step S205, the request acquisition unit 221 extracts the performance information request and parameter from the acquired request. Then, the request acquisition unit 221 sends the extracted information to the calculation unit 222.

In step S206, the calculation unit 222 acquires, from the storage unit 23, the calculation expression corresponding to the performance information request and model information acquired from the request acquisition unit 221.

In step S207, the calculation unit 222 acquires, from the storage unit 23, the specification data corresponding to the work machine specified by the acquired model information.

In step S208, the calculation unit 222 acquires, from the storage unit 23, the performance data table corresponding to the attitude condition and/or work state information acquired from the request acquisition unit 221. At this time, the calculation unit 222 may acquire, from the storage unit 23, a plurality of performance data tables corresponding to the acquired attitude condition and/or work state information. Note that in step S208, the calculation unit 222 may acquire, from the storage unit 23, the performance data table on the basis of the specification data acquired in step S207 together with the attitude condition and/or work state information.

In step S209, the calculation unit 222 calculates and obtains information on the area image (hereinafter referred to as "area image information") on the basis of the attitude condition and parameter acquired from the client terminal T and the calculation expression, performance data table, and specification data acquired from the storage unit 23. Then, the calculation unit 222 sends the calculation result to the response issuance unit 223.

Note that the area image information calculated in step S209 is used for generation of an area image by the area image processing unit 176 of the assistance module M.

In step S210, the response issuance unit 223 generates a response on the basis of the calculation result acquired from the calculation unit 222. Then, the response issuance unit 223 transmits the generated response to the client terminal T via the communication unit 21.

Next, the processing of the client terminal T having received the response from the server S1 will be described.

In step S211, the communication unit 13 receives a response from the server S1. Then, the communication unit 13 sends the received response to the second control unit 17. The response is sent to the area image processing unit 176 via the communication control unit 171 and the display assistance control unit 175.

In step S212, the area image processing unit 176 generates an area image on the basis of the area image information acquired from the display assistance control unit 175. Then, the area image processing unit 176 sends the generated area image to the display assistance control unit 175. Note that the area image generated in this operation example is an area image related to the movable area of the hook. However, the generated area image may be an area image related to the movable area of the lifting tool described earlier and/or an area image related to the movable area of the hoisting load.

In step S213, the display assistance control unit 175 reflects the area image acquired from the area image processing unit 176 on the display of the display unit 12.

Figure 10C:
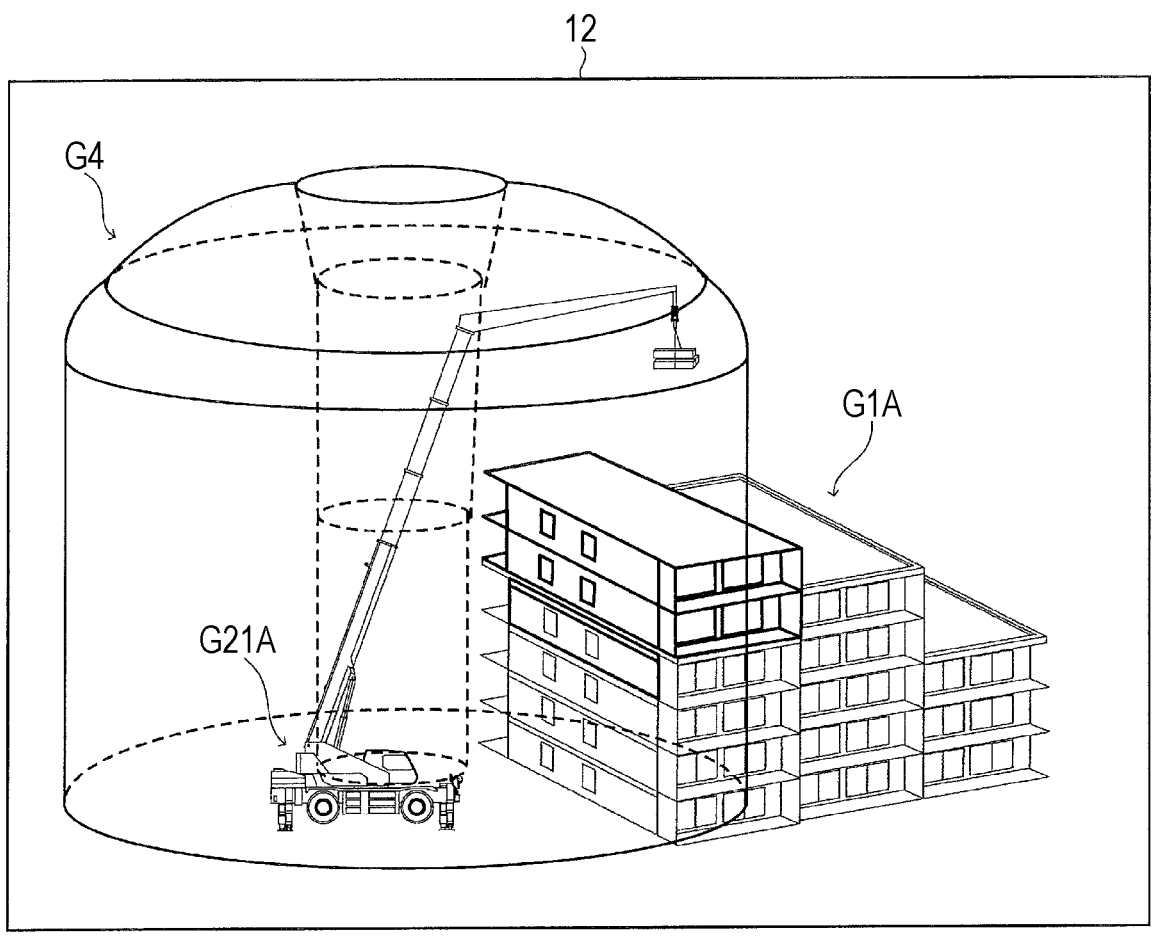
FIG. 10C is a view illustrating an example of an image displayed on the display unit.

For example, the display assistance control unit 175 causes the display unit 12 to display an area image G4 presented in FIG. 10C. Note that the area image G4 may be generated by the assistance module M (area image processing unit 176) or may be generated by the BIM application A (e.g., BIM control unit 161) as described above.

In the case where the area image G4 is generated by the BIM application A, the display assistance control unit 175 sends in step S211 the calculation result acquired from the server S1 (in the case of this operation example, area image information) to the BIM application A (specifically, BIM control unit 161).

The area image may be generated by the server S1 (specifically, calculation unit 222). In this case, the response including the area image (performance information) generated by the calculation unit 222 is transmitted from the server 1 to the client terminal T.

The display assistance control unit 175 having acquired the response reflects the area image included in the response on the display of the display unit 12. In the operation of the BIM assistance system BS in this operation example as described above, the order of the operations may be appropriately changed within a technically consistent range.

Action/Effect of Operation Example 2

In the case of this operation example as described above, when the operator inputs a display request for the area image via the BIM application A, the area image is automatically displayed on the display unit 12. By visually recognizing the area image G4, the operator can intuitively recognize the range in which the hoisting load can be moved by the work machine in the work machine image G21A displayed on the display unit 12. In the case where the conveyance target position of the hoisting load is located outside the area image G4, the operator may change the attitude of the work machine image or may change the model of the work machine. Thus, according to this operation example, the operator can easily carry out a more detailed construction plan in consideration of the movement range of the hoisting load.

Operation Example 3

Figure 11:
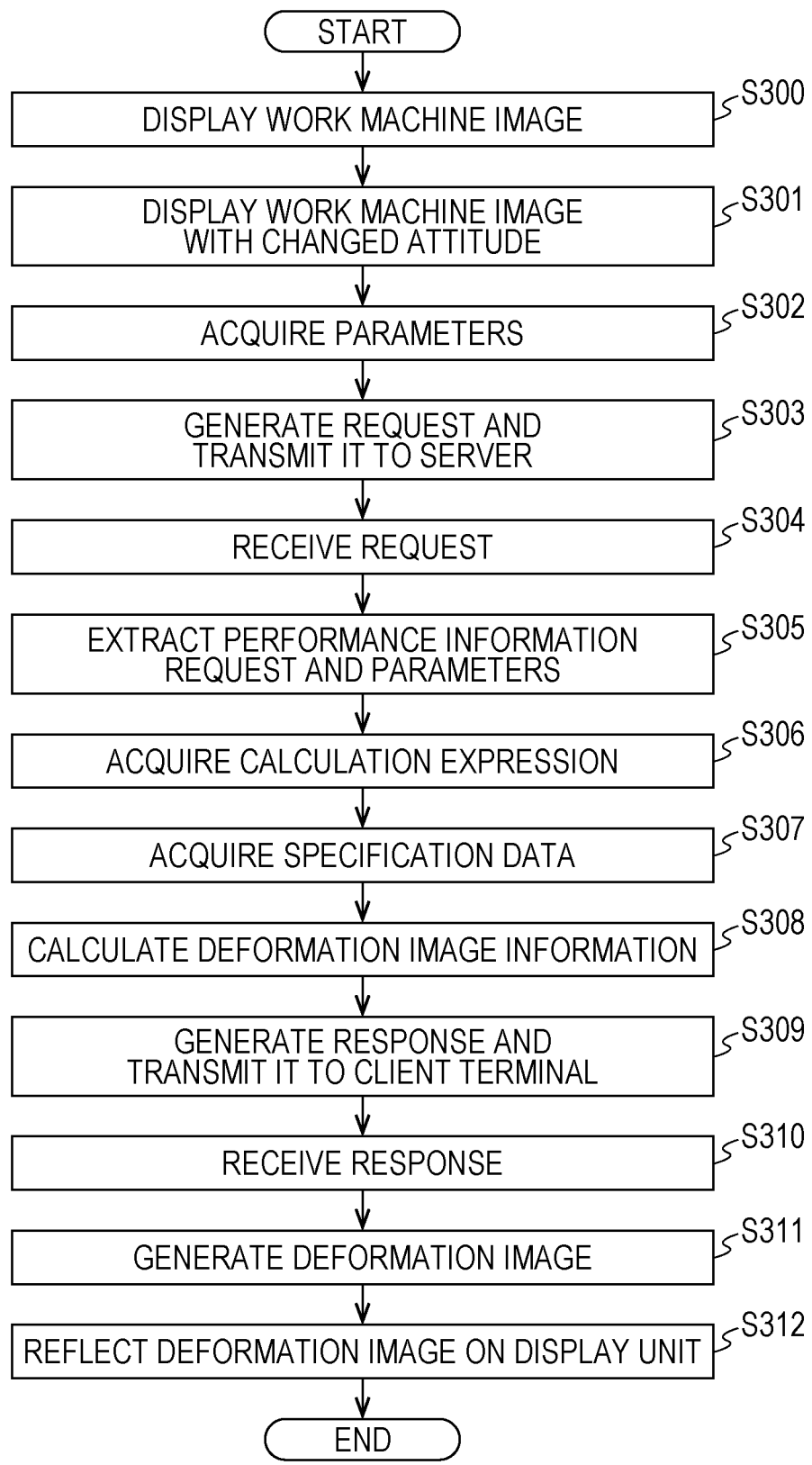
FIG. 11 is a flowchart presenting an example of the operation of the BIM assistance system.

Next, an example of the operation of the BIM assistance system BS will be described with reference to FIGS. 11, 12A, and 12B. FIG. 11 is a flowchart presenting the operation of the BIM assistance system BS when an image of a bent boom (hereinafter referred to as a "deformation image of the boom") and an image of a bent jib (hereinafter referred to as a "deformation image of the jib") are displayed on the display unit 12 (see A-5 of Table 2).

In a conveyance work by the crane, the boom and/or jib of the crane bends on the basis of its own weight, weight of the hook, weight of the wire rope, and the weight of the hoisting load. Therefore, consideration of this bending in advance in the construction plan prevents the interference between the crane and building, and significantly contributes to the improvement of the safety of the actual work and the improvement of the work efficiency.

The operation example 3 is carried out when a construction plan in consideration of bending of the boom and/or jib is carried out. In the operation example 3, after deciding the work state of the work machine displayed on the display unit 12, the operator requests a deformation image of the boom and/or a deformation image of the jib corresponding to the work state of the work machine to one server selected from the servers S1 to S4. In the description of this operation example, the work state of the work machine means a state in which the attitude of the work machine has been decided and a state in which the hoisting load to be conveyed by the work machine has been decided.

The operator can determine whether or not the crane can perform the conveyance work in the work state of the work machine decided by the operator by looking at the positional relationship between the acquired deformation image of the boom and/or deformation image of the jib and the building image displayed on the display unit 12. The operation of the BIM assistance system BS in this operation example will be described below.

Figure 12A:
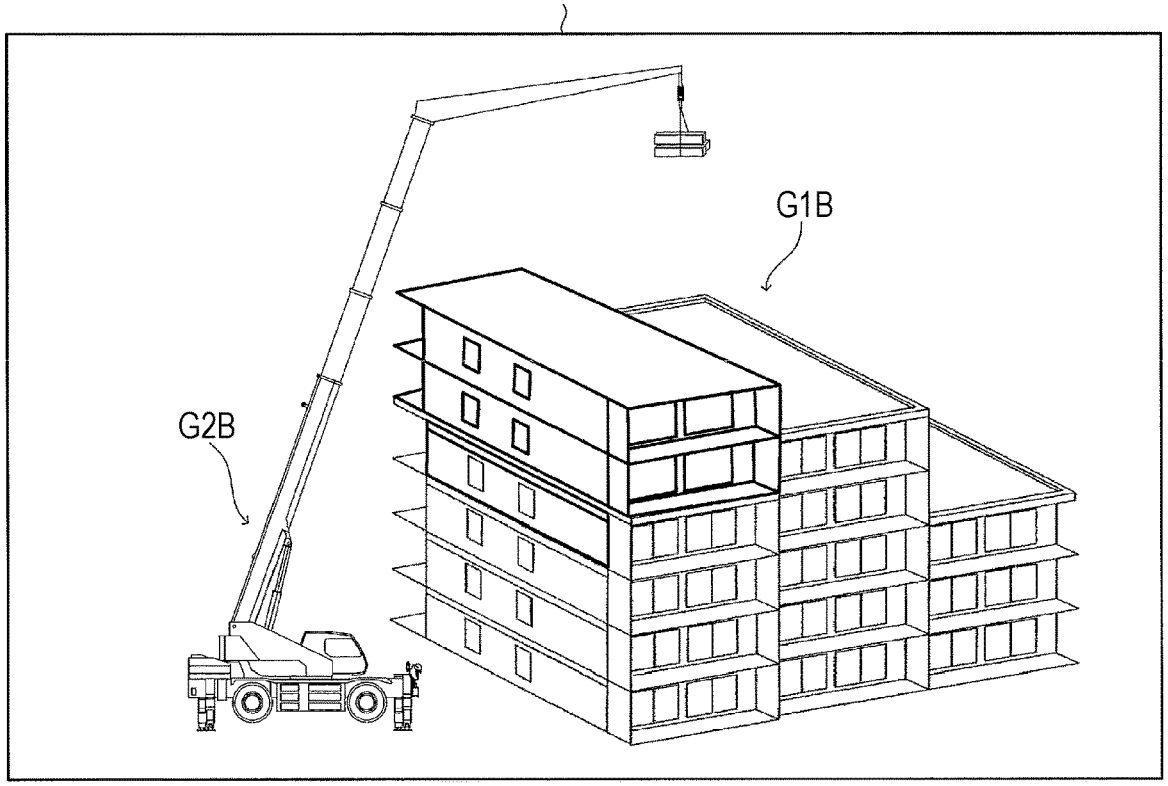
FIG. 12A is a view illustrating an example of an image displayed on the display unit.

First, in step S300, only a building image G1B illustrated in FIG. 12A is displayed on the display unit 12. Such the building image G1B may be an image created by the operator by using the BIM application A or may be an image displayed by reading the information stored in the storage unit 14.

In step S300, in order to display the work machine image on the display unit 12, the operator inputs a display instruction of the work machine image from the input unit 11.

In step S300, when the input unit 11 receives input of a display instruction of the work machine image, the BIM control unit 161 controls the display control unit 162 to cause the display unit 12 to display the work machine image (not illustrated) of the basic attitude.

In step S301, the operator inputs the attitude decision operation described earlier.

In step S301, when the input unit 11 receives the input of the attitude decision operation, the BIM control unit 161 reflects the attitude decision operation on the work machine image (not illustrated) of the display unit 12. Then, the display unit 12 displays a work machine image G2B illustrated in FIG. 12A. Note that the operation of the operator and the processing of the BIM assistance system BS in step S301 are the same as those in step S101 of FIG. 7A described earlier.

The work machine image G2B illustrated in FIG. 12A is an image in a state where the work attitude of the work machine has been decided. However, the work machine image G2B illustrated in FIG. 12A is an image in which the deformation of the boom and jib due to the influence of the load acting on the boom and jib (e.g., hoisting load) is not reflected. Note that the hoisting load may be the sum of the hoisting load and the weight of the hook.

In the image illustrated in FIG. 12A, the boom and jib of the work machine image G2B do not interfere with the building image G1B. However, in the work with an actual machine, the boom and jib bend due to the influence of the hoisting load and the like, and sometimes interfere with the building.

By displaying the deformation image of the boom and/or jib on the display unit 12, it becomes possible for the BIM application A to make the construction plan in consideration of the bending of the boom and jib. Note that in a state where the jib is not used, only the deformation image of the boom may be displayed on the display unit 12.

In step S302, the operator inputs, from the input unit 11, a display request for the deformation image of the boom and/or jib (hereinafter, referred to as a "display request for the deformation image"). For example, the operator inputs a display request (performance information request) for the deformation image from the input screen popped up on the display unit 12. The operator may input the display request for the deformation image by checking the check box for bending display displayed on the display unit 12.

In step S302, when the input unit 11 receives the performance information request, the information acquisition unit 173 acquires, from the BIM control unit 161, the parameters corresponding to the acquired performance information request. In step S302, the information acquisition unit 173 is only required to acquire, from the BIM control unit 161, at least the parameter necessary for the calculation of the performance information specified in the performance information request.

The parameter automatically acquired by the information acquisition unit 173 in step S302 is the parameter (see 5-B of Table 2) presented in column B of Table 8 below.

TABLE 8

| A (performance information request) | B (parameters) | C (performance information) |
|---|---|---|
| 5 Display request for deformation image of boom and deformation image of jib | Work machine id (model, specification number, or serial number) Work state (on-tire work and outrigger work) Outrigger overhang width Boom information (type, hoist angle, length, and turn angle) Jib information (type, hoist angle, and length) Hook information Number of wire hooks Lifting load Counterweight information | Deformation image information of boom and deformation image information of jib |

Then, the information acquisition unit 173 sends the acquired information to the request issuance unit 174. Note that the operation of the operator for displaying the deformation image of the boom and the deformation image of the jib on the display unit 12 ends at step S302. The subsequent processing is automatically performed between the client terminal T and the servers S1 to S4.

In step S303, the request issuance unit 174 acquires, from the third storage unit 143, the server specifying information (e.g., the URI of the server) for specifying the server corresponding to the work machine image (i.e., the work machine image G2B illustrated in FIG. 12A) specified by the acquired model information.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information. Note that the parameter included in the request is only required to include at least information necessary for the calculation of the performance information specified by the performance information request.

Next, the processing of the server S1 having received a request from the client terminal T will be described.

In step S304, the communication unit 21 receives the request. Then, the communication unit 21 sends the request to the request acquisition unit 221.

In step S305, the request acquisition unit 221 extracts the performance information request and parameter from the acquired request. Then, the request acquisition unit 221 sends the extracted information to the calculation unit 222.

In step S306, the calculation unit 222 acquires, from the storage unit 23, the calculation expression corresponding to the performance information request and model information acquired from the request acquisition unit 221.

In step S307, the calculation unit 222 acquires, from the storage unit 23, the specification data corresponding to the work machine image specified by the acquired model information.

In step S308, the calculation unit 222 calculates and obtains information on the deformation image of the boom and the deformation image of the jib (hereinafter referred to as "deformation image information") on the basis of the attitude condition and parameter acquired from the client terminal T, and the calculation expression and specification data acquired from the storage unit 23. Then, the calculation unit 222 sends the calculation result to the response issuance unit 223.

Note that the deformation image information is, for example, information on a deformation curve of the boom and/or information on a deformation curve of the jib. The deformation curve is a curve in which the deformation of the boom and/or jib is expressed by a sine wave or an n-th order function, for example. The deformation image information may be an inclined straight line (deformation straight line) corresponding to a bending angle of each of the base end side boom, the intermediate boom, and the tip end side boom.

Figure 13A:
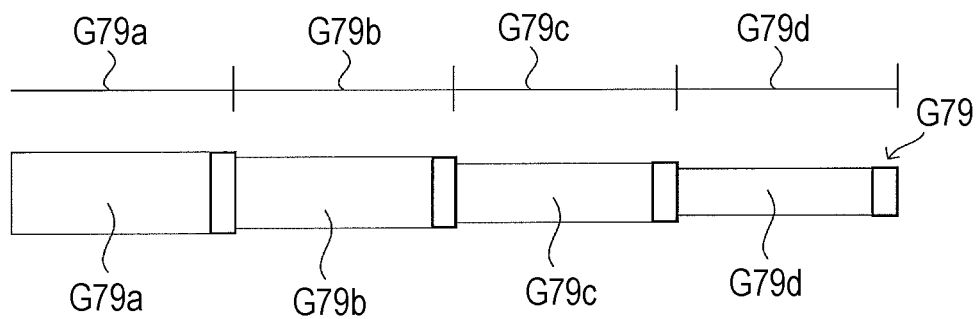
FIG. 13A is a view illustrating an example of an image of an unbent boom.
Figure 13B:
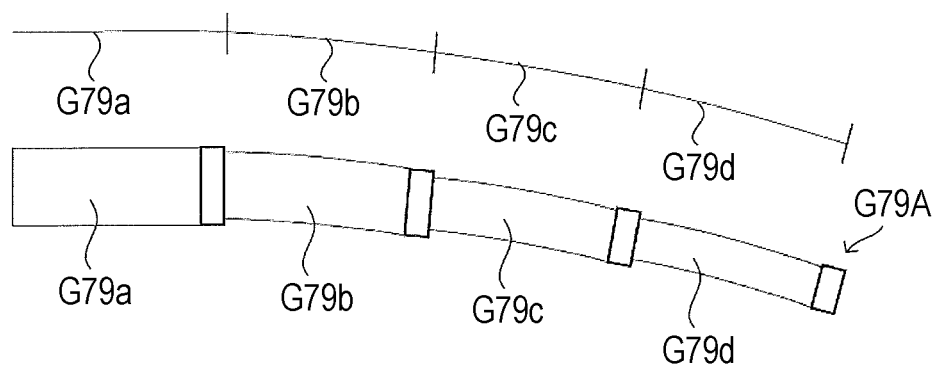
FIG. 13B is a view illustrating an example of an image of a bent boom.
Figure 13C:
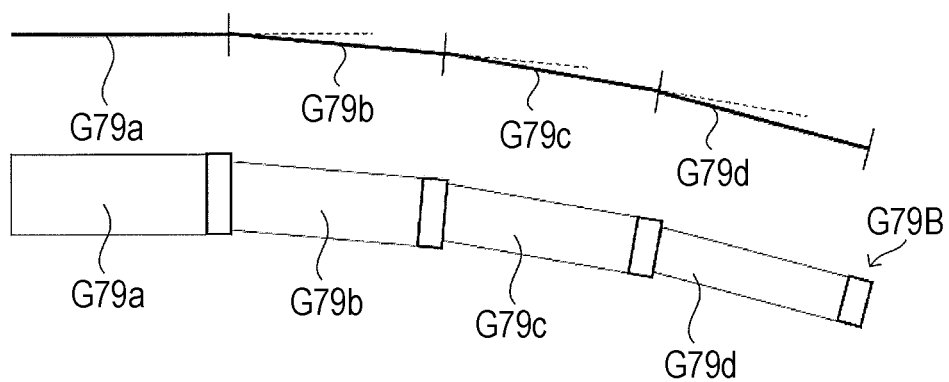
FIG. 13C is a view illustrating an example of an image of a bent boom.

FIG. 13A is a view illustrating an image G79 of the unbent boom. FIGS. 13B and 13C are views illustrating images G79A and G79B of the bent boom.

In the case of the image G79A of the boom illustrated in FIG. 13B, the deformations of an image G79a of the base end side boom, images G79b and G79c of the intermediate boom, and an image G79d of the tip end side boom are obtained on the basis of the curve (deformation curve) represented by a sine wave or an n-th order function.

On the other hand, in the case of the image G79B of the boom illustrated in FIG. 13C, the deformations of the image G79a of the base end side boom, the images G79b and G79c of the intermediate boom, and the image G79d of the tip end side boom are obtained on the basis of the straight line (deformation straight line) inclined corresponding to the bending angle.

Note that the deformation image information calculated in step S308 is used by the deformation image processing unit 177 of the assistance module M to generate a deformation image of the boom and/or a deformation image of the jib.

In step S309, the response issuance unit 223 generates a response on the basis of the calculation result acquired from the calculation unit 222. Then, the response issuance unit 223 sends the generated response to the communication unit 21. The communication unit 21 transmits the acquired response to the client terminal T.

Next, the processing of the client terminal T having received the response from the server S1 will be described.

In step S310, the communication unit 13 receives a response from the server S1. Then, the communication unit 13 sends the received response to the second control unit 17. The response is sent to the deformation image processing unit 177 via the communication control unit 171 and the display assistance control unit 175.

In step S311, the deformation image processing unit 177 generates the deformation image of the boom and the deformation image of the jib on the basis of the deformation image information acquired from the display assistance control unit 175. Then, the deformation image processing unit 177 sends the generated deformation image of the boom and deformation image of the jib to the display assistance control unit 175.

In step S312, the display assistance control unit 175 reflects the deformation image of the boom and the deformation image of the jib acquired from the deformation image processing unit 177 on the display of the display unit 12.

Figure 12B:
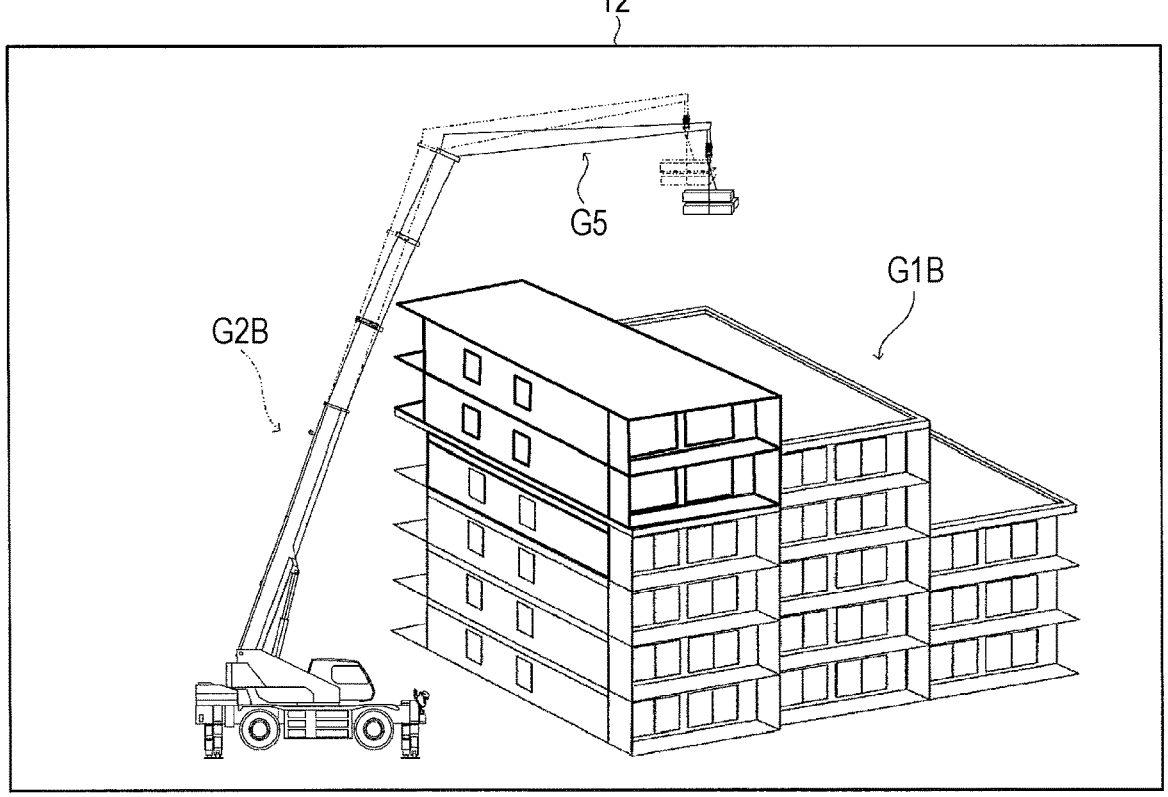
FIG. 12B is a view illustrating an example of an image displayed on the display unit.

For example, the display assistance control unit 175 causes the display unit 12 to display a deformation image G5 presented by the solid line in FIG. 12B. Note that the deformation image G5 may be generated by the assistance module M (deformation image processing unit 177) or may be generated by the BIM application A (e.g., BIM control unit 161) as described above.

In the case where the deformation image G5 is generated by the BIM application A, the display assistance control unit 175 sends in step S310 the calculation result of the server S1 (in the case of this operation example, deformation image information) to the BIM application A (specifically, BIM control unit 161).

The deformation image may be generated by the server S1 (specifically, calculation unit 222). In this case, the response including the deformation image (performance information) generated by the calculation unit 222 is transmitted from the server 1 to the client terminal T. The display assistance control unit 175 having acquired the response reflects the deformation image included in the response on the display of the display unit 12.

Note that as illustrated in FIG. 12B, the display unit 12 presents, by a broken line, the work machine image G2B having an image of the boom and jib in which bending is not reflected (hereinafter referred to as a "pre-deformation image"), and displays, by a solid line, a work machine image (i.e., deformation image G5) having a deformation image of the boom and a deformation image of the jib in which bending is reflected.

The pre-deformation image may not be displayed on the display unit 12. The display mode of the pre-deformation image and the deformation image G5 is not limited to the example presented in FIG. 12B, as long as the display mode can be distinguished.

Any one of the control units of the BIM application A (specifically, BIM control unit 161) and the assistance module M (specifically, assistance control unit 172) may display, on the display unit 12, information indicating that the deformation image interferes with another image displayed on the display unit 12 (e.g., building image G1B) in the case where the deformation image interferes with it. In this case, the one of the control units implements the function of the notification unit. A part of the one of the control units corresponds to an example of the notification unit.

In the operation example 3 described above, the deformation image of the boom and jib when the work machine is a crane has been described. The operation example 3 described above can also be applied to a boom when the work machine is an aerial work vehicle. The operation example 3 described above can also be applied to a boom when the work machine is a concrete pump vehicle. The boom and jib of the crane, the boom of the aerial work vehicle, and the boom of the concrete pump vehicle correspond to an example of the arm.

Action/Effect of Operation Example 3

According to this operation example as described above, the operator can confirm interference between the work machine image in consideration of bending of the boom and bending of the jib and the building image by visually recognizing the deformation image displayed on the display unit 12.

Operation Example 4

Figure 14:
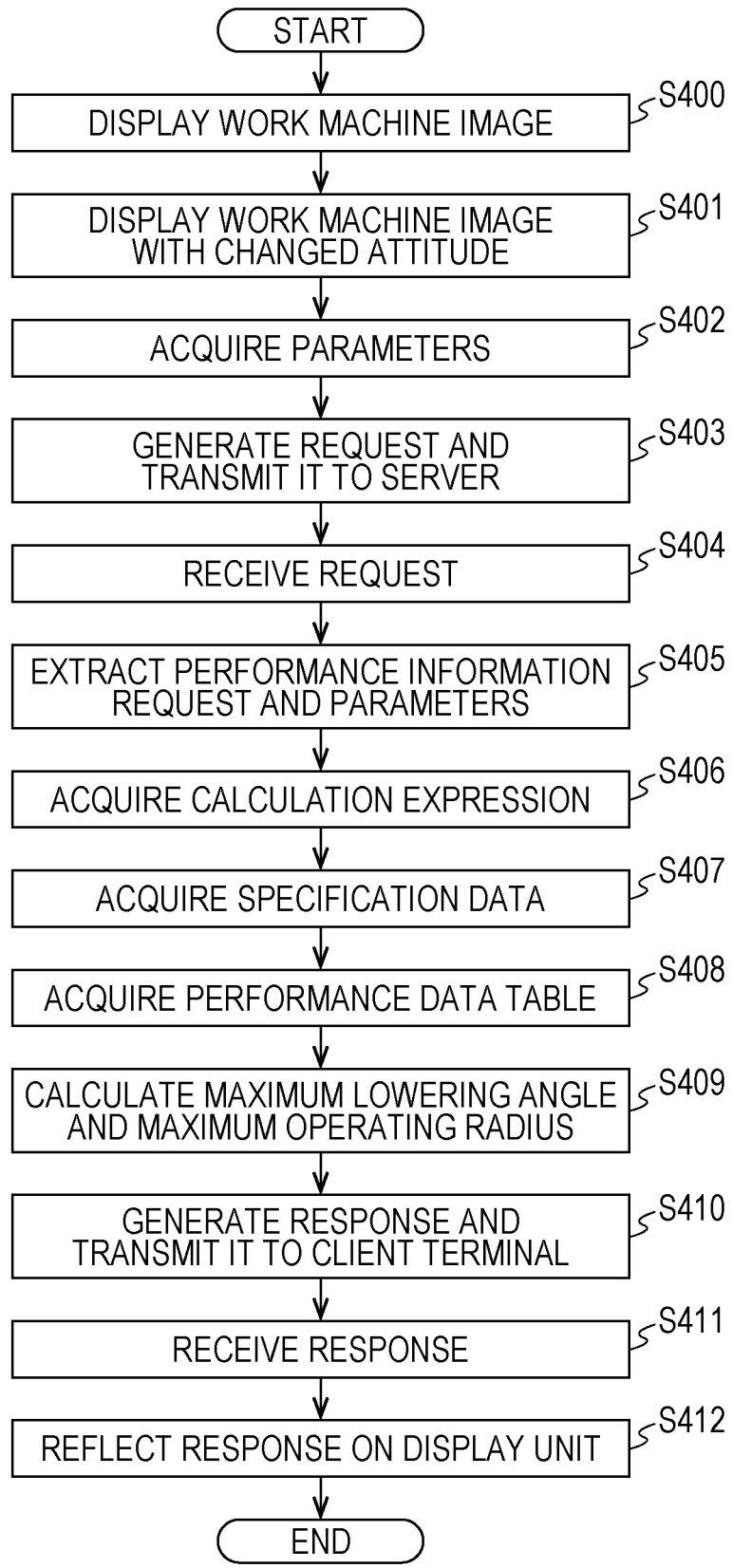
FIG. 14 is a flowchart presenting an example of the operation of the BIM assistance system.

Next, an example of the operation of the BIM assistance system BS will be described with reference to FIGS. 14 to 15B. FIG. 14 is a flowchart presenting the operation of the BIM assistance system BS when the information indicating the maximum lowering angle and maximum operating radius of the boom is displayed on the display unit 12 (see A-4 of Table 2).

In a conveyance work by the crane, the crane sometimes extend the operating radius by lowering the boom in order to convey the hoisting load to the conveyance target position. In the crane, the smaller the hoist angle of the boom becomes, the smaller the rated total load becomes.

Therefore, even when the weight of the hoisting load is smaller than the rated total load in the first state where the hoist angle is large, the weight of the hoisting load sometimes becomes larger than the rated total load in the second state where the hoist angle of the boom is smaller than that in the first state. In this case, the selected crane cannot convey the hoisting load to the conveyance target position. If such a situation occurs in an actual work, replacement of the crane becomes necessary, and there is a possibility that the progress of the work becomes remarkably delayed.

When making a work plan using a plurality of cranes, in order to cover the whole area of the construction site with the minimum number of cranes, it is necessary to consider the operating radius at the specified lifting load of each crane. Therefore, consideration of the maximum lowering angle and maximum operating radius in the construction plan significantly contributes to the improvement of the safety of the actual work and the improvement of the work efficiency.

The operation example 4 is carried out when a construction plan in consideration of the maximum lowering angle and maximum operating radius of the crane. In the operation example 4, after deciding the work state of the work machine displayed on the display unit 12, the operator requests the maximum lowering angle and maximum operating radius of the boom corresponding to the work state of the work machine to one server selected from the servers S1 to S4. In the description of this operation example, the work state of the work machine means a state in which the attitude of the work machine has been decided and a state in which the hoisting load to be conveyed by the work machine has been decided.

The operator can determine whether or not the crane can perform the conveyance work in the work state of the work machine decided by the operator by looking at the positional relationship between the acquired maximum lowering angle and maximum operating radius of the boom and the conveyance target position. The operation of the BIM assistance system BS in this operation example will be described below.

Figure 15A:
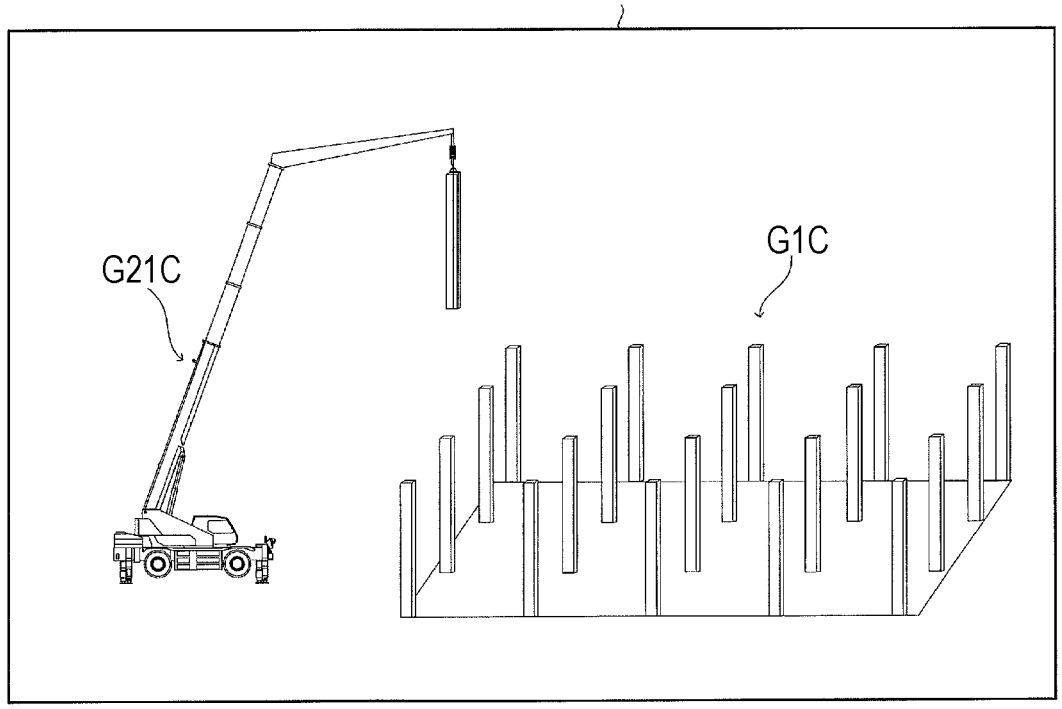
FIG. 15A is a view illustrating an example of an image displayed on the display unit.

First, in step S402 after step S400 and step S401, a building image G1C and a work machine image G21C illustrated in FIG. 15A are displayed on the display unit 12. Steps S401 and S402 are the same as steps S101 and S102 of FIG. 7A described above.

The building image G1C and the work machine image G21C illustrated in FIG. 15A may be images created by the operator by using the BIM application A or may be images stored in the storage unit 14.

In step S402, the operator inputs a display request for the maximum lowering angle and maximum operating radius of the boom (hereinafter referred to as a "display request for the maximum lowering angle and maximum operating radius") via the input unit 11. For example, the operator inputs a display request (performance information request) for the maximum lowering angle and maximum operating radius from the input screen popped up on the display unit 12.

In step S402, when the input unit 11 receives the performance information request, the information acquisition unit 173 acquires, from the BIM control unit 161, the parameters corresponding to the acquired performance information request. In step S402, the information acquisition unit 173 is only required to acquire, from the BIM control unit 161, at least the parameter necessary for the calculation of the performance information specified in the performance information request.

The parameter automatically acquired by the information acquisition unit 173 in step S402 is the parameter (see 4-B of Table 2) presented in column B of Table 9 below.

TABLE 9

| A (performance information request) | B (parameters) | C (performance information) |
|---|---|---|
| 4 Display request for maximum lowering angle and maximum operating radius of boom | Work machine id (model, specification number, or serial number) Work state (on-tire work and outrigger work) Outrigger overhang width Boom information (type, length, and turn angle) Jib information (type, hoist angle, and length) Hook information Number of wire hooks Lifting load Counterweight information | Maximum lowering angle and operating radius of boom |

Then, the information acquisition unit 173 sends the acquired information to the request issuance unit 174. Note that the operation of the operator for displaying the maximum lowering angle and maximum operating radius on the display unit 12 ends at step S402. The subsequent processing is automatically performed between the client terminal T and the servers S1 to S4. That is, in this operation example, when the operator inputs a display request for the maximum lowering angle and maximum operating radius via the BIM application A, the maximum lowering angle and maximum operating radius are automatically displayed on the display unit 12.

In step S403, the request issuance unit 174 acquires, from the third storage unit 143, the server specifying information (e.g., the URI of the server) for specifying the server corresponding to the work machine image (i.e., the work machine image G21C of FIG. 15A) specified by the acquired model information.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information.

Next, the processing of the server S1 having received a request from the client terminal T will be described.

In step S404, the communication unit 21 receives the request. Then, the communication unit 21 sends the request to the request acquisition unit 221.

In step S405, the request acquisition unit 221 extracts the performance information request and parameter from the acquired request. Then, the request acquisition unit 221 sends the extracted information to the calculation unit 222.

In step S406, the calculation unit 222 acquires, from the storage unit 23, the calculation expression corresponding to the performance information request and model information acquired from the request acquisition unit 221.

In step S407, the calculation unit 222 acquires, from the storage unit 23, the specification data corresponding to the work machine image specified by the acquired model information.

In step S408, the calculation unit 222 acquires, from the storage unit 23, the performance data table corresponding to the attitude condition and/or work state information acquired from the request acquisition unit 221. At this time, the calculation unit 222 may acquire, from the storage unit 23, a plurality of performance data tables corresponding to the acquired attitude condition and/or work state information.

Note that in step S408, the calculation unit 222 may acquire, from the storage unit 23, the performance data table on the basis of the specification data acquired in step S407 together with the attitude condition and/or work state information.

In step S409, the calculation unit 222 calculates and obtains information on the maximum lowering angle and maximum operating radius of the boom on the basis of the attitude condition and parameter (attitude condition, work state information, hoisting load information, and component information) acquired from the client terminal T, and the calculation expression, performance data table, and specification data acquired from the storage unit 23. Then, the calculation unit 222 sends the calculation result to the response issuance unit 223.

In step S410, the response issuance unit 223 generates a response on the basis of the calculation result acquired from the calculation unit 222. Then, the response issuance unit 223 sends the generated response to the communication unit 21. Then, the communication unit 21 transmits the acquired response to the client terminal T.

Next, the processing of the client terminal T having received the response from the server S1 will be described.

In step S411, the communication unit 13 receives a response from the server S1. Then, the communication unit 13 sends the received response to the second control unit 17. The response is sent to the display assistance control unit 175 via the communication control unit 171.

In step S412, the display assistance control unit 175 reflects, on the display of the display unit 12, the calculation result (in the case of this operation example, information on the maximum lowering angle and maximum operating radius of the boom) of the server S1 included in the response.

Figure 15B:
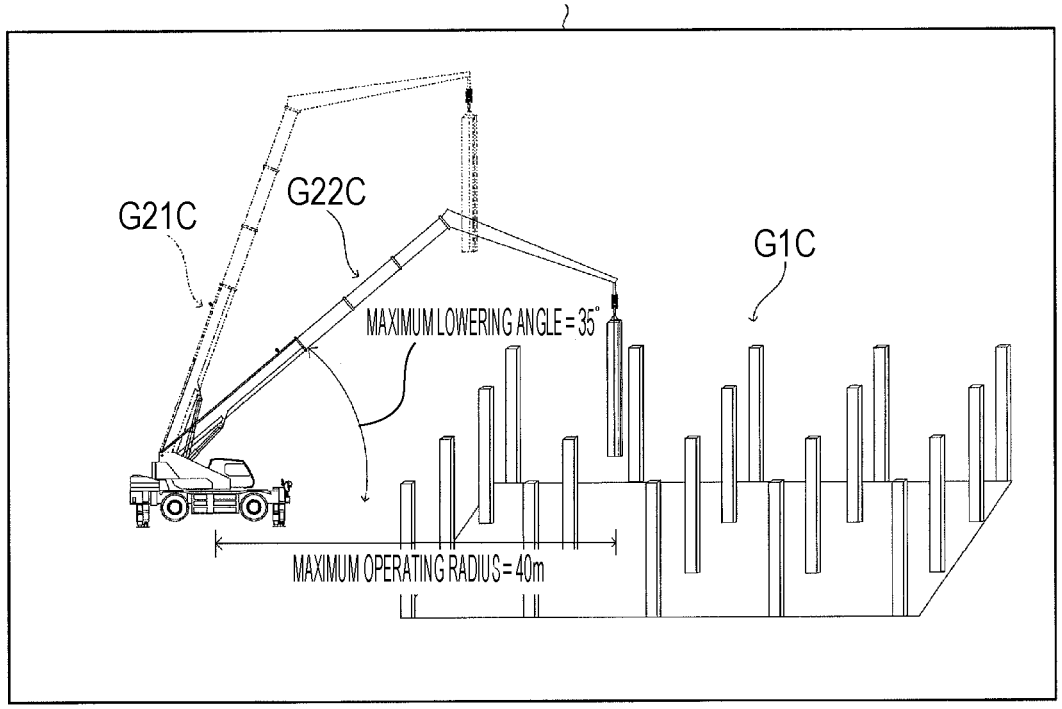
FIG. 15B is a view illustrating an example of an image displayed on the display unit.

For example, as illustrated in FIG. 15B, the display assistance control unit 175 causes the display unit 12 to display a work machine image G22C having the boom in a state of lowering to the maximum lowering angle (hereinafter referred to as a "lowering image"). An example of a method for displaying a lowering image on the display unit 12 will be described.

The display assistance control unit 175 reflects the information on the maximum lowering angle of the boom included in the response onto the hoist angle of the boom in the attribute information of the work machine image G21C displayed on the display unit 12.

Note that this processing may be performed by the BIM control unit 161. In this case, the display assistance control unit 175 sends information on the maximum lowering angle of the boom included in the response to the BIM control unit 161. Then, the BIM control unit 161 reflects the acquired information on the maximum lowering angle of the boom onto the hoist angle of the boom in the attribute information of the work machine image displayed on the display unit 12.

In any case, on the basis of the processing carried out by the display assistance control unit 175, the calculation result of the server S1 included in the response is reflected on the display of the display unit 12.

In step S412, as illustrated in FIG. 15B, the display assistance control unit 175 may display numerical values of the maximum lowering angle and maximum operating radius on the display unit 12. Note that this processing may also be performed by the BIM control unit 161.

Although not illustrated, the display assistance control unit 175 may display, on the display unit 12 in step S412, a notification image for notifying the maximum lowering angle and maximum operating radius.

Action/Effect of Operation Example 4

According to this operation example as described above, the operator can intuitively recognize the maximum lowering angle and operating radius of the work machine in the work machine image displayed on the display unit 12. By recognizing the maximum lowering angle and operating radius of the work machine, the operator can intuitively judge whether or not the selected work machine is a work machine suitable for conveyance of the hoisting load. For example, if the conveyance target position of the hoisting load is not included in the acquired operating radius, the operator can judge that the selected work machine alone cannot convey the hoisting load to the conveyance destination. On the basis of such determination result, the operator can change the work machine to use to a work machine having a larger operating radius. Alternatively, on the basis of the determination result described above, the operator can also select a procedure in which after the selected work machine conveys the hoisting load to any position within the operating radius of this work machine, another work machine conveys the hoisting load from this relay position to the conveyance destination.

When making a work plan using a plurality of cranes, by acquiring the operating radius for the specified lifting load of each crane, it is possible to know the placement of cranes capable of covering the whole area of the construction site with the minimum number of cranes. For example, by drawing the operating radius of each crane on a plan view of the construction site, the operator can intuitively recognize the placement of cranes capable of covering the whole area of the construction site with the minimum number of cranes. Thus, according to this operation example, the operator can carry out the construction plan work with high accuracy in consideration of the maximum lowering angle and operating radius of the work machine.

Operation Example 5

Next, an example of the operation of the BIM assistance system BS will be described with reference to FIGS. 16A to 16D. Similarly to the operation example 2 described above, this operation example is an example of displaying an area image on the display unit 12. Note that the operation by the operator of the BIM assistance system BS and the operation of the BIM assistance system BS are substantially similar to those in the operation flow (FIG. 9) of the operation example 2 described above. The situation in which this operation example is carried out is similar to the case of the operation example 2 described above.

Figure 16A:
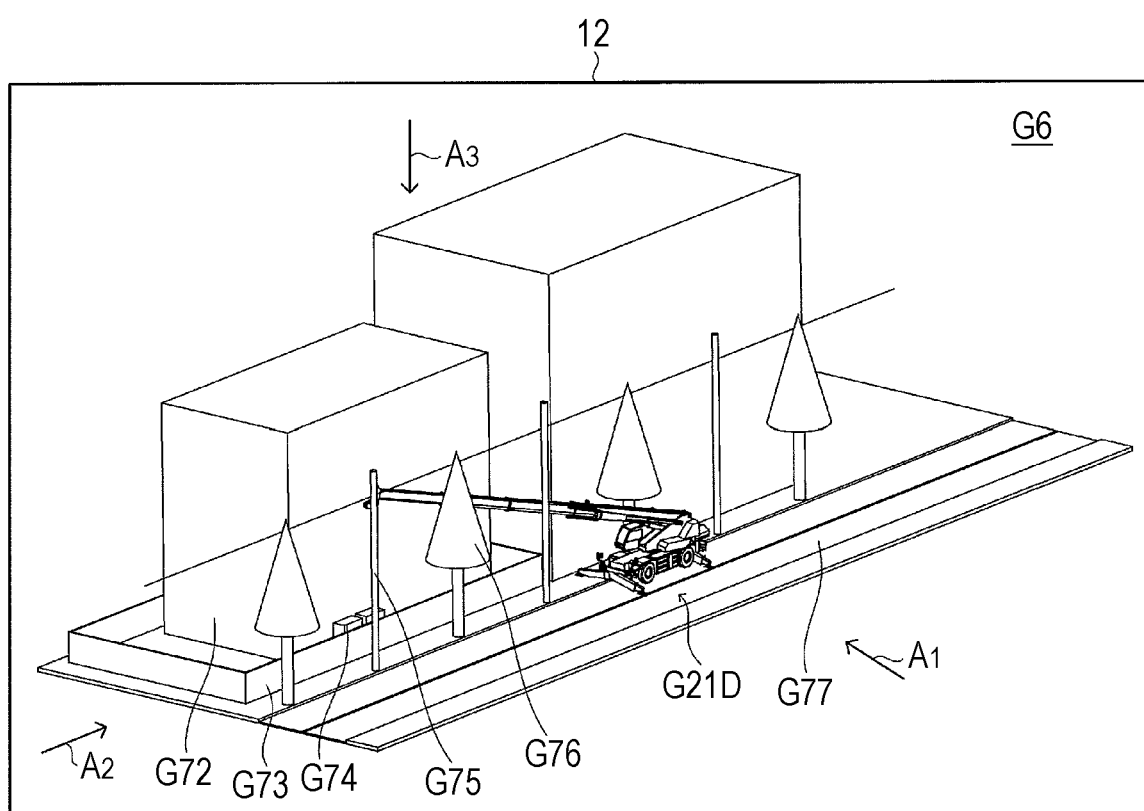
FIG. 16A is a view illustrating an example of an image displayed on the display unit.
Figure 16B:
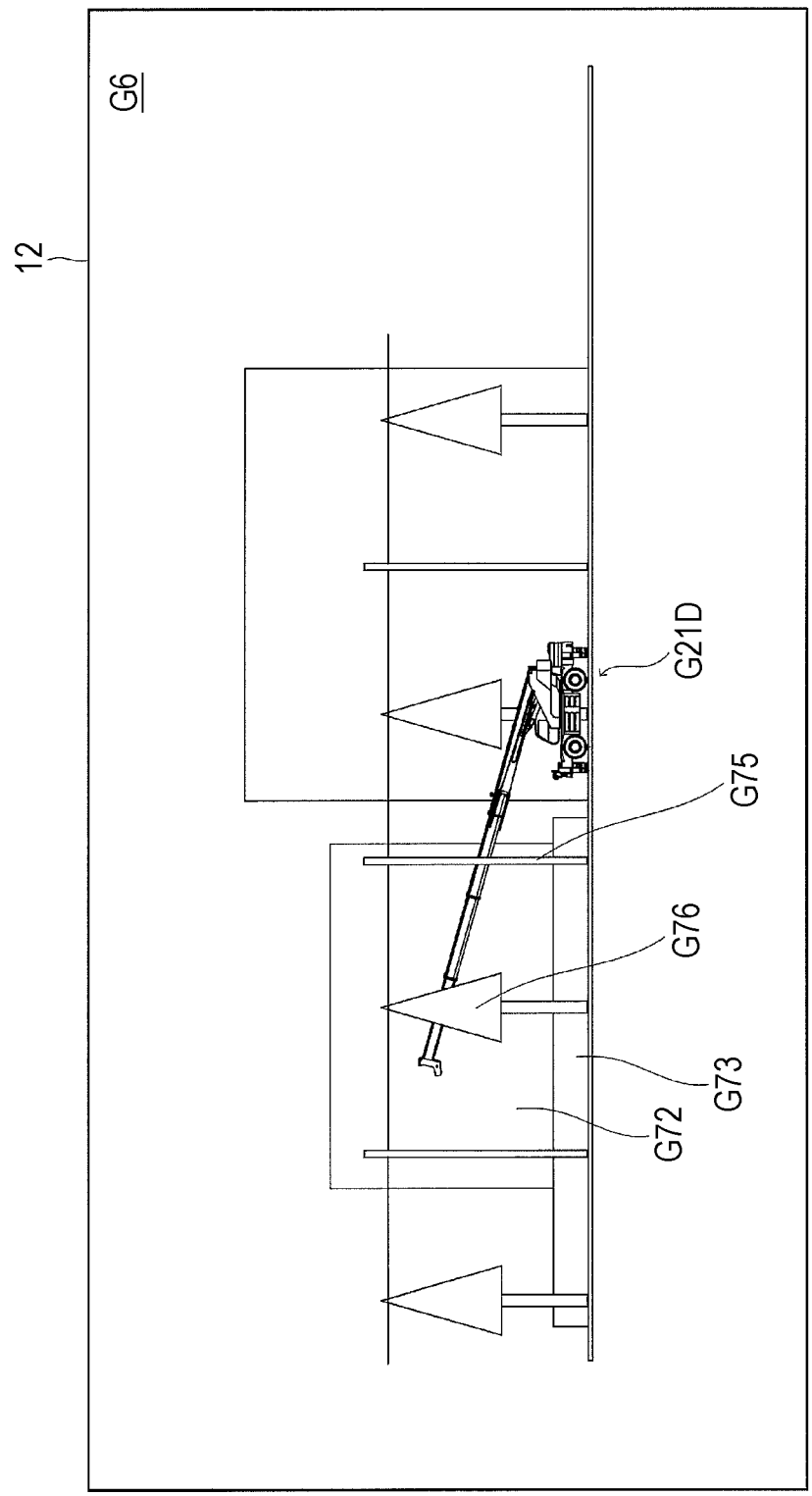
FIG. 16B is a view illustrating an example of an image displayed on the display unit.
Figure 16C:
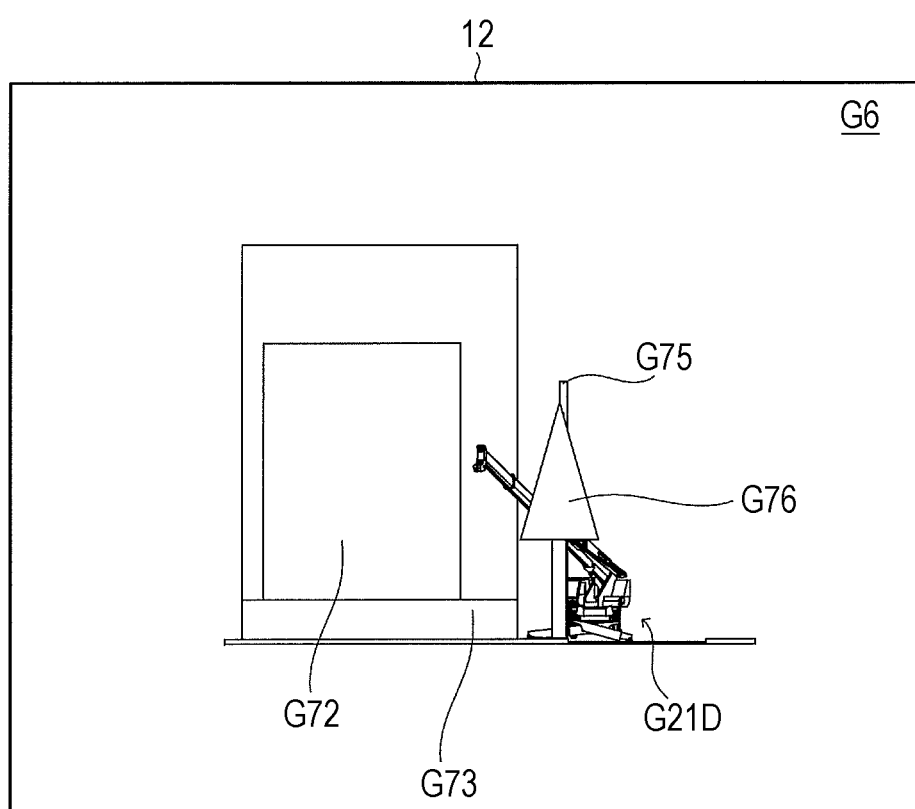
FIG. 16C is a view illustrating an example of an image displayed on the display unit.
Figure 16D:
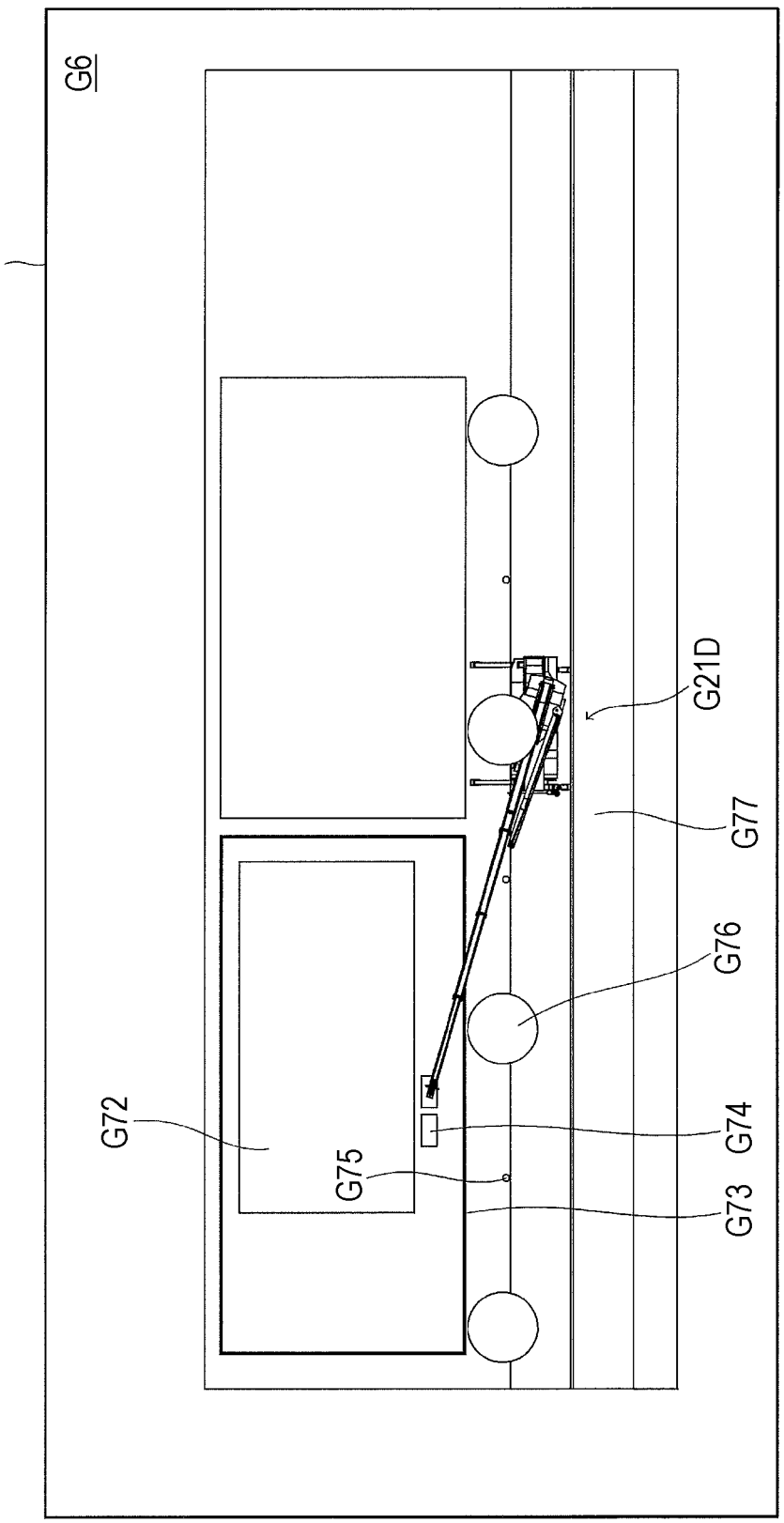
FIG. 16D is a view illustrating an example of an image displayed on the display unit.

FIGS. 16A to 16E present an example of the display unit 12 on which an image of a work site (hereinafter referred to as a "work site image G6") including a building image, a work site configuration image, and a work machine image is displayed. FIG. 16A presents the display unit 12 on which a perspective view of the work site image G6 is displayed. FIG. 16B is an $A_1$ arrow view of FIG. 16A. FIG. 16C is an $A_2$ arrow view of FIG. 16A. FIG. 16D is an $A_3$ arrow view of FIG. 16A. FIG. 16E presents the display unit 12 on which an area image G4A is displayed on the work site image G6 presented in FIG. 16B.

In this operation example, in the work site image G6 presented in FIGS. 16A to 16D, the operator can verify the operation of lifting and moving an outdoor unit G74 of an air conditioner placed between a building G72 and a fence G73.

First, the operator causes the display unit 12 to display the work site image G6 presented in FIGS. 16A to 16D. Such the work site image G6 may be an image created by the operator using the BIM application A or may be an image stored in the storage unit 14. The method for creating the work site image G6 is as described above.

The overhang width of the left side outrigger of the work machine image G21D illustrated in FIGS. 16A to 16D is the minimum. By minimizing the overhang width of the left side outrigger, the left side outrigger does not protrude to an opposite lane G77.

On the other hand, the overhang width of the right side outrigger of the work machine image G21D is the maximum. Thus, the left side outrigger and the right side outrigger of the work machine image G2 have different overhang widths.

The operator decides the attitude (e.g., boom length, turn angle, and hoist angle) of the boom of the work machine image G21D so as not to interfere with the fence G73, a power pole G75, and a tree G76 in the work site image G6. The operation for deciding the attitude is performed by inputting, from the input unit 11, an attitude condition defining the attitude of the work machine image G21D. Note that the operator may decide the attitude of the display work machine by dragging the work machine image G21D.

In the work site image G6, after the attitude of the work machine image G21D is decided, the operator performs an operation of an area display request (performance information request). For example, the operator inputs an area display request from the input screen popped up on the display unit 12.

In the case of this operation example, the overhang width of the left side outrigger and the overhang width of the right side outrigger in the attitude condition included in the request are different.

When the operator inputs an area display request, the BIM assistance system BS executes the processing of steps S202 to S213 of FIG. 9, and the display unit 12 displays the area image G4A indicated by a thick line in FIG. 16E. Note that although not illustrated, the area image G4A is also displayed in the work site image G6 presented in FIGS. 16A and 16C to 16E.

Action/Effect of Operation Example 5

Also in this operation example as described above, when the operator inputs a display request for the area image via the BIM application A, the area image is automatically displayed on the display unit 12.

In the case of the area image G4A illustrated in FIG. 16E, the area on the left side of the vehicle in the area image G4A is missing because the overhang width of the left side outrigger in the work machine image G21D is the minimum. Since the operator can visually recognize, with the display unit 12, the area image corresponding to the overhang state of the outrigger, the operator can intuitively perform a highly accurate simulation.

By displaying the area image G4A on the work site image G6 of different viewpoints such as FIGS. 16A to 16E, the operator can perform a more accurate simulation.

Operation Example 6

Next, an example of the operation of the BIM assistance system BS will be described with reference to FIGS. 17A to 18E. Similarly to the operation example 3 described above, this operation example is an example of displaying a deformation image of the boom on the display unit 12. Note that the operation by the operator and the operation of the BIM assistance system BS are substantially similar to those in the operation flow (see FIG. 11) of the operation example 3 described above. The situation in which the operation example 6 is carried out is similar to the case of the operation example 3 described above.

Figure 17A:
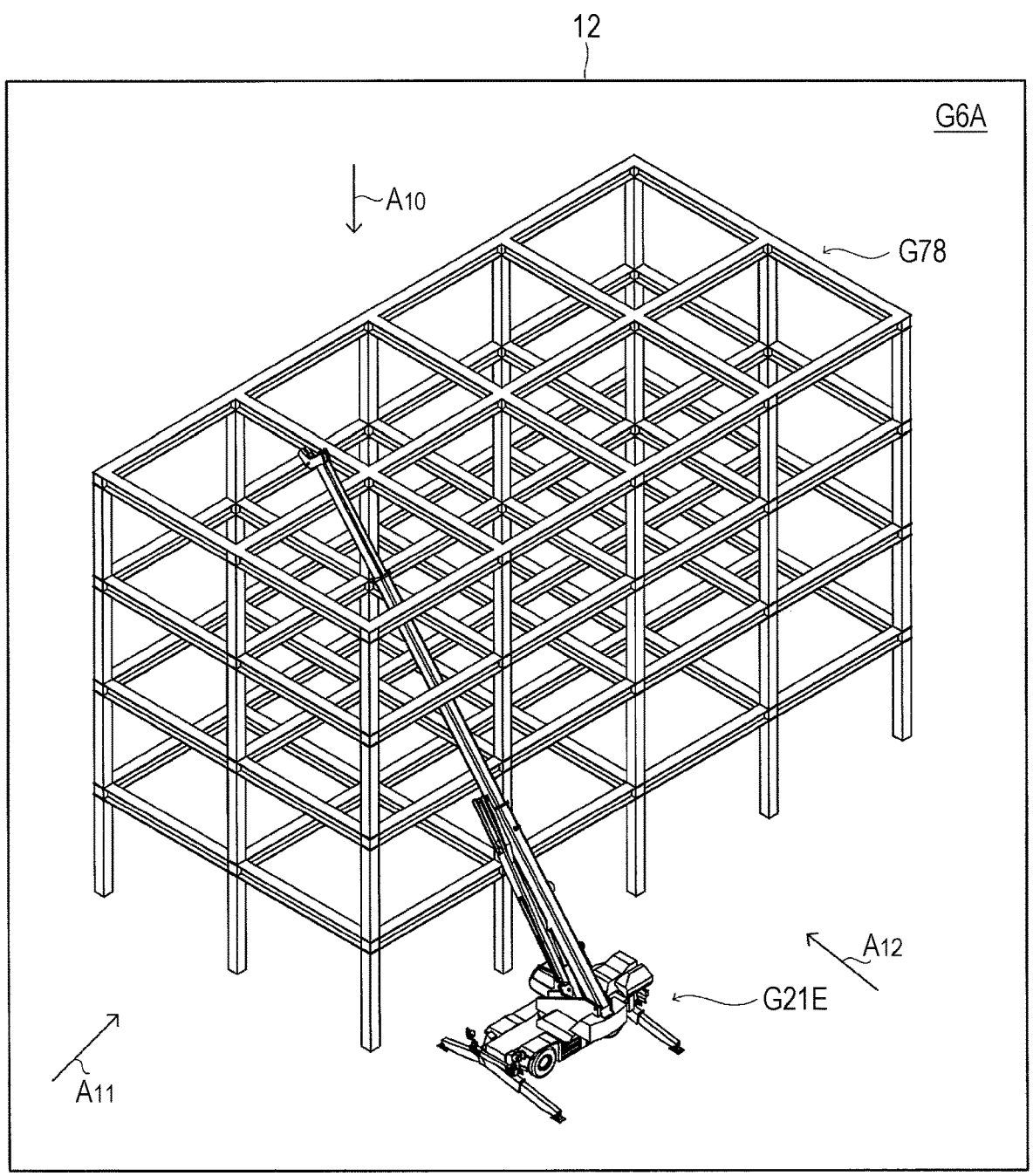
FIG. 17A is a view illustrating an example of an image displayed on the display unit.
Figure 17B:
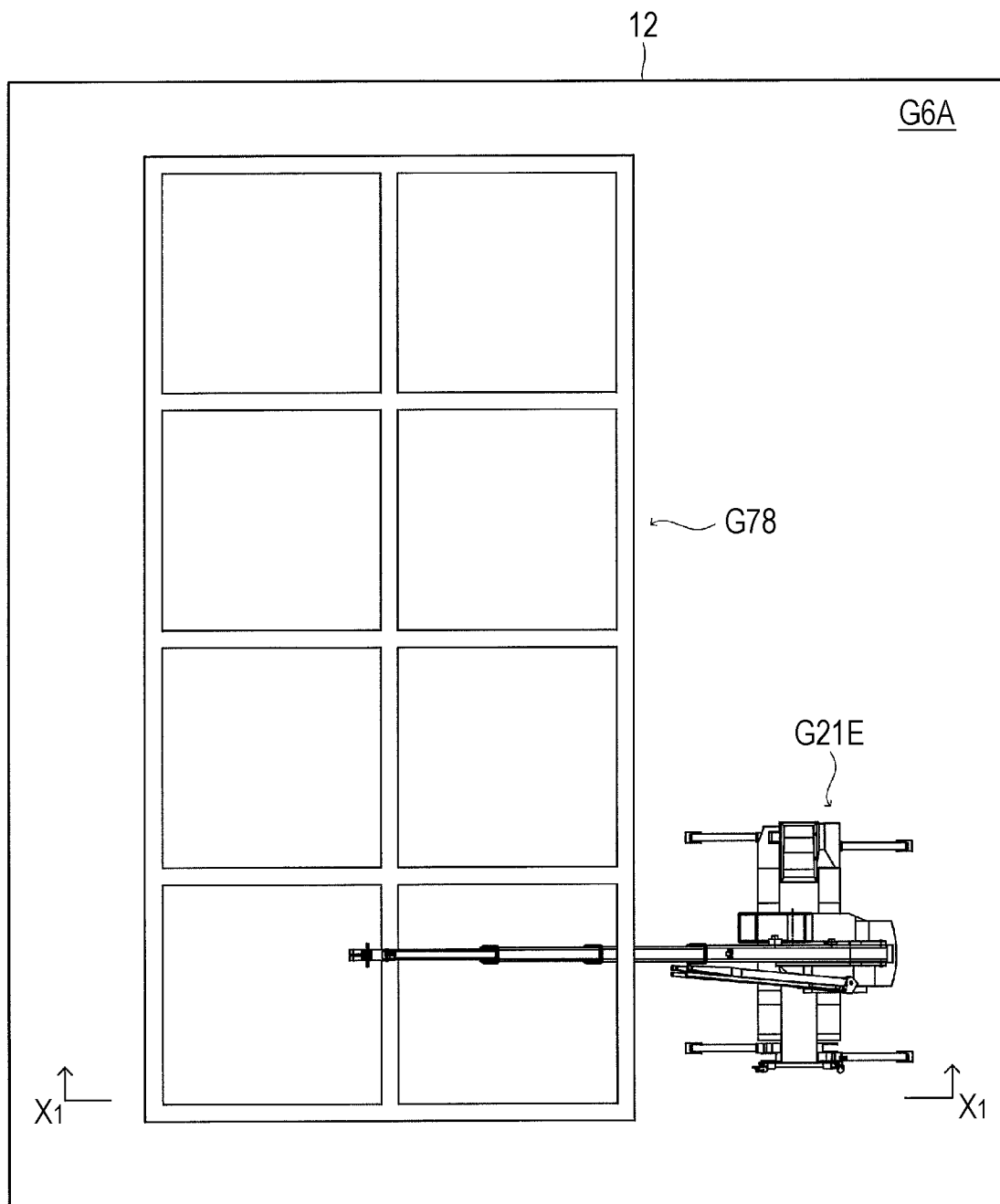
FIG. 17B is a view illustrating an example of an image displayed on the display unit.
Figure 17C:
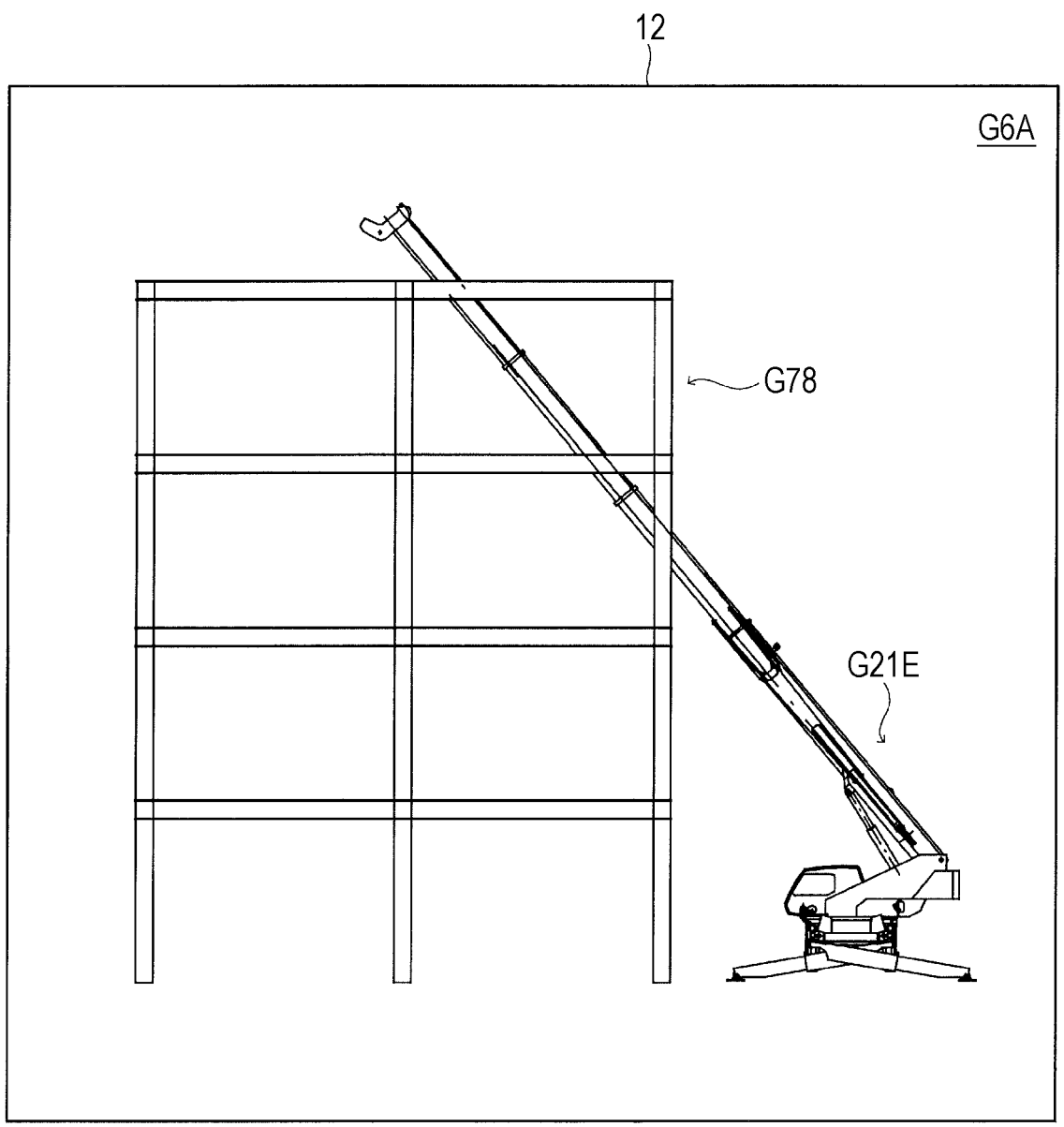
FIG. 17C is a view illustrating an example of an image displayed on the display unit.
Figure 17D:
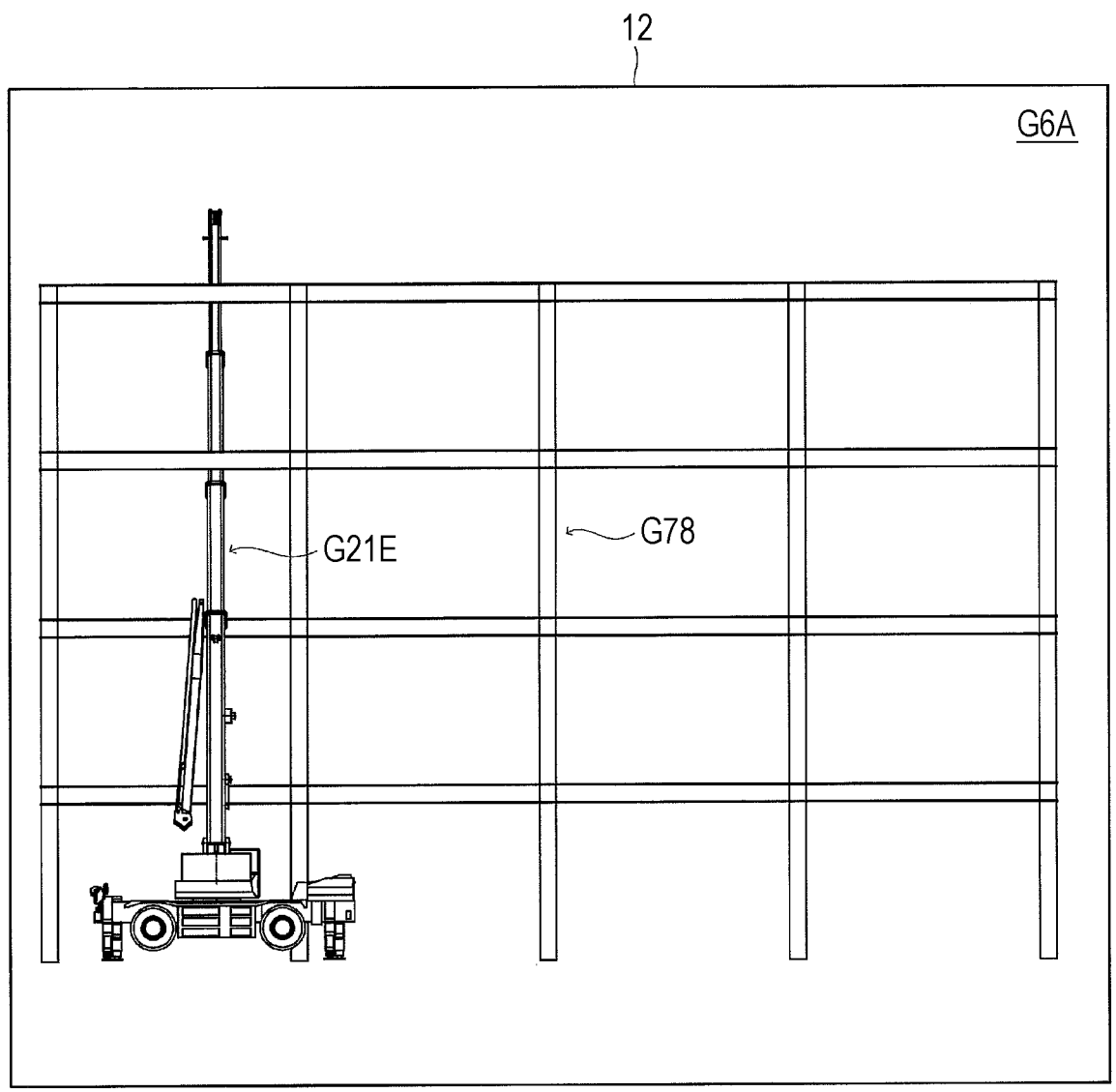
FIG. 17D is a view illustrating an example of an image displayed on the display unit.
Figure 17E:
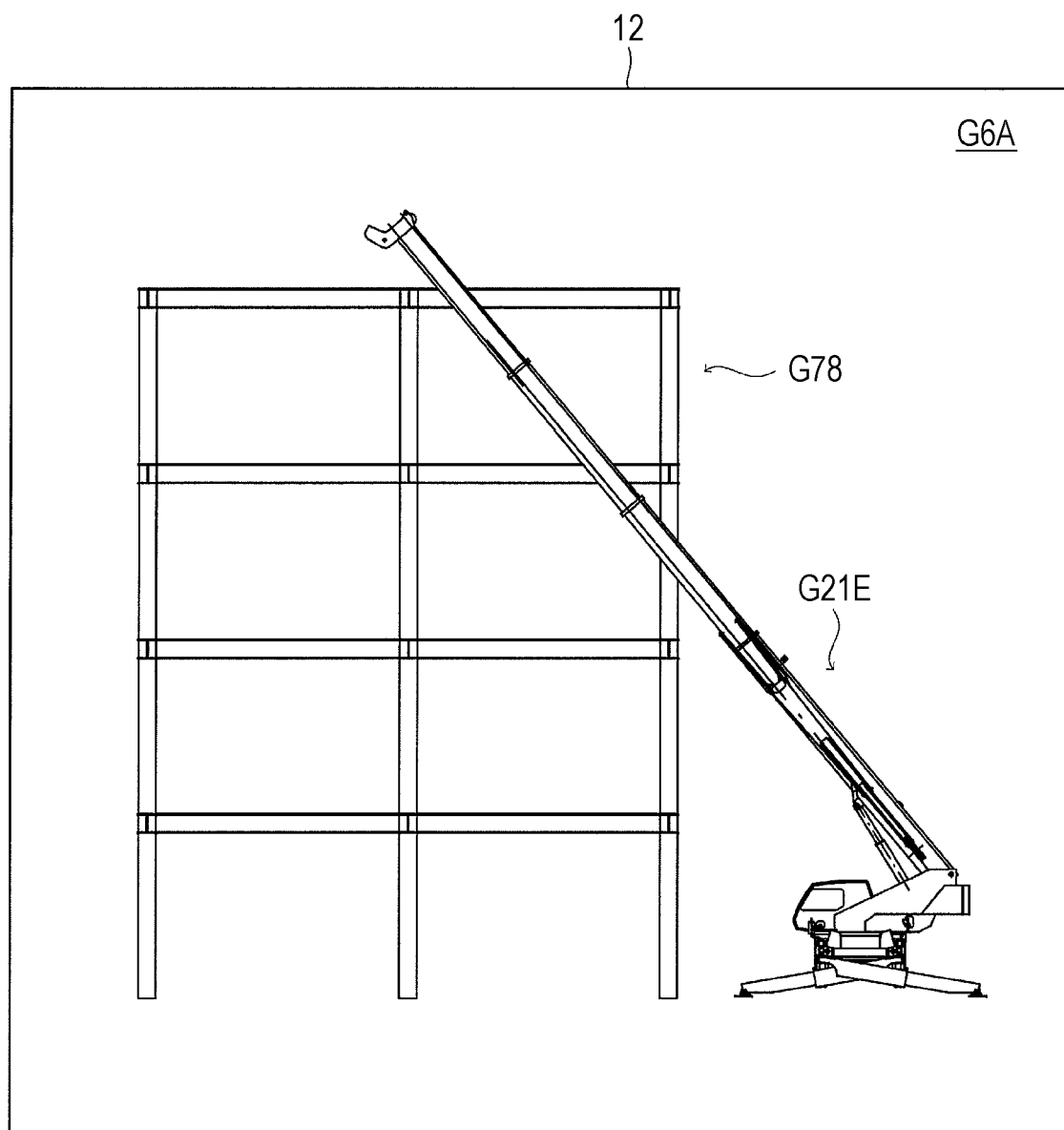
FIG. 17E is a view illustrating an example of an image displayed on the display unit.
Figure 18A:
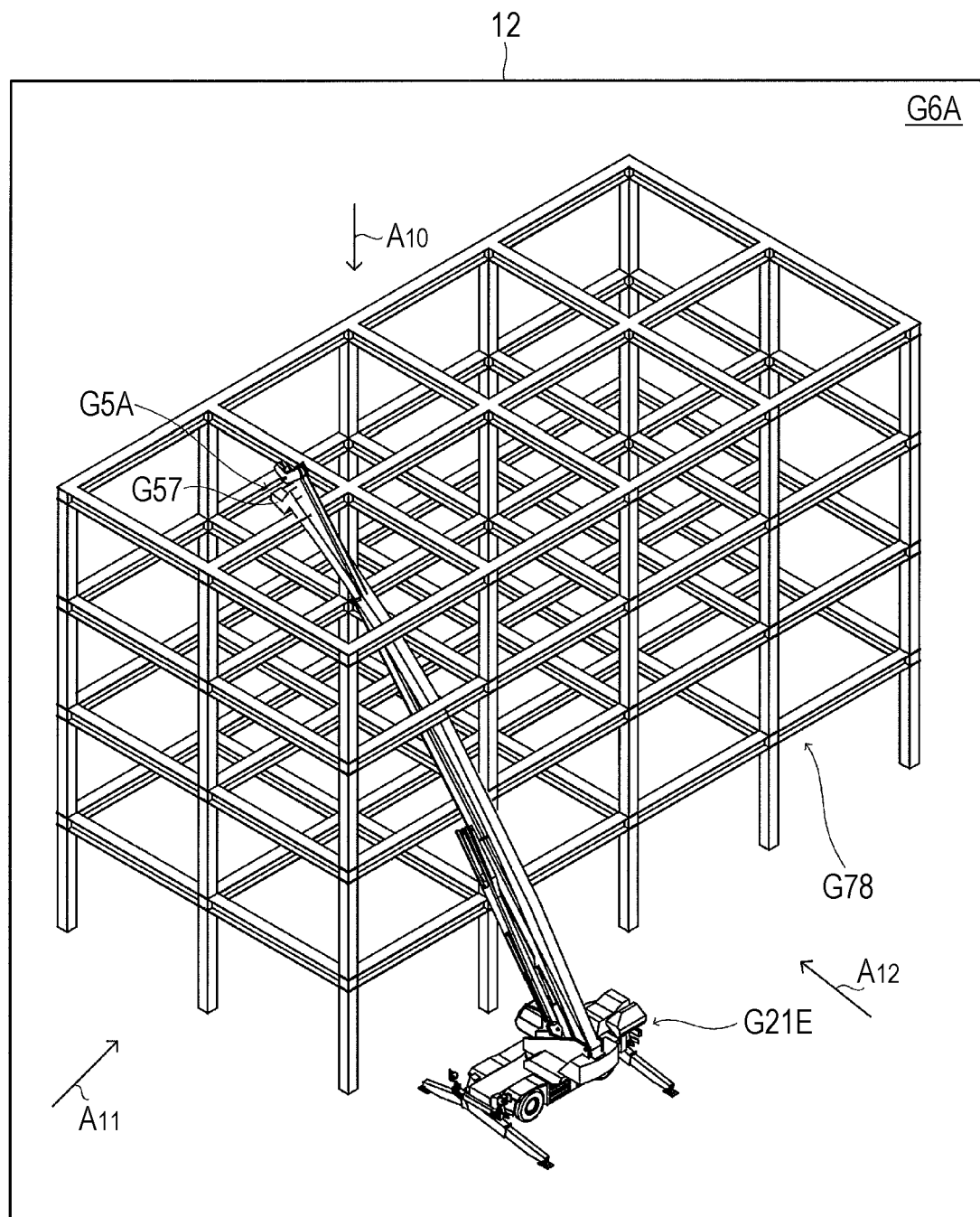
FIG. 18A is a view illustrating an example of an image displayed on the display unit.
Figure 18B:
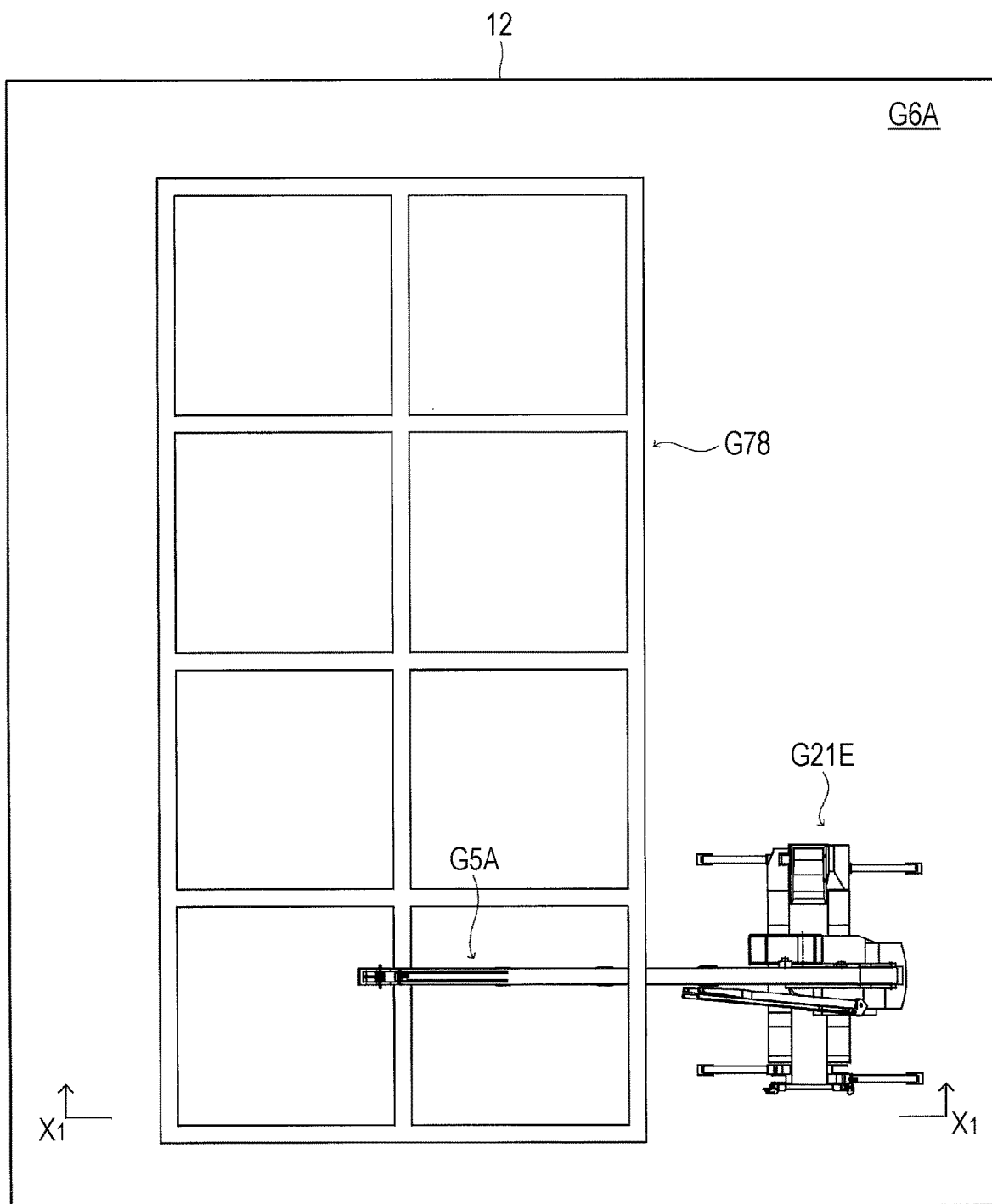
FIG. 18B is a view illustrating an example of an image displayed on the display unit.
Figure 18C:
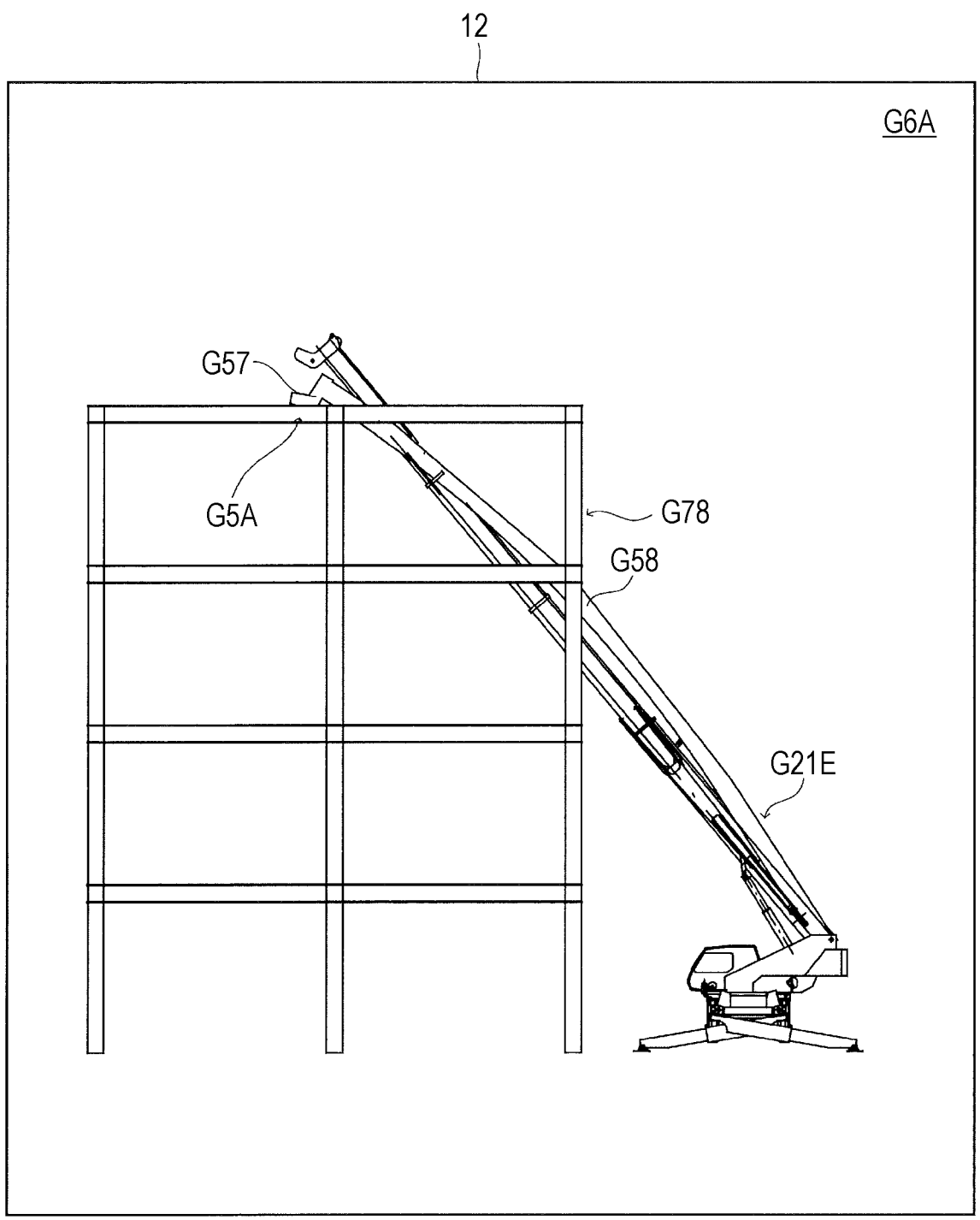
FIG. 18C is a view illustrating an example of an image displayed on the display unit.
Figure 18D:
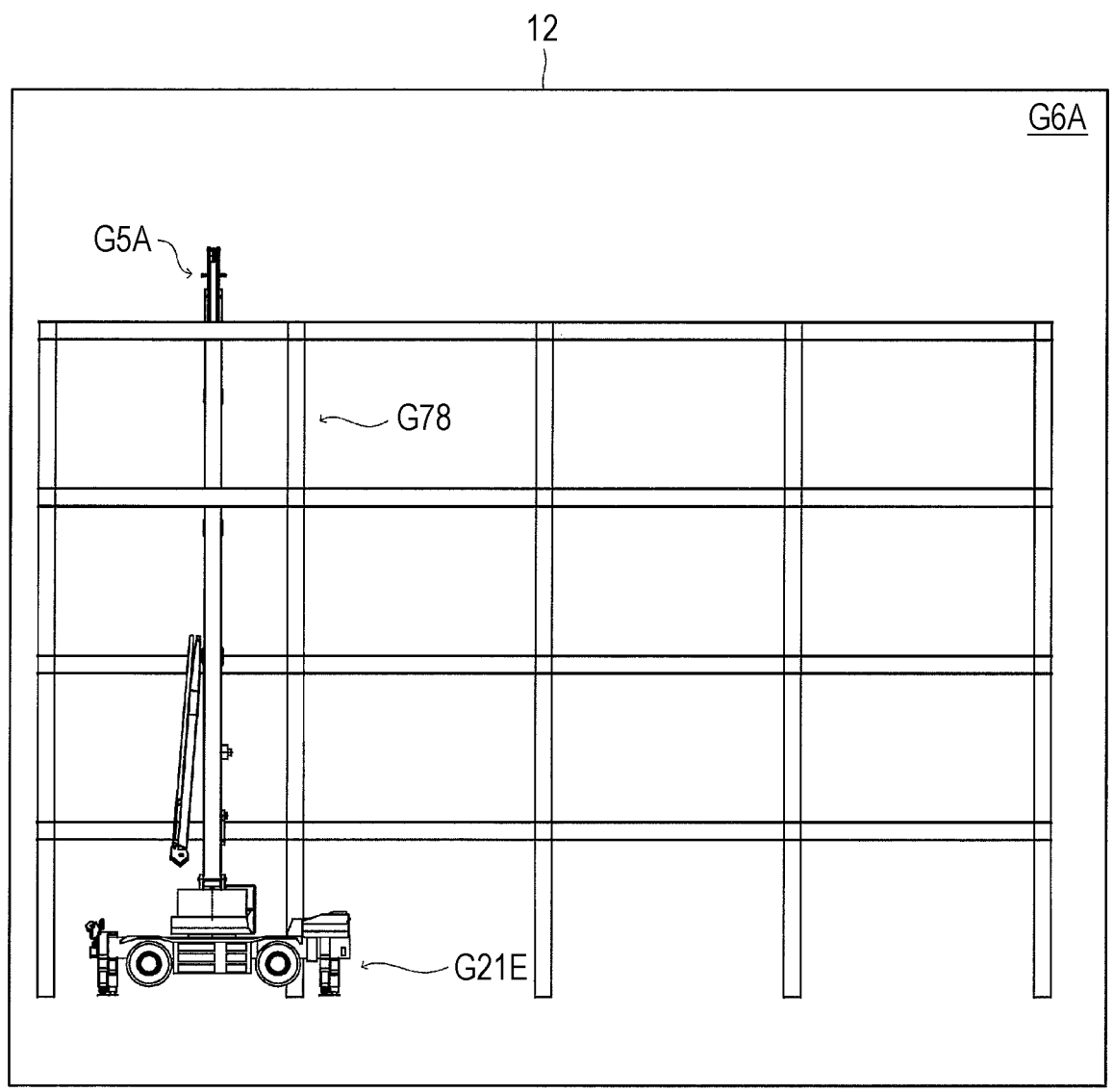
FIG. 18D is a view illustrating an example of an image displayed on the display unit.
Figure 18E:
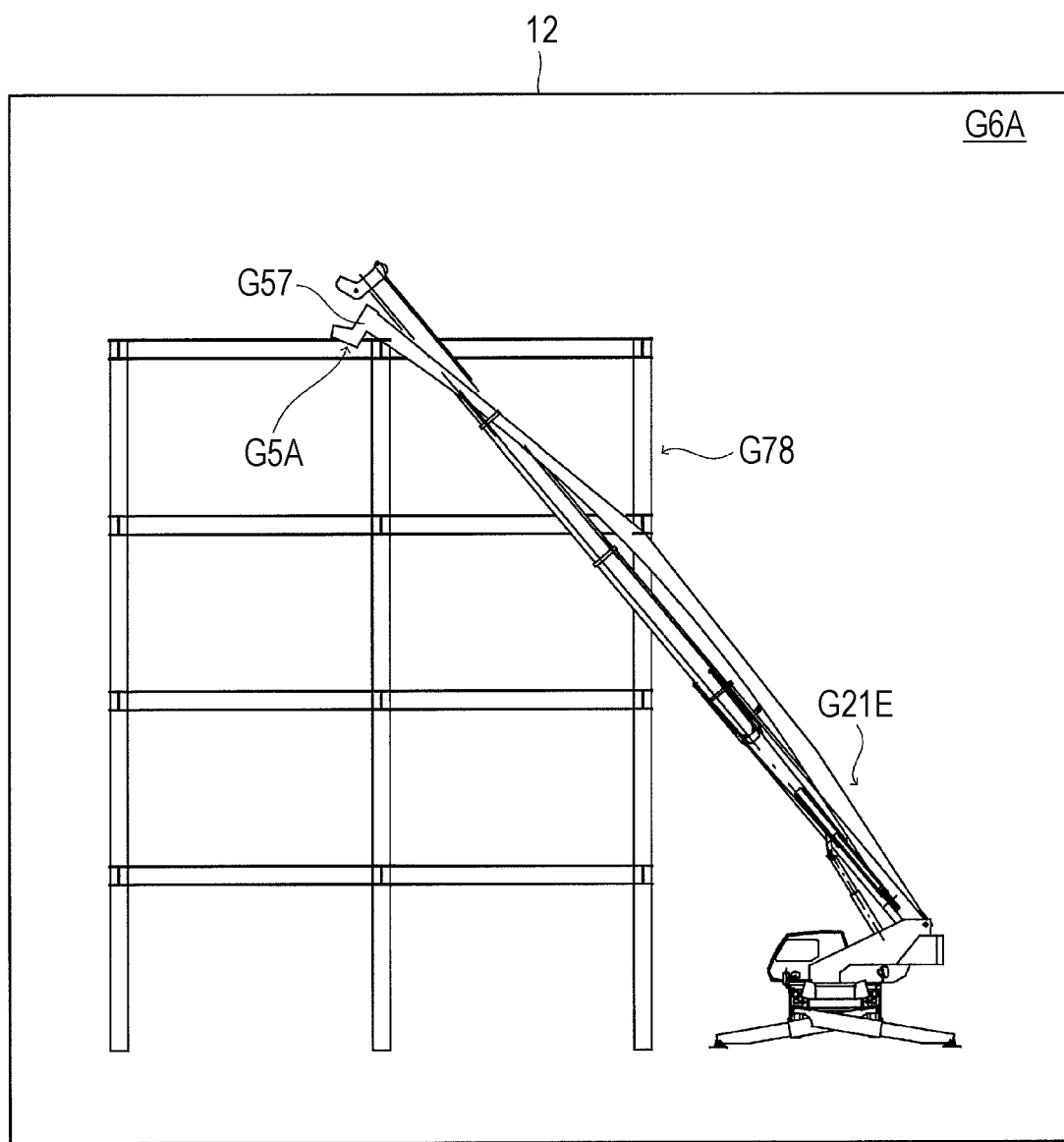
FIG. 18E is a view illustrating an example of an image displayed on the display unit.

FIGS. 17A to 17E present an example of the display unit 12 on which a work site image G6A including the building image and the work machine image is displayed. FIG. 17A presents the display unit 12 on which a perspective view of the work site image G6A is displayed. FIG. 17B is an $A_{10}$ arrow view of FIG. 17A. FIG. 17C is an $A_{11}$ arrow view of FIG. 17A. FIG. 17D is an $A_{12}$ arrow view of FIG. 17A. FIG. 17E is an $X_1$-$X_1$ cross-sectional view of FIG. 17B.

FIGS. 18A to 18E present an example of the display unit 12 in which a deformation image of the boom is displayed on the work site image G6A presented in FIGS. 17A to 17E.

In this operation example, the operator can verify an interference between a steel structure G78 and the boom in the work site image G6A illustrated in FIGS. 17A to 17E.

First, the operator causes the display unit 12 to display the work site image G6A illustrated in FIGS. 17A to 17E. Such the work site image G6A may be an image created by the operator using the BIM application A or may be an image stored in the storage unit 14. The method for generating the work site image G6A is as described above.

The operator decides the attitude (e.g., boom length, turn angle, and hoist angle) of the boom of a work machine image G21E so as not to interfere with the steel structure G78. The operation for deciding the attitude is performed by inputting, from the input unit 11, an attitude condition of the work machine image G21E. Note that the operator may decide the attitude of the display work machine by dragging the work machine image G21E.

In the work site image G6A, after deciding the attitude of the work machine image G21E, the operator performs an operation of the display request (performance information request) for the deformation image. For example, the operator inputs a display request for the deformation image from the input screen popped up on the display unit 12.

When the operator inputs a bending display request, the BIM assistance system BS executes the processing of steps S301 to S312 of FIG. 11, and the display unit 12 displays a work machine image (deformation image G5A) having a deformation image of the boom presented in FIGS. 18A to 18E.

The deformation image G5 illustrated in FIGS. 18A to 18E is an image generated by the deformation image processing unit 177 on the basis of the deformation image information included in the response acquired from the server S1. However, the deformation image may be generated by the server S1 (specifically, calculation unit 222).

In this case, the response including the deformation image (performance information) generated by the calculation unit 222 is transmitted from the server S1 to the client terminal T. The display assistance control unit 175 having acquired the response reflects the deformation image included in the response on the display of the display unit 12.

Also in this operation example as described above, when the operator inputs a display request for the deformation image via the BIM application A, the deformation image is automatically displayed on the display unit 12.

Note that although not illustrated, an image of the boom before deformation (hereinafter referred to as a "pre-deformation image") may be omitted in FIGS. 18A to 18E. That is, when the operator inputs a display request for the deformation image, the pre-deformation image may be deleted from the display unit 12, and the deformation image G5A may be automatically displayed on the display unit.

In the images illustrated in FIGS. 17A to 17E, the boom of the work machine image G2 does not interfere with the steel structure G78. On the other hand, in the case of the deformation image G5A illustrated in FIGS. 18A to 18E, a tip end portion G57 of the boom is displaced downward relative to the tip end portion G57 of the boom of the pre-deformation image, and a middle portion G58 of the boom is displaced upward relative to the middle portion of the boom of the pre-deformation image, and the boom of the work machine image G21E and the steel structure G78 interfere with each other.

As illustrated in FIGS. 18A to 18E, when the boom and the steel structure G78 interfere with each other, by changing the attitude of the displayed boom, the operator can search the attitude of the boom in which the boom and the steel structure G78 do not interfere. The operator can change the attitude of the boom by dragging the displayed boom. The operator can also change the attitude of the displayed boom by inputting the hoist angle of the boom. When the attitude of the boom is changed, a deformation image of the boom corresponding to the attitude of the changed boom may be displayed.

Action/Effect of Operation Example 6

As described above, according to this operation example, by visually recognizing the images illustrated in FIGS. 18A to 18E, the operator can perform a highly accurate simulation in consideration of the interference between the work machine and the steel structure.

Operation Example 7

Figure 19:
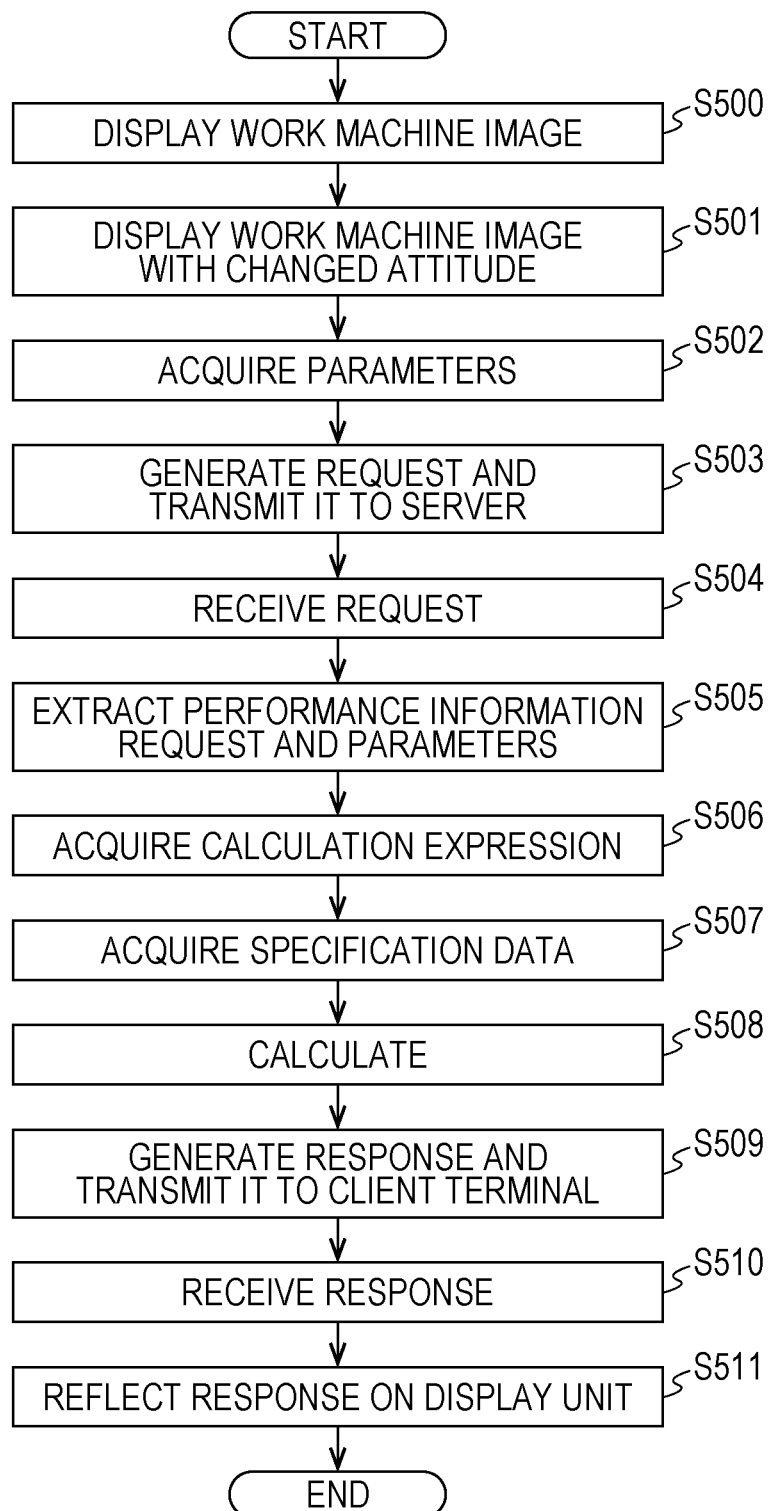
FIG. 19 is a flowchart presenting an example of the operation of the BIM assistance system.

Next, an example of the operation of the BIM assistance system BS will be described with reference to FIGS. 2 and 19 to 20B. FIG. 19 is a flowchart presenting the operation of the BIM assistance system BS when the determination result of whether or not the work is possible in consideration of the ground strength is displayed on the display unit 12 (see A-9 of Table 2).

In a conveyance work by the crane, installation pressure (outrigger reaction force) acts on the ground from the outrigger of the crane. If the installation pressure is larger than the ground strength, there is a possibility that the ground sinks and the crane overturns. Therefore, consideration of the ground strength in advance in the construction plan prevents the ground sinkage and crane overturn, and significantly contributes to the improvement of the safety of the actual work and the improvement of the work efficiency.

The operation of the BIM assistance system BS in this operation example will be described below. Specifically, the operation of the BIM assistance system BS when the operator verifies whether or not it is possible to convey the hoisting load from a start point SP to an end point FP using a crane C illustrated in FIG. 20A will be described.

Note that a case of verifying the attitude (attitude of the crane C illustrated in FIGS. 20A and 20B) of the crane when unloading the hoisting load to the end point FP will be described below. Also in a case of verifying the attitude of another crane, the basic operation of the BIM assistance system BS is the same.

Figure 20A:
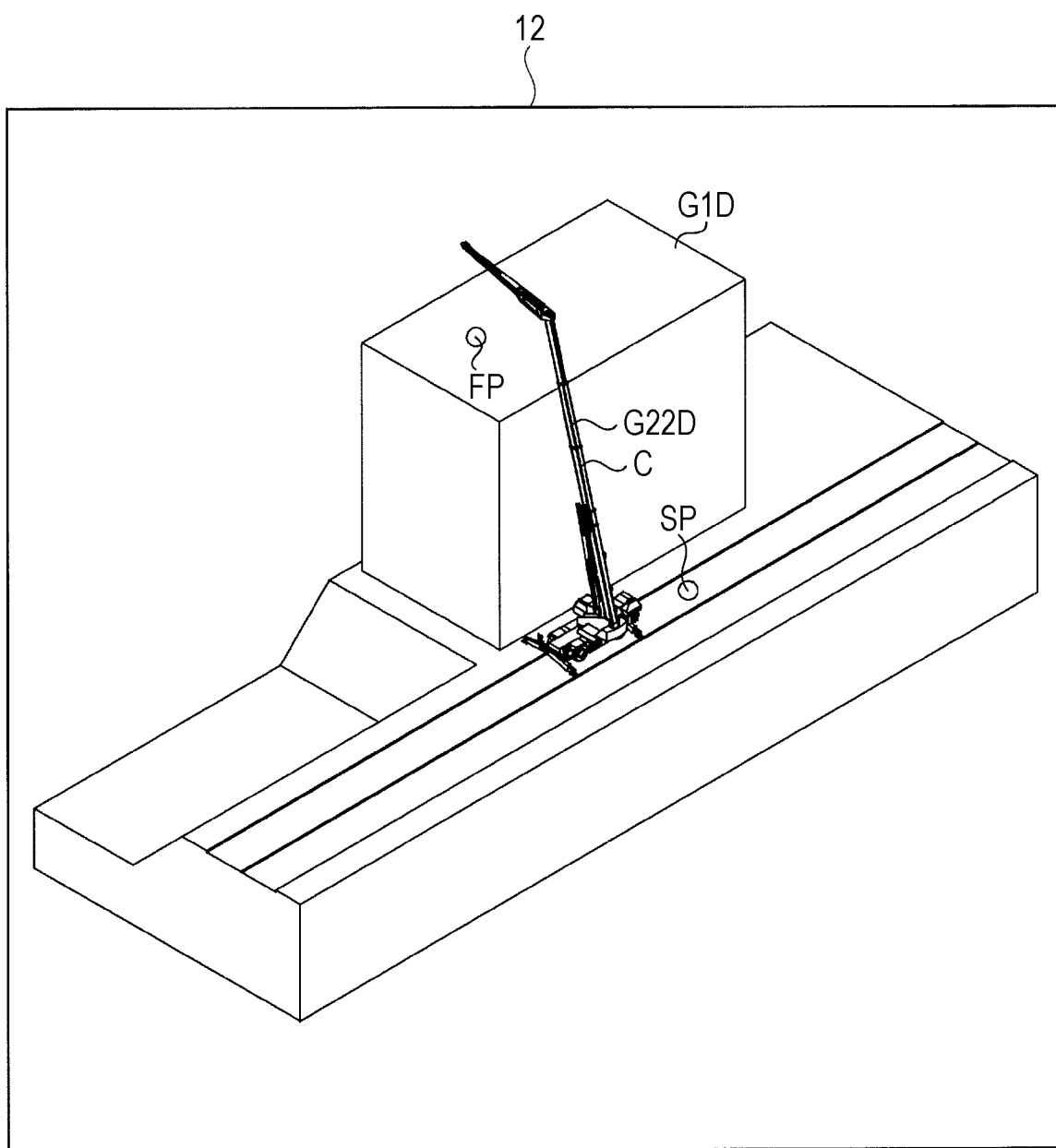
FIG. 20A is a view illustrating an example of an image displayed on the display unit.
Figure 20B:
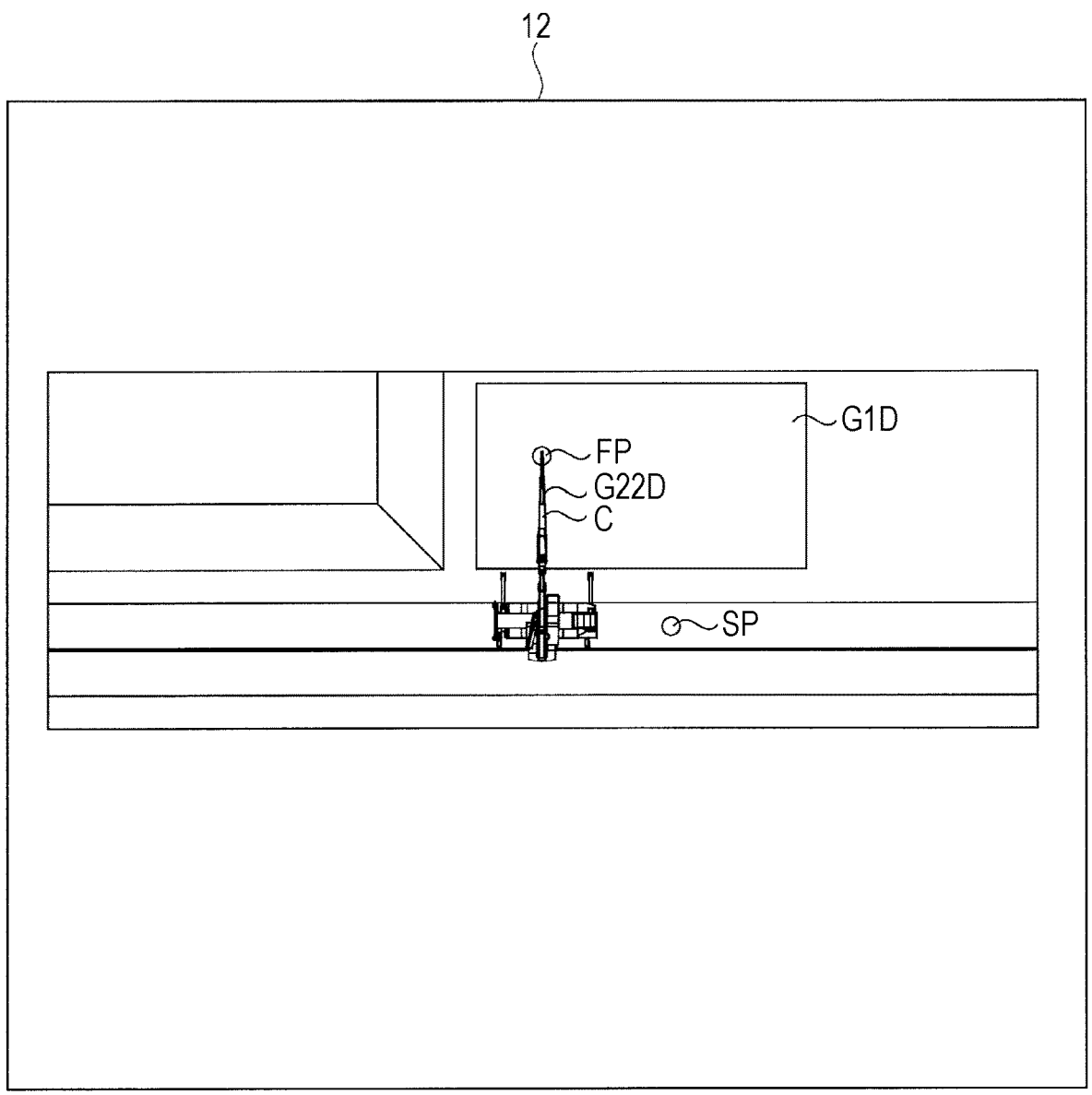
FIG. 20B is a view illustrating an example of an image displayed on the display unit.

In step S500 of FIG. 19, only a building image G1D illustrated in FIG. 20A is displayed on the display unit 12. That is, in step S500, the work machine image is not displayed on the display unit 12. The building image G1D may be an image created by the operator by using the BIM application A or may be an image displayed by reading the information stored in the storage unit 14.

In step S500, in order to display the work machine image of the basis attitude on the display unit 12, the operator inputs a display instruction of the work machine image from the input unit 11. The operation performed by the operator when displaying the work machine image of the basic attitude on the display unit 12 is the same as that in the case of the operation example 1 described above.

In step S501, the operator inputs an attitude condition from the input unit 11 in order to decide the attitude of the work machine in the work machine image of the basic attitude displayed on the display unit 12. The operation when the operator decides the attitude of the work machine image is the same as that in the operation example 1 described above.

In step S501, when the input unit 11 receives the input of the attitude decision operation, the BIM control unit 161 reflects the attitude decision operation on the work machine image of the display unit 12. Then, as illustrated in FIG. 20A, the display unit 12 displays a work machine image G22D in which the attitude is changed from that in the work machine image of the basic attitude.

Next, in step S502, the operator performs an operation for obtaining whether or not the work is possible in consideration of the ground strength (hereinafter simply referred to as "whether or not the work is possible") of the work machine image G22D whose attitude has been decided in step S501. For example, the operator inputs a display request (performance information request) for whether or not the work is possible from the input screen popped up on the display unit 12.

Note that the operation of the operator for displaying whether or not the work is possible on the display unit 12 ends at step S502. The subsequent processing is automatically performed between the client terminal T and the servers S1 to S4. That is, in this operation example, when the operator inputs a display request for whether or not the work is possible via the BIM application A, the information on whether or not the work is possible is automatically displayed on the display unit 12.

In step S502, when the input unit 11 receives the performance information request, the information acquisition unit 173 acquires, from the BIM control unit 161, the parameters (model information, attitude condition, hoisting load information, work state information, component information, and other information) corresponding to the acquired performance information request.

In step S502, the information acquisition unit 173 acquires, from the BIM control unit 161, at least the parameter necessary for the calculation of the performance information specified in the performance information request.

The parameter automatically acquired by the information acquisition unit 173 in step S502 is the parameter presented in column B of Table 10 below (parameter presented in 9-B of Table 2).

TABLE 10

| | A (performance information request) | B (parameters) | C (performance information) |
|---|---|---|---|
| 9 | Display request for whether or not work is possible in consideration of ground strength | Work machine id (model, specification number, or serial number) Outrigger overhang width Boom information (type, hoist angle, length, and turn angle) Jib information (type, hoist angle, and length) Hook information Number of wire hooks Lifting load Ground strength Counterweight information | Reaction force value of outrigger jack Determination result of whether or not work is possible Workable installation position |

The parameter in this operation example includes a parameter in the case of performing an outrigger jack reaction force display request (see A-8 of Table 2) and information on the ground strength.

The BIM application A stores information on the ground strength. The BIM application A stores the ground strength of the entire work site. The information on the ground strength may be the ground strength in consideration of the buried member that is buried underground at the work site.

Note that the BIM application A may store information on the ground strength as a ground strength table. The ground strength table may include position information of the work site (e.g. coordinates or compartments) and the ground strength associated with this position information.

In step S502, the information acquisition unit 173 acquires, from the BIM application A, information on the ground strength of the ground corresponding to the position where the work machine image G22D is disposed on the display unit 12. Then, in step S502, the information acquisition unit 173 sends the acquired information to the request issuance unit 174. Note that in step S502, the information on the ground strength acquired by the information acquisition unit 173 is not limited to the information stored in the BIM application A. The information on the ground strength acquired by the information acquisition unit 173 may be information having been input from the information input unit 77 by the operator.

In step S503, the request issuance unit 174 acquires, from the third storage unit 143, the server specifying information (e.g., the URI of the server) for specifying the server corresponding to the work machine image (i.e., the work machine image G22D of FIG. 20A) specified by the acquired model information.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information.

The processing of the server S1 having received a request from the client terminal T will be described below.

In step S504, the communication unit 21 receives the request. Then, the communication unit 21 sends the request to the request acquisition unit 221.

In step S505, the request acquisition unit 221 extracts the performance information request and parameter from the acquired request. Then, the request acquisition unit 221 sends the extracted information to the calculation unit 222.

In step S506, the calculation unit 222 acquires, from the storage unit 23, the calculation expression corresponding to the performance information request and model information acquired from the request acquisition unit 221. In this operation example, the calculation expression acquired by the calculation unit 222 is a calculation expression for calculating the reaction force of the outrigger jack and a calculation expression for comparing the reaction force of the outrigger jack with the ground strength included in the parameter.

In step S507, the calculation unit 222 acquires, from the storage unit 23, the specification data corresponding to the work machine specified by the acquired model information.

In step S508, the calculation unit 222 calculates the reaction force of the outrigger jack on the basis of the parameter acquired from the client terminal T and the calculation expression and specification data acquired from the storage unit 23. Then, whether or not the work is possible is determined by comparing the calculated outrigger jack reaction force with the ground strength included in the parameter.

In step S508, when the calculated outrigger jack reaction force is smaller than the ground strength included in the parameter, the calculation unit 222 determines that the work is possible. On the other hand, in step S508, when the calculated outrigger jack reaction force is equal to or greater than the ground strength included in the parameter, the calculation unit 222 determines that the work is impossible.

The calculation unit 222 sends the calculated outrigger jack reaction force and/or determination result to the response issuance unit 223.

In step S509, the response issuance unit 223 generates a response on the basis of the reaction force of the outrigger jack acquired from the calculation unit 222 and/or the determination result. Then, the response issuance unit 223 sends the generated response to the communication unit 21. Then, the communication unit 21 transmits the acquired response to the client terminal T. When the response includes the determination result, this response may be regarded to include the determination result as to whether or not the work machine having the attitude defined by the attitude condition included in the request can perform the predetermined work.

Next, the processing of the client terminal T having received the response from the server S1 will be described.

In step S510, the communication unit 13 receives a response from the server S1. Then, the communication unit 13 sends the received response to the second control unit 17. The response is sent to the display assistance control unit 175 via the communication control unit 171.

In step S511, the display assistance control unit 175 reflects the calculation result of the server S1 included in the response (in the case of this operation example, information on whether or not the work is possible) on the display of the display unit 12.

Action/Effect of Operation Example 7

According to this operation example as described above, since a construction plan in consideration of the ground strength can be made, ground sinkage and crane overturn in an actual work can be prevented. This operation example as above significantly contributes to the improvement of the safety of the work and the improvement of the work efficiency.

Variation 1 of Operation Example 7

A variation 1 of the operation example 7 will be described. This variation is carried out in a situation of verifying as to whether or not the hoisting load can be conveyed from the start point SP (see FIGS. 20A and 20B) to the end point FP.

In this variation, the operator specifies the range of the attitude that the crane can take when conveying the hoisting load from the start point SP to the end point FP. Specifically, when the crane conveys the hoisting load from the start point SP to the end point FP, the turn angle of the crane attitude conditions changes in the range from the first turn angle (e.g., 0 degrees) corresponding to the first attitude when the hoisting load disposed at the start point SP is lifted to the second turn angle (e.g., 90 degrees) corresponding to the second attitude when the hoisting load is lowered at the end point FP. The operator specifies the range of this turn angle.

When the BIM assistance system BS receives input of the range of the turn angle, the information acquisition unit 173 acquires as a parameter, in step S502 described above, the turn angle of the range specified by the operator. Then, in step S508 described above, the calculation unit 222 calculates the outrigger jack reaction force for the entire range of the turn angle included in the parameter, and compares the calculated outrigger jack reaction force with the ground strength included in the parameter, thereby determining whether or not the work is possible. If the reaction force of the outrigger jack becomes greater than the ground strength at any turn angle in the range of the specified turn angle, the calculation unit 222 determines that the conveyance work described above cannot be performed. Note that the calculation unit 222 may determine whether or not the above-described work is possible by discretely changing the parameter.

Variation 2 of Operation Example 7

A variation 2 of the operation example 7 will be described. This variation is implemented in a situation where the operator requires the presentation of a crane capable of performing a conveyance work.

In this variation, when the server S1 determines that the conveyance work cannot be performed under the attitude condition included in the parameter, the server S1 (specifically, response issuance unit 223) includes, in the response, information on the crane capable of performing the conveyance work. The display assistance control unit 175 of the client terminal T having received such the response displays, on the display unit 12, information for notifying the operator of the crane included in the response.

Variation 3 of Operation Example 7

A variation 3 of the operation example 7 will be described. This variation is implemented in a situation where at least the installation position of the crane and the hoisting load have been decided. In this situation, the operator specifies, as the performance information request, the range (hereinafter referred to as a "movable range of the hoisting load") in which the hoisting load can be moved by the crane placed at the specified position.

In this variation, the attitude of the work machine may not be decided. That is, the parameter included in the request may not include the attitude condition of the work machine. However, if some attitude conditions have been decided, the parameter may include the decided attitude conditions.

In this variation, the calculation unit 222 of the server S1 calculates the reaction force of the outrigger jack by changing the undecided attitude condition at a predetermined interval. The calculation unit 222 determines whether or not the work is possible by comparing the calculated outrigger jack reaction force with the ground strength included in the parameter.

Targeting at all the attitudes that the specified crane can take, the calculation unit 222 calculates the reaction force of the outrigger jack and determines whether or not the work is possible. The calculation unit 222 generates information indicating the movable range of the hoisting load on the basis of the determination result.

Figure 20C:
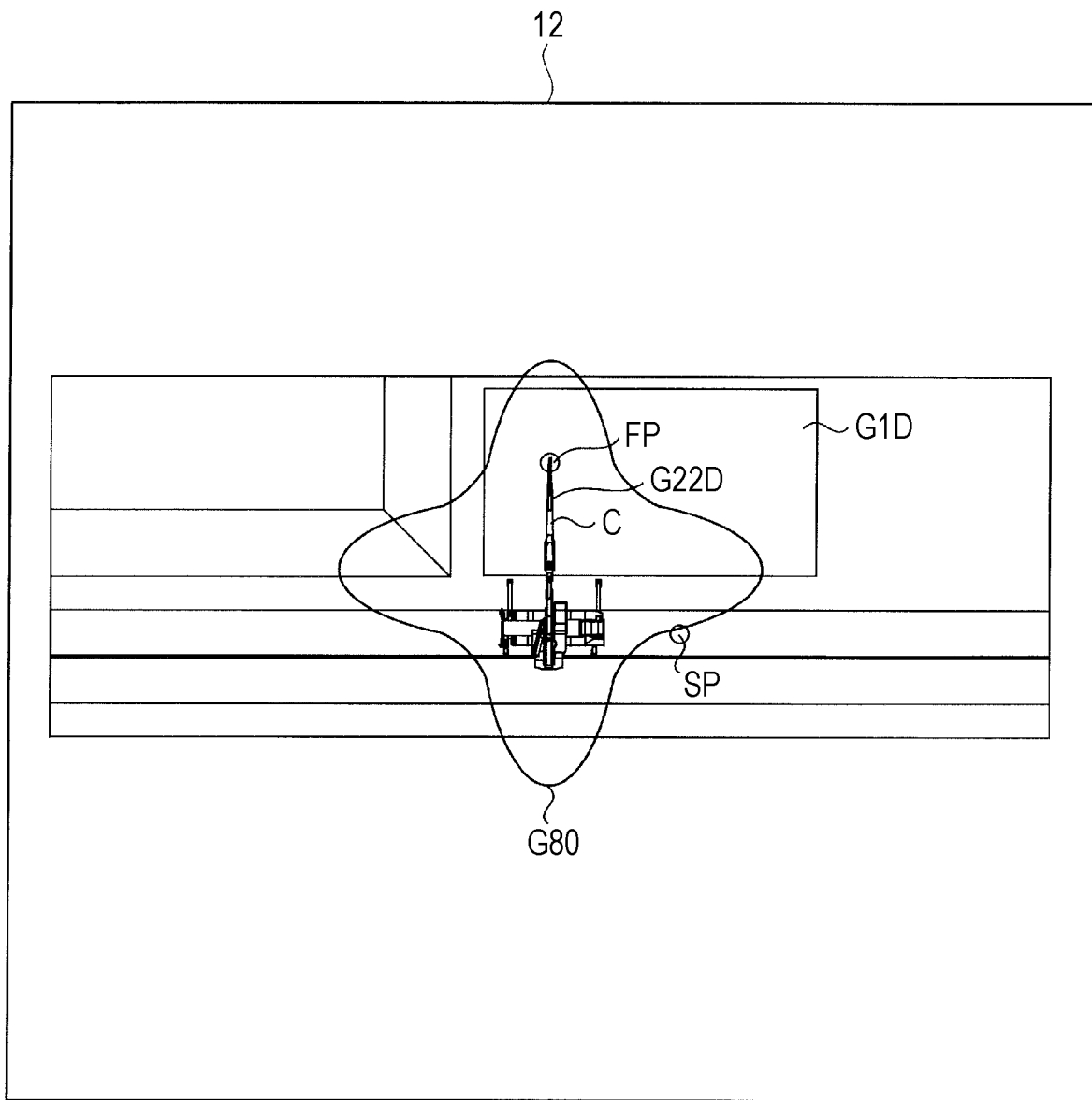
FIG. 20C is a view illustrating an example of an image displayed on the display unit.

In this variation, the server S1 (specifically, response issuance unit 223) includes information indicating the movable range of the hoisting load in the response. Then, the display assistance control unit 175 of the client terminal T having received this response displays, on the display unit 12, information indicating the movable range of the hoisting load included in the response. FIG. 20C is a view illustrating the display unit 12 on which an image G80 of the movable range of the hoisting load is presented. The image of the movable range of the hoisting load may be a two-dimensional image or may be a three-dimensional image.

Variation 4 of Operation Example 7

A variation 4 of the operation example 7 will be described. This variation is implemented in a situation where at least the installation position of the crane and the attitude condition of the crane have been decided. In this situation, the operator specifies the maximum load of the hoisting load that can be lifted as the performance information request.

In this variation, the calculation unit 222 of the server S1 calculates the reaction force of the outrigger jack by changing the load of the hoisting load at a predetermined interval. The calculation unit 222 determines whether or not the work is possible by comparing the calculated outrigger jack reaction force with the ground strength included in the parameter. Then, the calculation unit 222 generates information on the maximum load of the hoisting load that can be lifted on the basis of the determination result.

In this variation, the server S1 (specifically, response issuance unit 223) includes information on the maximum load of the hoisting load in the response. Then, the display assistance control unit 175 of the client terminal T having received this response displays, on the display unit 12, information on the maximum load of the hoisting load included in the response.

Variation 5 of Operation Example 7

A variation 5 of the operation example 7 will be described. This variation is implemented in a situation where at least the model of the work machine (in the case of this variation, crane) and the hoisting load have been decided. In this situation, the operator specifies information on the installation position of the work machine (hereinafter, simply referred to as "information on the installation position") as the performance information request.

In this variation, the parameter included in the request includes at least the performance information request, the model information of the work machine, the hoisting load information, and the information on the ground strength of the whole work site.

The calculation unit 222 of the server S1 calculates information on the installation position of the work machine specified by the model information on the basis of the parameter included in the request, the acquired specification data, and the like. The calculation unit 222 may calculate the attitude condition of the work machine when the work machine is installed at the calculated installation position.

The server S1 (specifically, response issuance unit 223) includes information on the installation position of the work machine in the response. When the calculation unit 222 has calculated the attitude condition of the work machine, the server S1 includes information on the attitude condition of the work machine in the response. Then, the display assistance control unit 175 of the client terminal T having received this response displays, on the display unit 12, information on the installation position included in the response. When the attitude condition of the work machine is included in the response, the display assistance control unit 175 reflects the acquired attitude condition on the display of the work machine image displayed on the display unit 12.

Operation Example 8

Next, an example of the operation of the BIM assistance system BS will be described with reference to FIGS. 2 and 21 to 23. This operation example is an example in which an image related to the movement route of the hoisting load is displayed on the display unit 12.

In the work plan of the crane, after the start point SP of the hoisting load, the end point FP, the hoisting load, and the model of the work machine are decided, the movement route of the hoisting load is decided. Conventionally, the operator decided the movement route of the hoisting load in consideration of the position of the hoisting load, the attitude of the crane, the load state of the crane, and the surrounding buildings. However, in order to decide the optimum route, it was necessary to examine the movement route in accordance with various situations. Therefore, the method for deciding the movement route carried out conventionally has been low in work efficiency. Therefore, there has been a demand for a method for efficiently obtaining the optimum movement route of the hoisting load in the work plan of the crane.

Figure 21:
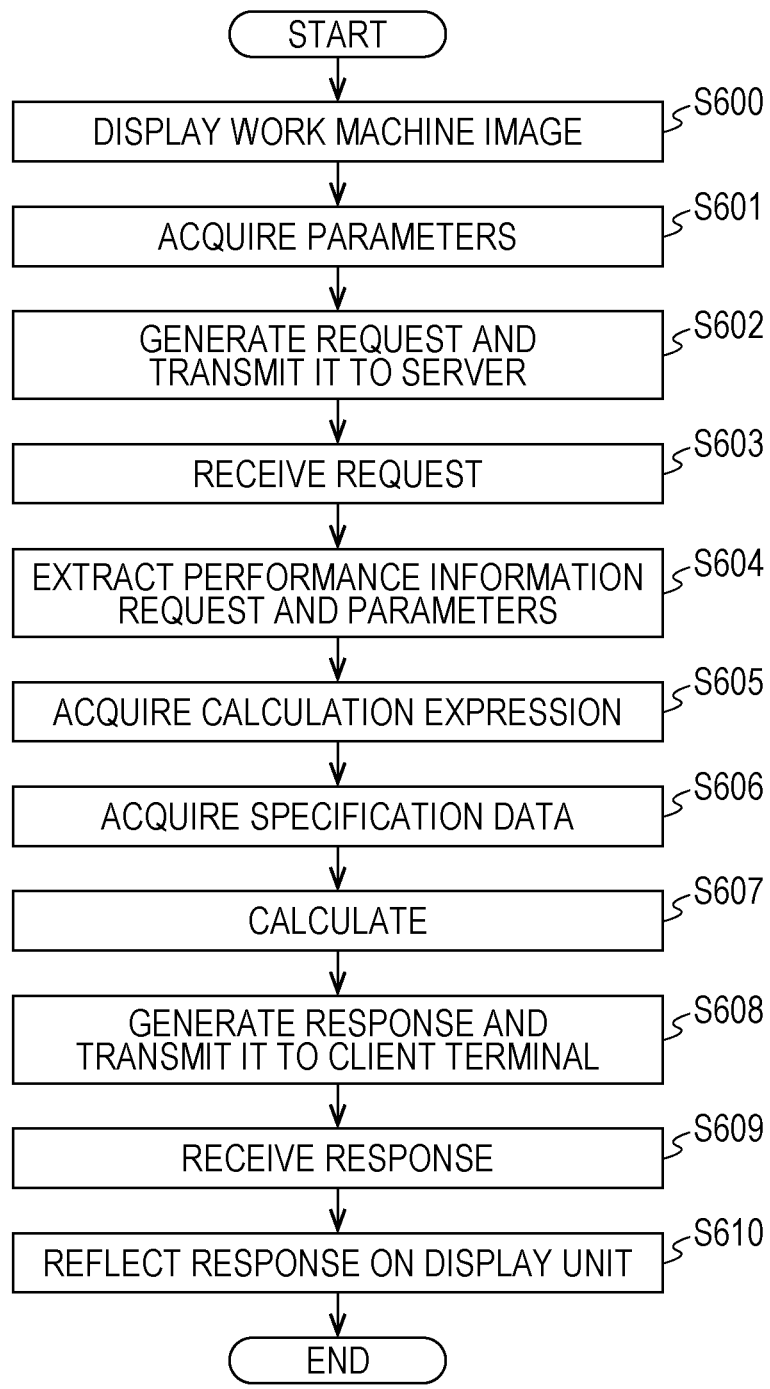
FIG. 21 is a flowchart presenting an example of the operation of the BIM assistance system.

This operation example is carried out in a state where the start point SP of the hoisting load, the end point FP of the hoisting load, the hoisting load, and the model of the work machine have been decided. FIG. 21 is a flowchart presenting the operation of the BIM assistance system BS when the movement route of the hoisting load is displayed on the display unit 12 (see A-10 of Table 2). The operation of the BIM assistance system BS in this operation example will be described below.

Figure 22A:
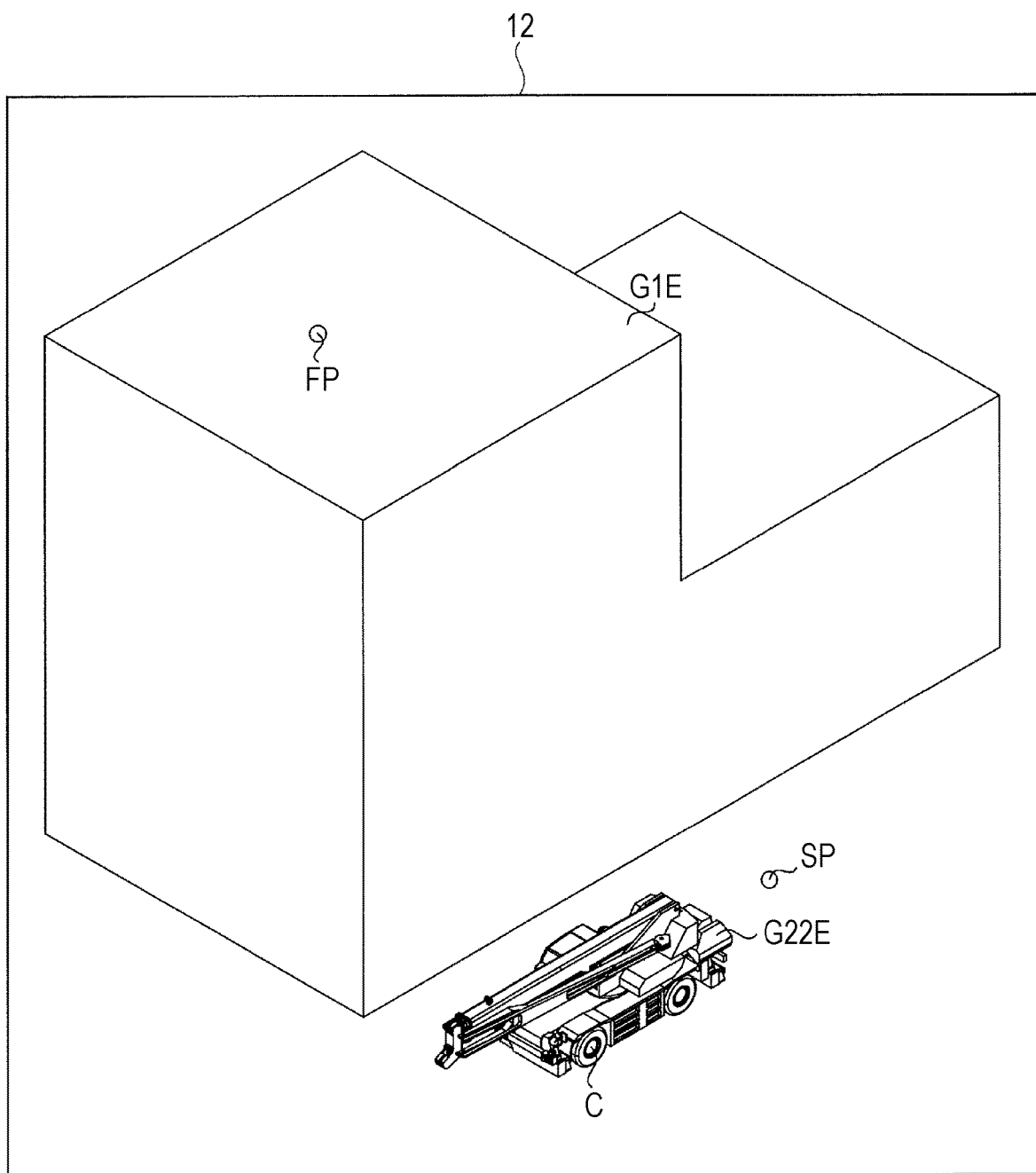
FIG. 22A is a view illustrating an example of an image displayed on the display unit.

In step S600 of FIG. 21, only a building image G1E illustrated in FIG. 22A is displayed on the display unit 12. That is, in step S600, the work machine image is not displayed on the display unit 12. The building image G1E may be an image created by the operator by using the BIM application A or may be an image displayed by reading the information stored in the storage unit 14.

In step S600, in order to display a work machine image G22E of the basis attitude on the display unit 12, the operator inputs a display instruction of the work machine image from the input unit 11. The operation performed by the operator when displaying the work machine image G22E of the basic attitude on the display unit 12 is the same as that in the case of the operation example 1 described above. By step S600, the start point SP of the hoisting load, the end point FP of the hoisting load, the hoisting load, and the model of the work machine have been decided.

Next, in step S601, the operator performs an operation for causing the display unit 12 to display the movement route of the hoisting load. For example, the operator inputs a display request (performance information request) for the movement route of the hoisting load from the input screen popped up on the display unit 12.

In the case of this operation example, the operator inputs the start point SP of the hoisting load and the end point FP of the hoisting load by operating the BIM application A. The operator may input a via point (not illustrated) of the hoisting load.

Note that in step S601, the operator may input a condition (hereinafter referred to as a "priority condition") that is prioritized in the generation of the movement route of the hoisting load executed by the calculation unit 222 in step S607 described later. The priority condition includes, for example, "movement route with the shortest movement distance", "movement route with the least movement time", and "movement route with the lowest fuel consumption".

The operator can also specify "movement route not passing through the prohibited zone" as a priority condition. The prohibited zone is a zone provided with diagonal grids in FIGS. 22B and 22C, for example. Information on the prohibited zone is stored in the BIM application A.

Note that the operation of the operator for displaying the movement route of the hoisting load on the display unit 12 ends in step S601. The subsequent processing is automatically performed between the client terminal T and the servers S1 to S4. That is, in this operation example, when the operator inputs a display request for the movement route of the hoisting load via the BIM application A, the image related to the movement route of the hoisting load is automatically displayed on the display unit 12.

In step S601, when the input unit 11 receives the performance information request, the information acquisition unit 173 acquires, from the BIM control unit 161, the parameters (model information, attitude condition, hoisting load information, work state information, component information, and other information) corresponding to the acquired performance information request. In the case of this operation example, the parameter includes information on the building image G1E as other information. The parameter includes, as hoisting load information, lifting load information, information on the start point of the hoisting load, and information on the end point of the hoisting load. However, the parameter may include information on the shape of the hoisting load as the hoisting load information.

In this operation example, the parameter includes the outrigger overhang width as the attitude condition. However, the parameter may not include the attitude condition. The parameter includes hook information and information on the number of wire hooks as component information. However, the parameter may not include the component information.

The parameter automatically acquired by the information acquisition unit 173 in step S601 is the parameter presented in column B of Table 11 below (parameter presented in 10-B of Table 2). Note that in step S601, when the operator specifies the movement route not passing through the prohibited zone as the priority condition, the parameter includes information on the prohibited zone. The information on the prohibited zone is acquired by the information acquisition unit 173 from the BIM application A in step S601.

TABLE 11

| A (performance information request) | B (parameters) | C (performance information) |
|---|---|---|
| Movement route of hoisting load | Work machine id (model, specification number, or serial number)<br>Outrigger overhang width<br>Hook information<br>Number of wire hooks<br>Lifting load<br>Information on building image<br>Start point of hoisting load<br>End point of hoisting load<br>Counterweight information | Movement route of hoisting load |

Information on the building image is stored in the BIM application A. Therefore, in step S601, the information acquisition unit 173 acquires information on the building image from the BIM application A. Note that the information on the building image acquired by the information acquisition unit 173 in step S601 may be information having been input from the information input unit 77 by the operator.

In step S601, the information acquisition unit 173 sends the acquired information to the request issuance unit 174.

In step S602, the request issuance unit 174 acquires, from the third storage unit 143, the server specifying information (e.g., the URI of the server) for specifying the server corresponding to the work machine image (i.e., the work machine image G22E of FIGS. 22A to 22C) specified by the acquired model information.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information.

The processing of the server S1 having received a request from the client terminal T will be described below.

In step S603, the communication unit 21 receives the request. Then, the communication unit 21 sends the request to the request acquisition unit 221.

In step S604, the request acquisition unit 221 extracts the performance information request and parameter from the acquired request. Then, the request acquisition unit 221 sends the extracted information to the calculation unit 222.

In step S605, the calculation unit 222 acquires, from the storage unit 23, the calculation expression corresponding to the performance information request and model information acquired from the request acquisition unit 221. In this operation example, the calculation expression acquired by the calculation unit 222 is a calculation expression necessary for generating the movement route of the hoisting load.

In step S606, the calculation unit 222 acquires, from the storage unit 23, the specification data corresponding to the work machine specified by the acquired model information.

In step S607, the calculation unit 222 calculates the movement route of the hoisting load on the basis of the parameter acquired from the client terminal T and the calculation expression and specification data acquired from the storage unit 23.

In the case of this operation example, the attitude condition of the work machine has not been decided. Therefore, in step S607, the calculation unit changes the attitude condition of the work machine in the range of the attitude condition that can be taken by the work machine specified by the model information, and calculates the movement route of the hoisting load. The calculation unit 222 calculates the movement route of the hoisting load in which the building image and the crane C and the hoisting load do not interfere with each other on the basis of information on the building image included in the parameter. Note that in a case where a priority condition is input from the operator in step S601, the calculation unit 222 generates a movement route on the basis of the condition specified by the priority condition.

The calculation unit 222 sends the information on the calculated movement route of the hoisting load to the response issuance unit 223.

In step S608, the response issuance unit 223 generates a response including information on the movement route of the hoisting load acquired from the calculation unit 222. Then, the response issuance unit 223 sends the generated response to the communication unit 21. The communication unit 21 transmits the acquired response to the client terminal T.

Next, the processing of the client terminal T having received the response from the server S1 will be described.

In step S609, the communication unit 13 receives a response from the server S1. Then, the communication unit 13 sends the received response to the second control unit 17. The response is sent to the display assistance control unit 175 via the communication control unit 171.

In step S610, the display assistance control unit 175 reflects the calculation result of the server S1 included in the response (in the case of this operation example, information on whether or not the work is possible) on the display of the display unit 12.

Figure 22B:
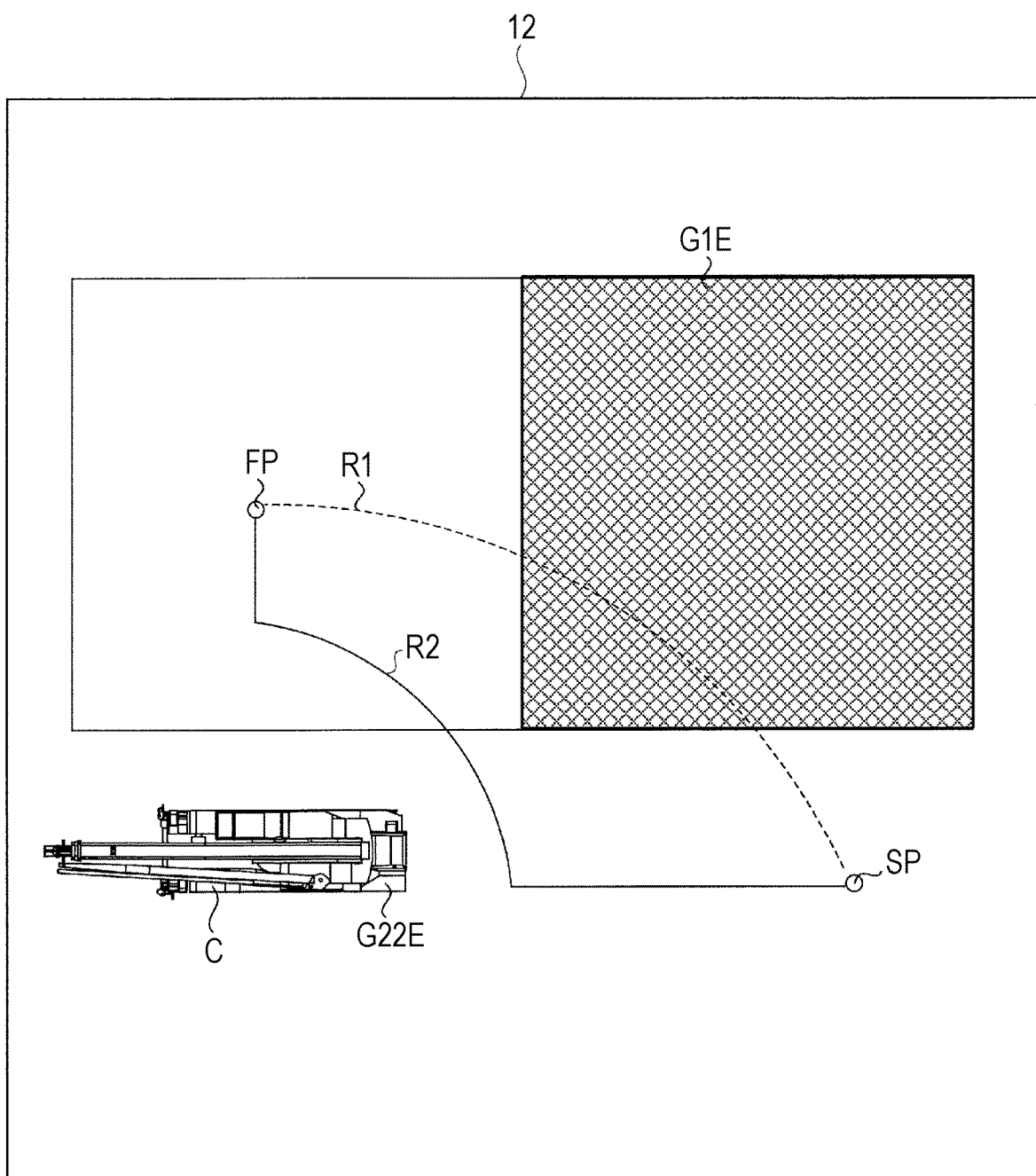
FIG. 22B is a view illustrating an example of an image displayed on the display unit.
Figure 22C:
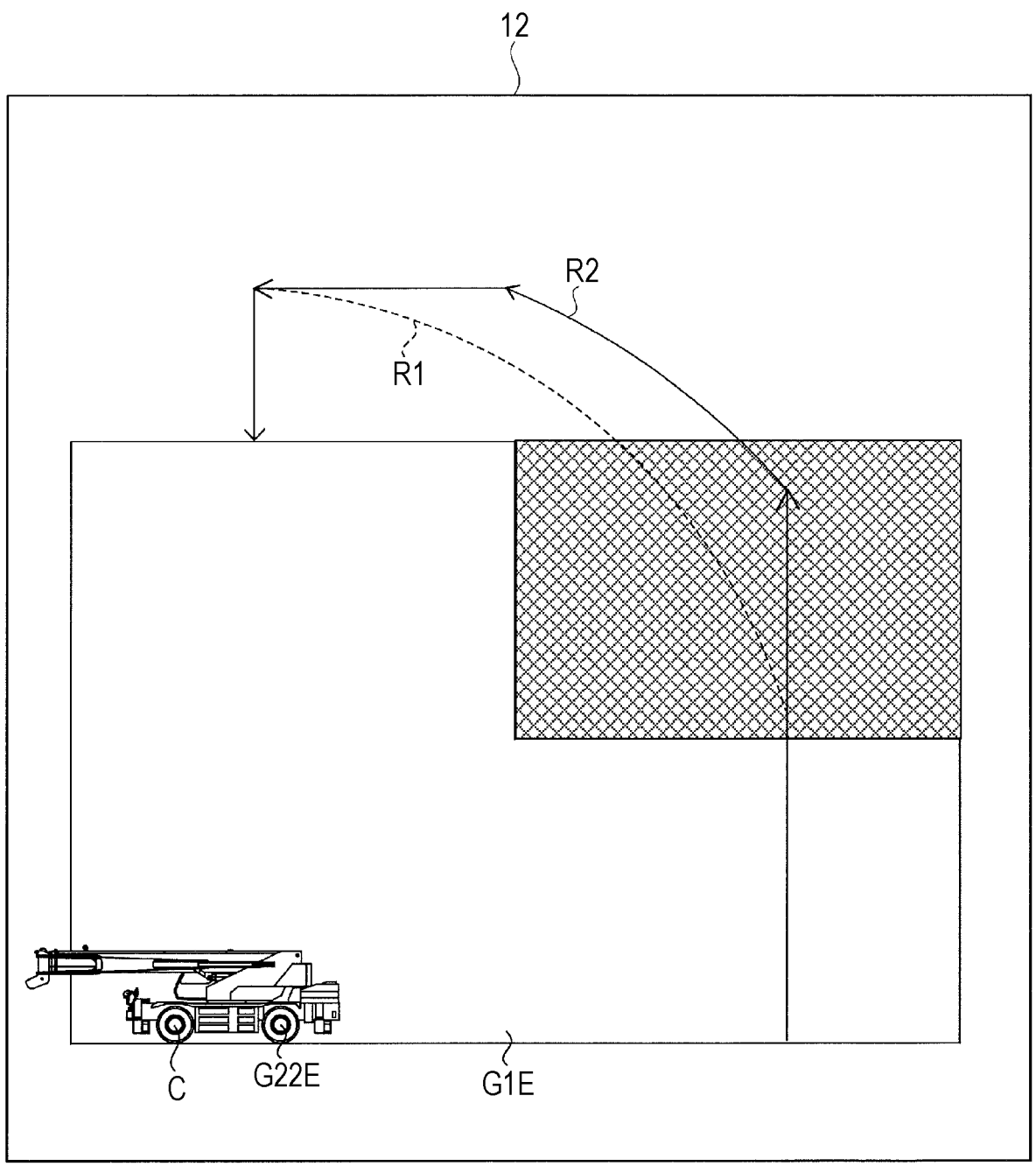
FIG. 22C is a view illustrating an example of an image displayed on the display unit.

FIGS. 22B and 22C present an example of the display mode of the display unit 12 on which an image of the movement route of the hoisting load is presented. An image R1 of the movement route of the hoisting load is an image of the movement route of the hoisting load displayed on the display unit 12 when the "movement route with the shortest movement distance" is specified as the priority condition by the operator. A movement route R2 of the hoisting load is a movement route of the hoisting load displayed on the display unit 12 when the "movement route not passing through the prohibited zone" is specified as the priority condition by the operator.

Note that in the operation example 8 described above, the server S1 may transmit, to the client terminal T, a response including the attitude condition of the work machine corresponding to the calculated movement route of the hoisting load, together with the movement route of the hoisting load.

The server S1 may generate a work plan on the basis of the information on the calculated movement route of the hoisting load. In this case, the server S1 transmits a response including information on the generated work plan to the client terminal T. The work plan includes, for example, the turn angle, hoist angle, type of work (e.g., sling work and unsling work), hoist amount, load factor, and operating radius. FIG. 23 illustrates an example of the work plan.

Note that the work plan may be generated by the BIM application A. In this case, the server S1 transmits a response including information for generating the work plan to the BIM application A. The BIM application A generates a work plan as illustrated in FIG. 23 on the basis of information for generating the acquired work plan.

Action/Effect of Operation Example 8

According to this operation example as described above, if deciding at least the start point SP of the hoisting load, the end point FP of the hoisting load, the hoisting load, and the model of the work machine, the operator can acquire the movement route of the hoisting load satisfying the priority condition. Thus, according to this operation example, the operator can efficiently obtain the movement route of the hoisting load. Therefore, this operation example can significantly improve the work efficiency of the work plan.

Action/Effect of Present Embodiment

As described above, the BIM assistance system BS according to the present embodiment can present detailed information on the work machine to the operator. The operator having received the presentation of such detailed information can make a detailed construction plan in consideration of the work machine.

Second Embodiment

Figure 24:
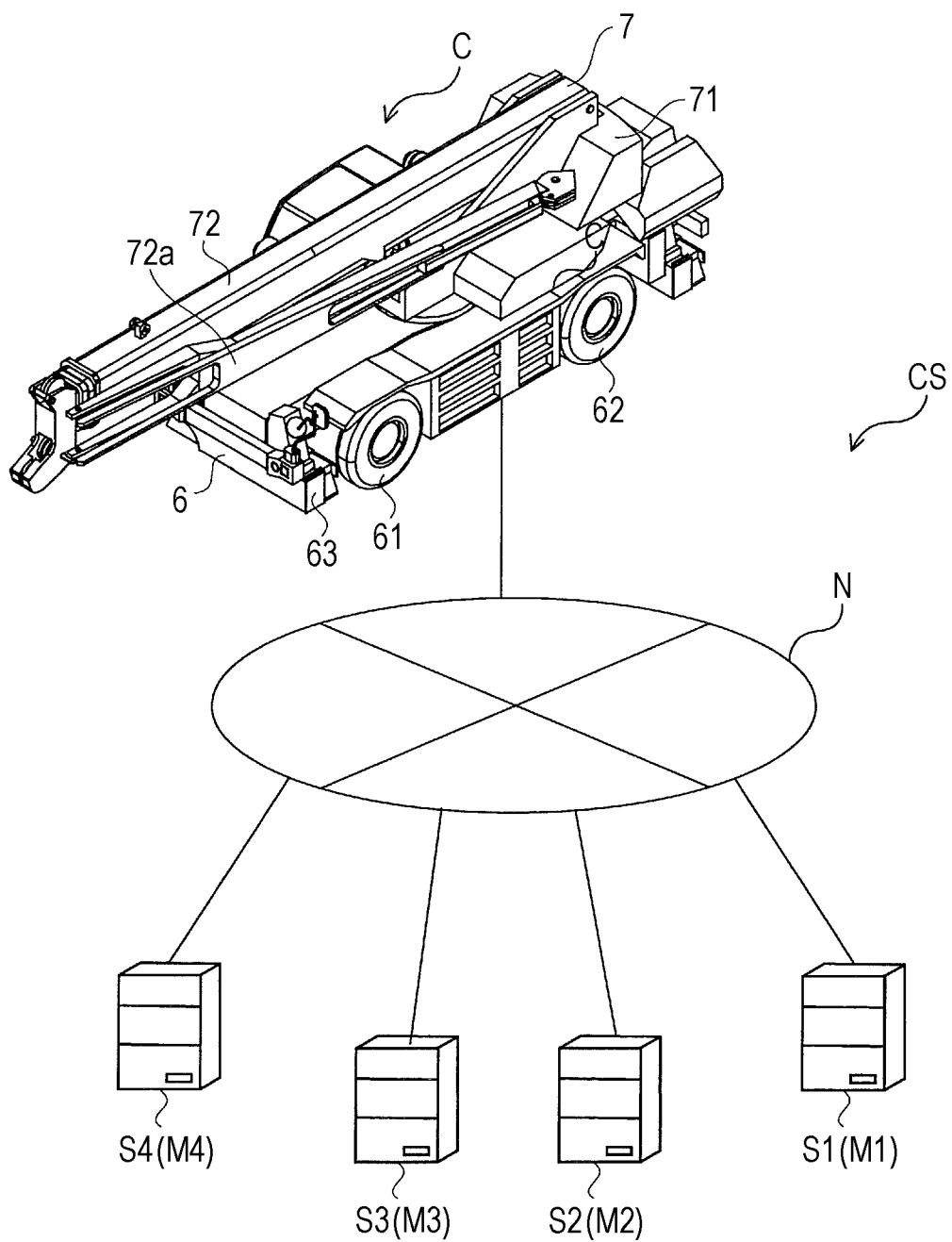
FIG. 24 is a view illustrating a configuration of a crane assistance system according to a second embodiment.
Figure 25:
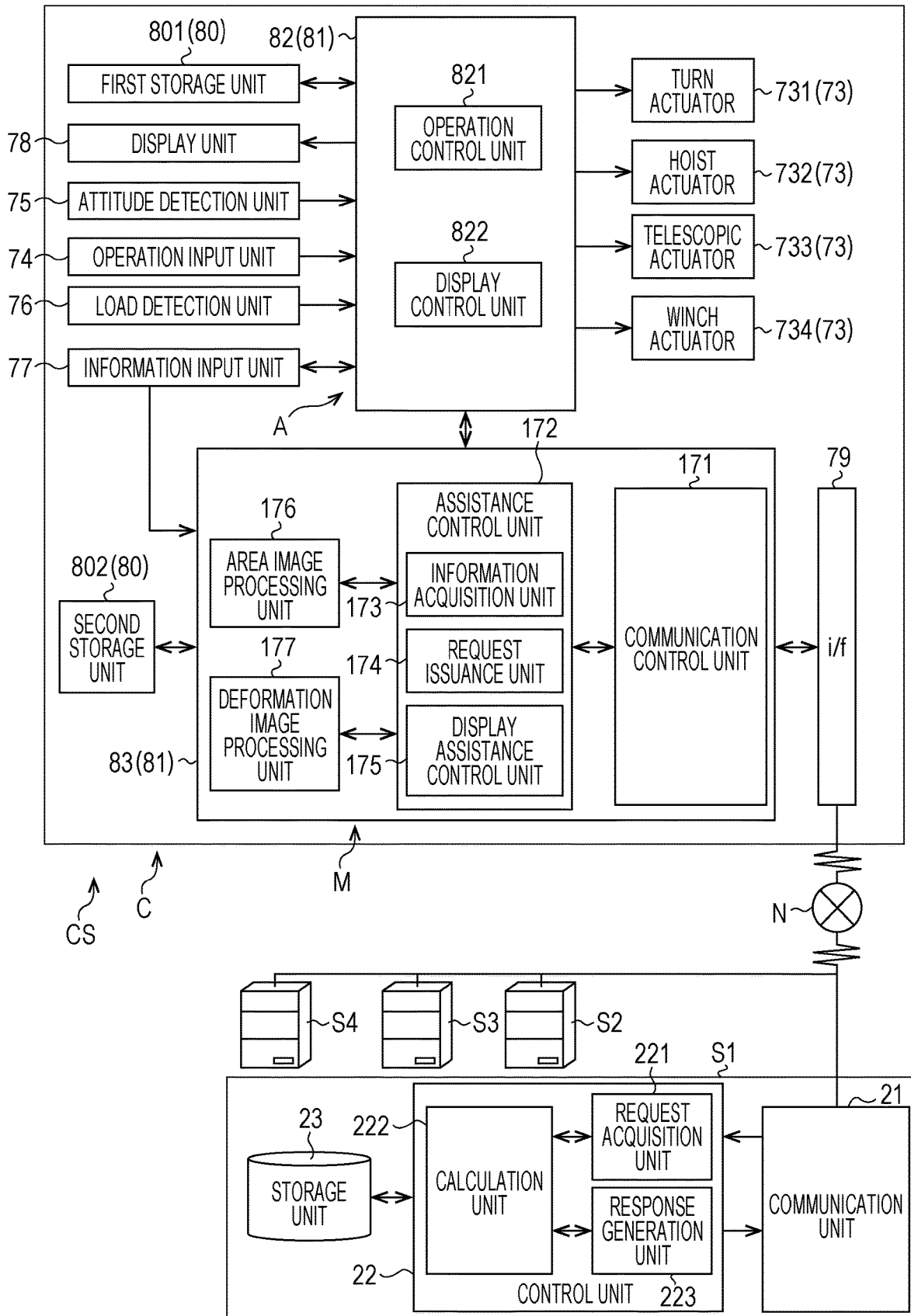
FIG. 25 is a functional block diagram of the crane assistance system according to the second embodiment.

A crane assistance system CS of the second embodiment will be described with reference to FIGS. 24 to 26. FIG. 24 is a view illustrating the configuration of the crane assistance system CS. FIG. 25 is a block diagram illustrating the configuration of the crane assistance system CS. Note that the present embodiment adopts the crane C as an example of the work machine. However, the work machine is not limited to a crane, and may be various work machines. Specifically, the work machine includes a crane, bulldozer, hydraulic excavator, concrete pump vehicle, aerial work vehicle, dump truck, trailer, and a lifter.

<Outline of Crane Assistance System>

The system configuration of the crane assistance system CS according to the present embodiment will be described below with reference to FIGS. 24 and 25. The crane assistance system CS corresponds to an example of a performance information calculation system.

The crane assistance system CS has the crane C and the plurality of servers S1 to S4 (also referred to as a performance information calculation server) as the hardware configuration. Note that the crane assistance system CS of the present embodiment is a system in which the crane C and the servers S1 to S4 are connected via the network N. The number of cranes and servers in the crane assistance system CS is not limited to the illustrated case.

<Crane>

The configuration of the crane C will be described below. The crane C is a mobile crane (e.g., rough terrain crane). However, the crane C is not limited to a mobile crane, and may be various cranes.

As a basic configuration, the crane C has a configuration that a general rough terrain crane has. As a rough concept, the crane C has a travel body 6 and a turn body 7.

Specifically, the travel body 6 has a pair of right and left front tires 61 and rear tires 62. The travel body 6 has an outrigger 63 that is grounded to stabilize when performing a conveyance work of a load.

Specifically, the turn body 7 has a turn table 71, a boom 72, and a jib 72a. The turn table 71 is supported by the travel body 6 in a turnable state. The boom 72 is an expandable and contractable telescopic boom. The boom 72 is supported by the turn table 71 in a hoistable state. Such the boom 72 turns when the turn table 71 rotates about the turn shaft. The jib 72a is supported at the tip of the boom 72 in a used state. The jib 72a is stored on the side of the boom 72 in an unused state (state of the crane C in FIG. 24).

A wire rope (not illustrated) is hung over the boom 72. The turn table 71 is provided with a winch (not illustrated) wound with the wire rope. The wire rope is suspended from the tip of the boom 72 or the jib 72a via a sheave (not illustrated). A hook (not illustrated) is fixed to the tip of the wire rope.

The turn table 71, the boom 72, the jib 72a, the wire rope, and the hook correspond to an example of operated function portions and are driven by an actuator.

The crane C has, as actuators that drive the operated function portion, a turn actuator 731, a hoist actuator 732, a telescopic actuator 733, and a winch actuator 734 (see FIG. 25). Hereinafter, the turn actuator 731, the hoist actuator 732, the telescopic actuator 733, and the winch actuator 734 will be collectively referred to as an actuator 73.

The turn actuator 731 is, for example, a hydraulic motor, and rotates the turn table 71 about the turn shaft. When the turn table 71 rotates, the boom 72 rotates together with the turn table 71. Therefore, the turn actuator 731 may be regarded as an actuator for turning the boom 72.

The hoist actuator 732 is, for example, a hydraulic telescopic cylinder, and raises or lowers the boom 72 in accordance with expansion and contraction of the hoist actuator 732. Therefore, the hoist actuator 732 may be regarded as an actuator for raising or lowering the boom 72.

The telescopic actuator 733 is, for example, a hydraulic telescopic cylinder, and extends or reduces the boom 72 in accordance with expansion and contraction of the telescopic actuator 733. Therefore, the telescopic actuator 733 may be regarded as an actuator for extending or reducing the boom 72.

The winch actuator 734 is, for example, a hydraulic motor, and rotates the winch in a first direction (also referred to as a feed direction.) or a second direction (also referred to as a wind direction.). When the winch rotates, the wire rope is fed or wound with the rotation of the winch. The hook rises or falls in accordance with feeding or winding of the wire rope. Therefore, the winch actuator 734 may be regarded as an actuator for raising or falling the hook.

The crane C includes an operation input unit 74, an attitude detection unit 75, a load detection unit 76, an information input unit 77, a display unit 78, a communication unit 79, a storage unit 80, a control unit 81, and the like.

The operation input unit 74 is, for example, an operation lever provided in the operator cab, and receives an operation input from an operator of the crane C (hereinafter simply referred to as an "operator" in the description of the present embodiment). When receiving an operation input from the operator, the operation input unit 74 outputs an operation signal corresponding to the received operation input to the control unit 81 (specifically, an operation control unit 821 of a first control unit 82). Note that the operation input unit 74 may be provided at an operation terminal connected with the crane C wirelessly or by wire.

The attitude detection unit 75 detects information on the attitude of the crane C. The attitude detection unit 75 sends information on the detected attitude to the control unit 81 (first control unit 82). The information on the attitude is, for example, the hoist angle of the boom, the length of the boom, the turn angle of the boom, the hoist angle of the jib, the length of the jib, the overhang width of the outrigger, and the position of the hook.

The attitude detection unit 75 detects information on the attitude at a predetermined time interval. The attitude detection unit 75 sends the information on the detected attitude to the control unit 81 (first control unit 82) at a predetermined time interval.

The load detection unit 76 detects information on the hoisting load. The load detection unit 76 detects information on the hoisting load at a predetermined time interval. The load detection unit 76 sends the information on the detected hoisting load to the control unit 81 (first control unit 82) at a predetermined time interval.

The information input unit 77 receives input of information from the operator. The information input unit 77 sends the information on the received input to the control unit 81 (first control unit 82 or second control unit 83). An example of the information received by the information input unit 77 will be described below.

The information input unit 77 receives input of a performance information request from the operator. The performance information request includes information specifying performance information of the work machine acquired from the servers S1 to S4 by the crane C. Note that in the present embodiment, the performance information of the work machine specified by the performance information request means the performance information of the crane C.

The display unit 78 displays information. The display unit 78 is, for example, a monitor provided in the operator cab.

The communication unit 79 communicates with the servers S1 to S4 via the network N. For this purpose, the communication unit 79 includes a transmission unit and a reception unit (not illustrated) of information. Communication with the servers S1 to S4 is controlled by the communication control unit 171, for example.

The communication unit 79 transmits a request described later toward the servers S1 to S4, and receives a response to this request from the servers S1 to S4.

The storage unit 80 has a first storage unit 801 and a second storage unit 802. The first storage unit 801 stores model information of the work machine (crane C). The second storage unit 802 stores information specifying the server to send a request. The information specifying the server is also referred to as server specifying information. The second storage unit 802 stores server specifying information in association with the model of the work machine (e.g., crane).

Specifically, the second storage unit 802 stores an address table in which the model information of a plurality of work machines and the server (server specifying information) corresponding to each model information are associated. Note that the first storage unit 801 and the second storage unit 802 are configured by one piece of hardware (main storage device). However, the first storage unit 801 and the second storage unit 802 may be configured by a plurality of pieces of hardware.

The control unit 81 controls the operation of each of the elements 74 to 80 described above to control the overall operation of the crane C. In terms of the function of the crane assistance system CS, the control unit 81 includes the first control unit 82 and the second control unit 83. The basic configuration of the second control unit 83 is the same as that of the second control unit 17 of the first embodiment of the description.

The first control unit 82 corresponds to an example of an operation control unit, and has the operation control unit 821, a display control unit 822, and the like. The first control unit 82 also corresponds to an example of a control unit of an overload prevention device. That is, the first control unit 82 has a function of implementing the function of the overload prevention device.

The operation control unit 821 controls the operation of the actuator 73 on the basis of the operation signal having been output from the operation input unit 74.

The operation control unit 821 controls the operation of the actuator 73 on the basis of the performance information of the work machine acquired from the assistance module M. For example, when having acquired the rated total load corresponding to the attitude condition of the work machine as the performance information of the work machine from the assistance module M, the operation control unit 821 controls the operation of the actuator 73 on the basis of the acquired rated total load.

The display control unit 822 controls the operation of the display unit 78. The display control unit 822 controls the operation of the display unit 78 on the basis of the performance information of the work machine acquired from the assistance module M. For example, when having acquired an area image (see area image G4 of FIG. 10C and area image G4A of FIG. 16E) as performance information of the work machine from the assistance module M, the display control unit 822 may display an image of the work machine, an image of the surrounding of the work machine, and an area image on the display unit 78.

The second control unit 83 has the communication control unit 171, the assistance control unit 172, the area image processing unit 176, the deformation image processing unit 177, and the like. The second control unit 83 implements the function of the assistance module M. The basic configuration of the second control unit 83 is substantially the same as that of the second control unit 17 of the first embodiment of the description, and hence a duplicate description will be omitted. Regarding the configuration of the assistance module M, the description of the assistance module M in the first embodiment may be appropriately incorporated. In FIG. 25, of the elements constituting the assistance module M of the present embodiment, the elements common to the assistance module M of the first embodiment are given the identical reference numerals as the elements of the assistance module M of the first embodiment. Note that of the configuration of the second control unit 83, a configuration different from that of the second control unit 17 of the first embodiment will be described in an operation example described later.

In the case of the present embodiment, the assistance module M operates in cooperation with the first control unit 82 of the crane C. The assistance module M is incorporated (as an add-in) in the first control unit 82. Note that the assistance module M may be incorporated in hardware (e.g., controller, tablet, or personal computer) different from the first control unit 82 as long as the hardware operates in cooperation with the first control unit 82. Such the assistance module M acquires performance information of the work machine from the servers S1 to S4 by using a request-response type communication protocol (e.g., HTTPS protocol and MQTTS protocol).

The performance information of the work machine is similar to that of the above-described first embodiment, and includes, for example, the rated total load, moment load factor, maximum lowering angle of the boom, operating radius, deformation image information of the boom, deformation image information of the jib, work area image information of the work machine, outrigger jack reaction force value, attitude information of the work machine, information on whether or not the work is possible in consideration of the ground strength, and information on the movement route of the hoisting load (see column C of Table 2 below). The performance information includes a determination result of whether or not the work machine can perform a desired work. When the work machine is a crane, the performance information includes information on the movement route of the hoisting load.

The assistance module M acquires the attitude condition of the crane C from the first control unit 82. The assistance module M transmits a request including an attitude condition, a performance information request for specifying performance information of the work machine, and model information of the work machine to the specified server from the servers S1 to S4.

In this case, the assistance module M may specify a server to transmit a request by including server specifying information specifying a server corresponding to the work machine in the request. The server specifying information is the URI of the server, for example.

The assistance module M receives, from the server, a response including performance information specified by the performance information request. Then, the assistance module M sends the received performance information to the first control unit 82.

<Operation Example of Crane Assistance System>

An operation example of the crane assistance system CS will be described below. Note that the basic operation of the crane assistance system CS is substantially the same as that of the operation examples 1 to 8 of the BIM assistance system BS of the first embodiment. An example of a typical operation of the crane assistance system CS will be described below.

Operation Example 1

This operation example corresponds to the operation example 1 of the BIM assistance system BS according to the first embodiment. The processing of this operation example is performed between the crane C and the servers S1 to S4. From this point of view, this operation example is different from the operation example 1 of the first embodiment related to the processing performed between the BIM application A (see FIG. 2) and the servers S1 to S4. That is, in the case of the operation example 1 of the first embodiment, the assistance module M operates in cooperation with the operation control unit of the BIM application A. On the other hand, in the case of this operation example, the assistance module M operates in cooperation with the operation control unit of the crane C. From this point of view, this operation example is different from the operation example 1 of the first embodiment. However, the basic operation of the assistance module M of this operation example is substantially the same as the operation of the assistance module M of the operation example 1 of the first embodiment. Although not described in detail, the description of the operation examples 2 to 8 of the first embodiment may be appropriately incorporated as the description of the operation example of the crane assistance system CS of the present embodiment.

This operation example is carried out when acquiring, from the server, the rated total load for use in the calculation performed by the overload prevention device of the crane C, for example. At the time of work on the crane C, the overload prevention device of the crane C acquires the rated total load in accordance with the attitude of the crane C, and performs processing of determining the safety of the work on the basis of the acquired rated total load and the hoisting load.

Conventionally, the crane C has acquired the rated total load corresponding to the attitude of the crane C on the basis of the rated total load table stored in the storage unit. When the rated total load corresponding to the attitude of the crane C is not included in the rated total load table, the crane C calculated the rated total load by performing interpolation calculation. Since such calculation for calculating the rated total load is constantly performed, a high-performance calculator is mounted on the crane C. The high-performance calculator is expensive, which has been a factor of increase of the manufacturing cost of the crane C.

The rated total load table and the interpolation calculation expression for interpolation calculation are sometimes updated, and the maintenance worker has had to update the rated total load table and the interpolation calculation expression for each work machine. In conveyance work of the hoisting load, a work so-called double hoisting, which is to convey one hoisting load by a plurality of cranes in cooperation, is sometimes performed. When work machines having different rated total load tables and interpolation calculation expressions perform double hoist, there is a possibility that the calculation result by the overload prevention device is different for each work machine, and the work efficiency is reduced.

According to this operation example, since the rated total load is acquired from the server, the crane C does not need to include the rated total load table and interpolation calculation expression. Therefore, update of the rated total load table and interpolation calculation expression is unnecessary. The plurality of cranes C each acquire, from the server, the rated total load calculated on the basis of the common rated total load table and interpolation calculation expression. Therefore, the calculation result by the overload prevention device is not different for each work machine.

Figure 26:
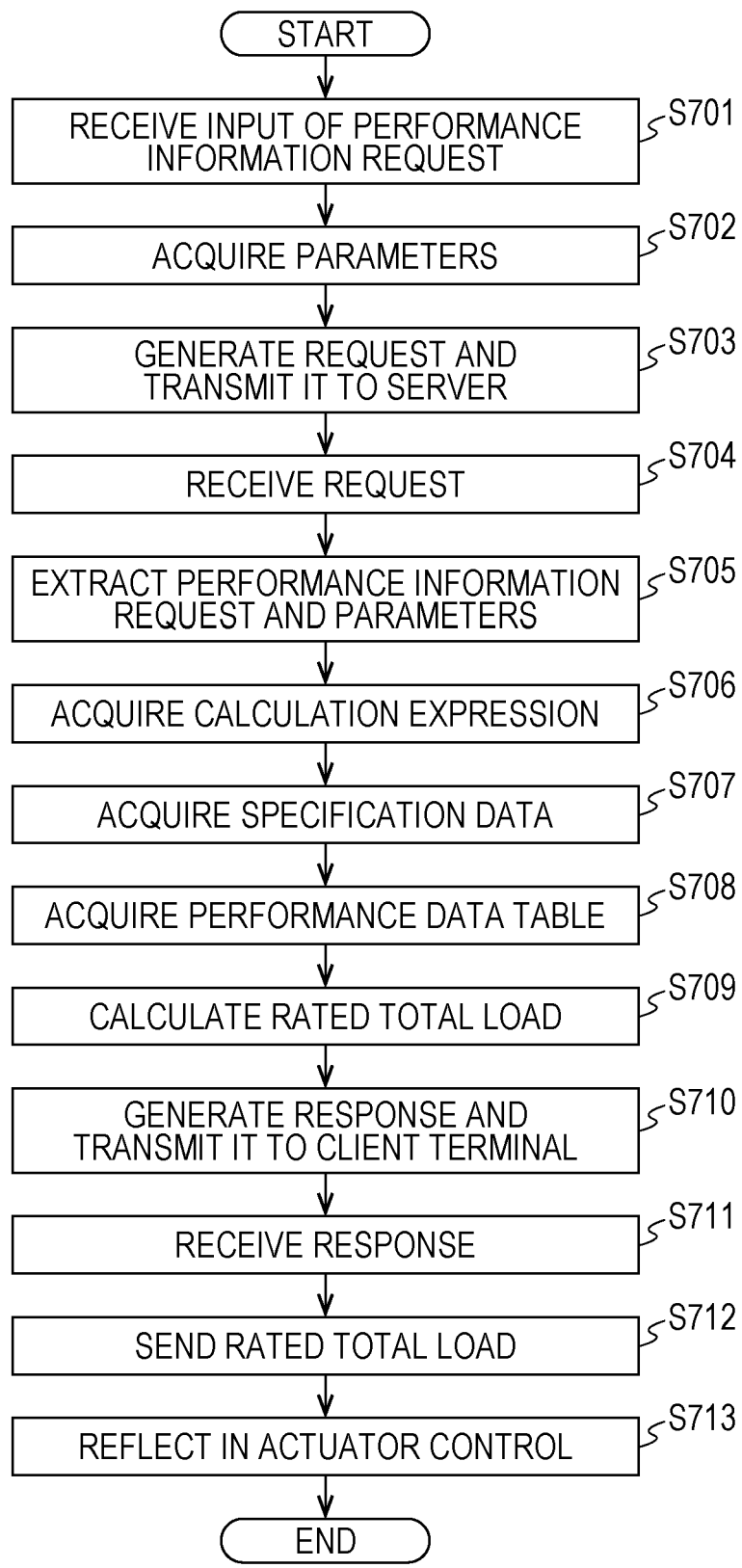
FIG. 26 is a flowchart presenting an example of the operation of the crane assistance system.

FIG. 26 is a flowchart presenting the operation of the crane assistance system CS in the case of displaying the rated total load on the display unit 78 and/or in the case of controlling the operation of the crane C on the basis of the rated total load acquired from the server.

In step S701 of FIG. 26, the operator inputs a performance information request specifying the rated total load (performance information) from the information input unit 77. In other words, the information input unit 77 receives input of a performance information request specifying the rated total load (performance information) from the operator. The information input unit 77 sends information on the performance information request having been input from the operator to the control unit 81. Then, the crane C becomes in a state of transmitting a request for requesting the rated total load to the server S1 at a predetermined time interval.

In step S702, when having acquired the performance information request from the information input unit 77, the information acquisition unit 173 acquires, from the first control unit 82, a parameter corresponding to the acquired performance information request. In step S702, the information acquisition unit 173 is only required to acquire, from the first control unit 82, at least a parameter necessary for the calculation of the performance information specified by the performance information request.

When acquired the performance information request from the information input unit 77, the information acquisition unit 173 continues to acquire the parameter from the first control unit 82 (specifically, operation control unit 821) at a predetermined time interval. In this case, acquisition of the parameter is continued until the signal indicating that the request for the performance information ends (hereinafter simply referred to as an "end signal") is acquired from the information input unit 77.

In other words, when having acquired, from the information input unit 77, a signal indicating that the request for the performance information starts (hereinafter simply referred to as a "start signal"), the information acquisition unit 173 intermittently continues acquisition of the parameter until the end signal is acquired from the information input unit 77. Therefore, the control processing of steps S702 to S713 in this operation example is repeated until the end signal is acquired from the information input unit 77.

For example, if the time interval at which the attitude detection unit 75 detects information on the attitude of the crane C is 10 msec, the time interval at which the information acquisition unit 173 detects the parameter may be equal to or greater than 10 msec, preferably 50 msec to 100 msec.

The parameter automatically acquired by the information acquisition unit 173 in step S702 is the parameter presented in column B of Table 12 below.

TABLE 12

| A (performance information request) | B (parameters) | C (performance information) |
|---|---|---|
| 1 Display request for rated total load | Work machine id (model, specification number, or serial number) Work state (on-tire work and outrigger work) Outrigger overhang width Boom information (type, hoist angle, length, and turn angle) Jib information (type, hoist angle, and jib length) Hook information Number of wire hooks Counterweight information | Rated total load |

The parameter acquired by the information acquisition unit 173 in step S702 is data stored in the first storage unit 801 and data detected by the attitude detection unit 75. In any case, the parameter acquired by the information acquisition unit 173 in step S702 is the data stored in the crane C and the data acquired by the crane C.

In step S703, the request issuance unit 174 acquires, from the second storage unit 802, server specifying information (e.g., URI of the server) for specifying the server corresponding to the model information of the crane C.

Then, the request issuance unit 174 generates a request including the acquired server specifying information, performance information request, and parameters, and sends it to the communication control unit 171. The request is transmitted via the communication unit 13 to the server (e.g., the server S1) specified by the server specifying information.

Note that the request generated in step S703 is in the form of request message of HTTPS protocol. Such request includes the URI, performance information request, and parameter.

The processing of the server S1 having received the request from the crane C will be described below. The operation of the server S1 is the similar to that of the server S1 in the first operation example of the first embodiment described above.

In step S704, the communication unit 21 receives the request. Then, the communication unit 21 sends the request to the request acquisition unit 221.

In step S705, the request acquisition unit 221 extracts the performance information request and parameter from the acquired request. Then, the request acquisition unit 221 sends the extracted information to the calculation unit 222.

In step S706, the calculation unit 222 acquires, from the storage unit 23, the calculation expression corresponding to the performance information request and model information acquired from the request acquisition unit 221. The calculation expression acquired by the calculation unit 222 in step S706 is an interpolation calculation expression for performing the above-described interpolation calculation.

In step S707, the calculation unit 222 acquires, from the storage unit 23, the specification data corresponding to the work machine specified by the acquired model information.

In step S708, the calculation unit 222 acquires, from the storage unit 23, the performance data table corresponding to the attitude condition and/or work state information acquired from the request acquisition unit 221. At this time, the calculation unit 222 may acquire, from the storage unit 23, a plurality of performance data tables corresponding to the acquired attitude condition and/or work state information.

Note that in step S708, the calculation unit 222 may acquire, from the storage unit 23, the performance data table on the basis of the specification data acquired in step S707 together with the attitude condition and/or work state information.

In step S709, the calculation unit 222 calculates the rated total load on the basis of the parameter acquired from the crane C, the calculation expression (interpolation calculation expression) acquired from the storage unit 23, the performance data table, and the specification data.

In step S709, when the calculation unit 222 can directly acquire, from the performance data table, the rated total load corresponding to the parameter included in the request, the calculation expression (interpolation calculation expression) may not be used in step S709. However, if the rated total load corresponding to the parameter included in the request cannot be directly obtained from the performance data table, the calculation unit 222 acquires the rated total load by performing the above-described interpolation calculation using the calculation expression (interpolation calculation expression). Then, the calculation unit 222 sends the calculation result to the response issuance unit 223. Note that the interpolation calculation is a calculation for interpolating values between adjacent data in the performance data table.

In step S710, the response issuance unit 223 generates a response on the basis of the calculation result acquired from the calculation unit 222. Then, the response issuance unit 223 transmits the generated response to the crane C via the communication unit 21.

The above is the processing of the server S1 having received the request from the crane C. Next, the processing of the crane C (assistance module M) having received the response from the server S1 will be described.

In step S711, the communication unit 13 receives a response from the server S1. Then, the communication unit 13 sends the received response to the second control unit 83. The response is sent to the assistance control unit 172 via the communication control unit 171.

In step S712, the assistance control unit 172 analyzes the response acquired from the communication control unit 171, and sends the calculation result (in the case of this operation example, rated total load) of the server S1 included in the response to the first control unit 82.

In step S713, the first control unit 82 (specifically, operation control unit 821) reflects the acquired rated total load to the control of the actuator 73. For example, the first control unit 82 calculates a load factor corresponding to the attitude of the crane C on the basis of the rated total load acquired from the server S1, and limits the operation of the crane C to the dangerous side when the load factor approaches a predetermined value (e.g., 100%). Note that the dangerous side means that the attitude of the crane C changes so that the load factor increases. In contrast, the safe side means that the attitude of the crane C changes so that the load factor decreases.

Addition of Second Embodiment

In step S713, the first control unit 82 (specifically, display assistance control unit 175) may reflect the acquired rated total load on the display of the display unit 78.

In step S702, the information acquisition unit 173 may acquire information on the attitude condition included in the parameter from an attitude detection device (not illustrated) provided outside the crane C. The attitude detection device includes, for example, an imaging unit (e.g., camera) that photographs the crane C, and an image analysis unit that analyzes an image generated by an imaging device to acquire the attitude condition of the crane C. In this case, the attitude detection unit 75 of the crane C may be omitted.

Action/Effect of Present Embodiment

According to the present embodiment having the above configuration, it is not necessary for the crane C to include a high-performance calculator for calculating performance information. Thus, the manufacturing cost of the crane C can be reduced. It is not necessary for the crane C to include a rated total load table and an interpolation calculation expression for calculating performance information. Therefore, the work of updating the rated total load table and the interpolation calculation expression for each crane C becomes unnecessary. Therefore, the maintenance cost for updating can be reduced. Since the cranes C of the same model acquire the rated total load from a common server, the calculation results by the overload prevention device are not different between the cranes C. Therefore, work efficiency and safety can be improved. Furthermore, the server can perform advanced calculations that cannot be performed by the calculator mounted on the work machine, such as calculation related to interference check between the building and work machine composed of 3D-CAD data and point group data, and calculation of information used for emphasis control with another work machine.

Addition

The present invention can take the following aspects.

Aspect A.1

A performance information calculation server including:
a request acquisition unit that acquires a request including an attitude condition that defines an attitude of an image of a work machine, a performance information request that specifies performance information of the work machine, and model information from a terminal on which an image generation application operates;
a storage unit that stores a calculation expression used for calculation of the performance information, and specification data of the work machine;
an calculation unit that executes calculation of the performance information having been specified by the performance information request on the basis of the attitude condition, the performance information request, and the model information that have been acquired from the request, and the calculation expression and the specification data that have been acquired from the storage unit; and
a response presentation unit that presents a response including a result of the calculation to the terminal.

Aspect A.2

The performance information calculation server according to the aspect A.1, wherein
the calculation unit
selects the calculation expression to be used for the calculation on the basis of the performance information request included in the acquired request,
selects the specification data to be used for the calculation on the basis of the model information included in the acquired request, and
executes the calculation on the basis of the attitude condition that has been acquired, and the calculation expression and the specification data that have been selected.

Aspect A.3

The performance information calculation server according to the aspect A.1, wherein
the storage unit stores performance data associated with an attitude condition of the work machine, and
the calculation unit
selects the calculation expression to be used for the calculation on the basis of the performance information request included in the acquired request,
selects the specification data and the performance data to be used for the calculation on the basis of the model information and the attitude condition included in the acquired request, and
executes interpolation calculation for calculating the performance information on the basis of the attitude condition that has been acquired, and the calculation expression, the specification data, and the performance data that have been selected.

Aspect A.4

The performance information calculation server according to the aspect A.1, wherein
the storage unit stores a performance table in which the attitude condition and performance data are associated, and
the calculation unit
selects the calculation expression to be used for the calculation on the basis of the performance information request included in the acquired request,
selects the specification data and the performance table to be used for the calculation on the basis of the model information and the attitude condition included in the acquired request, and
calculates the performance information by executing interpolation calculation for interpolating data between data of the performance table on the basis of the attitude condition that has been acquired, and the calculation expression, the specification data, and the performance table that have been selected.

Aspect A.5

The performance information calculation server according to the aspect A.1, wherein the calculation unit acquires only an attitude condition necessary for the calculation from the request when the request includes an attitude condition unnecessary for the calculation.

Aspect A.6

The performance information calculation server according to the aspect A.1, wherein the request acquisition unit and the response presentation unit communicate with the terminal via an HTTPS protocol.

Aspect A.7

The performance information calculation server according to the aspect A.1, wherein the calculation unit determines whether or not the work machine in the image can carry out a predetermined work in an attitude of the work machine defined by the acquired attitude condition on the basis of the performance information acquired by calculation, and presents a response including a determination result to the terminal.

Aspect A.8

A client terminal that can be selectively connected to the plurality of performance information calculation servers according to the aspect A.1, the client terminal including:
 an input unit that receives selection of a work machine to be displayed on a display unit from among a plurality of work machines;
 a storage unit that stores an address table in which model information of the plurality of work machines and the performance information calculation server corresponding to the model information are associated; and
 a control unit that selects the performance information calculation server corresponding to the work machine having been selected with reference to the address table, sends a request including an attitude condition defining an attitude of the selected work machine to the selected performance information calculation server, and receives a response including performance information of the selected work machine from the performance information calculation server.

Aspect A.9

A method for acquiring performance information that is executed at a terminal that can be selectively connected to the plurality of performance information calculation servers according to the aspect A.1, the method for acquiring performance information, wherein
 the terminal has an address table that associates model information of a plurality of work machines with the performance information calculation server corresponding to the model information, respectively, and
 the method for acquiring performance information includes
 a step of receiving selection of a work machine to be displayed on a display unit,
 a step of selecting the performance information calculation server corresponding to the selected work machine with reference to the address table,
 a step of transmitting a request including an attitude condition defining an attitude of the selected work machine to the selected performance information calculation server, and
 a step of receiving a response including the performance information from the performance information calculation server.

Aspect A.10

A method for providing performance information that is executed by a performance information calculation server, the method for providing performance information, wherein
 the performance information calculation server stores in advance a calculation expression for calculating performance information of a work machine and specification data of the work machine, and
 the method for providing performance information including
 a step of acquiring a request including an attitude condition defining an attitude of a display image of the work machine, a performance information request specifying required performance information, and model information from a terminal on which an image generation application operates,
 a step of executing calculation of the performance information having been specified by the performance information request on the basis of the attitude condition, the performance information request, and the model information that have been acquired from the request, and the calculation expression and the specification data that have been stored, and
 a step of presenting a response including a result of the calculation to the terminal.

Aspect A.11

The method for providing performance information according to the aspect A.10, wherein
 a step of executing the calculation includes
 selecting the calculation expression to be used for the calculation on the basis of the performance information request included in the acquired request,
 selecting specification data to be used for the calculation on the basis of the model information included in the acquired request, and
 executing the calculation on the basis of the attitude condition that has been acquired, and the calculation expression and the specification data that have been selected.

Aspect A.12

The method for providing performance information according to the aspect A.10, wherein
 the performance information calculation server stores performance data associated with an attitude condition of the work machine, and
 a step of executing the calculation includes
 selecting the calculation expression to be used for the calculation on the basis of the performance information request included in the acquired request,
 selecting the specification data and the performance data to be used for the calculation on the basis of the model information and the attitude condition included in the acquired request, and
 executing an interpolation calculation for calculating the performance information on the basis of the attitude condition that has been acquired, and the calculation expression, the specification data, and the performance data that have been selected.

Aspect A.13

The method for providing performance information according to the aspect A.10, wherein
the performance information calculation server stores a performance table in which an attitude condition of the work machine and performance data are associated, and
a step of executing the calculation includes
selecting the calculation expression to be used for the calculation on the basis of the performance information request included in the acquired request,
selecting the specification data and the performance table to be used for the calculation on the basis of the model information and the attitude condition included in the acquired request, and
calculating the performance information by executing an interpolation calculation for interpolating data between data of the performance table on the basis of the attitude condition that has been acquired, and the calculation expression, the specification data, and the performance table that have been selected.

Aspect A.14

The method for providing performance information according to the aspect A.10, wherein a communication protocol used in a step of acquiring the request from the terminal and a step of presenting the response to the terminal is an HTTPS protocol.

The present invention can further take the following aspects.

Aspect B.1

An image generation application assistance module that operates in cooperation with an image generation application that generates an image of a work machine, the image generation application assistance module including:
an attitude condition acquisition unit that acquires an attitude condition defining an attitude of the work machine in the image;
a performance information acquisition unit that transmits a request including the acquired attitude condition, a performance information request for specifying performance information of the work machine, and model information of the work machine to a performance information calculation server, and receives a response including the performance information having been specified by the performance information request from the performance information calculation server; and
a drawing assistance unit that reflects the received performance information on an image to be displayed.

Aspect B.2

The image generation application assistance module according to the aspect B.1, wherein
the attitude condition acquisition unit acquires only the attitude condition necessary for calculation of the performance information to be specified by the performance information request, and
the performance information acquisition unit transmits a request including an attitude condition necessary for the calculation to the performance information calculation server.

Aspect B.3

The image generation application assistance module according to the aspect B.1, wherein
the attitude condition acquisition unit acquires a predetermined type of the attitude condition regardless of the performance information to be specified by the performance information request, and
the performance information acquisition unit transmits a request including the acquired attitude condition to the performance information calculation server.

Aspect B.4

The image generation application assistance module according to the aspect B.1, wherein the performance information acquisition unit acquires the attitude condition, the performance information request, and the model information from the image generation application on the basis of an operation input by an operator, and generates the request.

Aspect B.5

The image generation application assistance module according to the aspect B.1, wherein
the performance information acquisition unit receives, from the performance information calculation server, a response including a determination result as to whether or not the work machine having an attitude defined by the attitude condition included in the request can carry out a predetermined work, and
the drawing assistance unit displays, on a display unit, information on the determination result.

Aspect B.6

The image generation application assistance module according to the aspect B.1 further including:
an address table in which model information of the plurality of work machines and the performance information calculation server corresponding to the model information are associated, wherein
the performance information acquisition unit selects the performance information calculation server corresponding to the model information included in the request with reference to the address table, and acquires the response including the performance information having been specified in the performance information request from the selected performance information calculation server.

Aspect B.7

An image generation application including
an image generation module that generates an image of a work machine;
an attitude condition acquisition unit that acquires an attitude condition defining an attitude of the work machine in the image;
a performance information acquisition unit that transmits a request including the acquired attitude condition, a performance information request for specifying performance information of the work machine, and model information to a performance information calculation server, and receives a response including the performance information having been specified by the performance information request from the performance information calculation server; and a drawing assistance unit that reflects the received performance information on an image to be displayed or displays the received performance information on a display unit.

Aspect B.8

The image generation application according to the aspect B.7, wherein
the attitude condition acquisition unit acquires only the attitude condition necessary for calculation of the performance information to be specified by the performance information request, and
the performance information acquisition unit transmits a request including an attitude condition necessary for the calculation to the performance information calculation server.

Aspect B.9

The image generation application according to the aspect B.7, wherein
the attitude condition acquisition unit acquires a predetermined type of the attitude condition regardless of the performance information to be specified by the performance information request, and
the performance information acquisition unit transmits a request including the acquired attitude condition to the performance information calculation server.

Aspect B.10

The image generation application according to the aspect B.7, wherein the performance information acquisition unit acquires the attitude condition, the performance information request, and the model information from the image generation application on the basis of an operation input by an operator, and generates the request.

Aspect B.11

The image generation application according to the aspect B.7, wherein
the performance information acquisition unit receives, from the performance information calculation server, a response including a determination result as to whether or not the work machine having an attitude defined by the attitude condition included in the request can carry out a predetermined work, and
the drawing assistance unit displays, on a display unit, whether or not the carrying out is possible.

Aspect B.12

The image generation application according to the aspect B.7 further including:
an address table in which model information of the plurality of work machines and the performance information calculation server corresponding to the model information are associated, wherein
the performance information acquisition unit selects the performance information calculation server corresponding to the model information included in the request with reference to the address table, and acquires the response including the performance information having been specified in the performance information request from the selected performance information calculation server.

Aspect C.1

A performance information calculation system including:
a terminal on which an image generation application that generates an image of a work machine operates, and a performance information calculation server that provides the image generation application with performance information of the work machine, wherein
the terminal
transmits a request including an attitude condition that defines an attitude of a work machine in the image generated by the image generation application, a performance information request for specifying the performance information, and model information to the performance information calculation server, and
the performance information calculation server
stores a calculation expression for calculating the performance information, and specification data of the work machine and
calculates the performance information having been specified by the performance information request by using the attitude condition, the performance information request, and the model information that are included in the acquired request, and the calculation expression and the specification data that have been stored, and transmits a response including a calculation result to the terminal.

Aspect C.2

The performance information calculation system according to the aspect C.1, wherein
the performance information calculation server stores performance data associated with an attitude condition of the work machine,
selects a calculation expression to be used for the calculation on the basis of the performance information request included in the acquired request, and
selects the specification data and the performance data used for the calculation on the basis of the model information and the attitude condition included in the acquired request, and executes interpolation calculation for calculating the performance information.

Aspect C.3

A method for providing performance information that is executed by a performance information calculation system including a terminal on which an image generation application that generates an image of a work machine operates, and a performance information calculation server that calculates performance information of the work machine, the method for providing performance information, wherein
the terminal executes
processing of causing a display unit to display an image of the work machine,
processing of acquiring an attitude condition of an image of the work machine, processing of transmitting a request including a performance information request specifying the performance information, the acquired attitude condition, and model information of the work machine to a performance information calculation server, and processing of receiving a response including the performance information having been specified by the performance information request from the performance information calculation server, and the performance information calculation server executes processing of calculating the performance information having been specified by the performance information request on the basis of the performance information request, the attitude condition, and the model information that are included in the received request, and a calculation expression stored in advance and specification data of the work machine, and processing of transmitting a response including a calculation result to the terminal.

Aspect C.4

The performance information calculation system according to the aspect C.1, wherein the performance information calculation server stores performance data associated with an attitude condition of the work machine, and the performance information calculation server selecting a calculation expression to be used for the calculation on the basis of the performance information request included in the acquired request in processing of calculating the performance information, selecting the specification data and the performance data to be used for the calculation on the basis of the model information and the attitude condition included in the acquired request, and executes an interpolation calculation for calculating the performance information.

Aspect D.1

An image generation application assistance module that operates in cooperation with an image generation application that generates an image of a work machine, the image generation application assistance module including:

an attitude condition acquisition unit that acquires an attitude condition defining an attitude of a work machine in the image;

a performance information acquisition unit that transmits a request including the acquired attitude condition, a performance information request for specifying performance information of the work machine, and model information of the work machine to a performance information calculation server, and receives a response including the performance information having been specified by the performance information request from the performance information calculation server; and a deformation image generation unit that generates a deformation image related to an image of the work machine on the basis of the received performance information.

Aspect D.2

The image generation application assistance module according to the aspect D.1, wherein the deformation image generation unit generates, as the deformation image, an image in which an arm of a work machine in the image is deformed.

Aspect D.3

The image generation application assistance module according to the aspect D.2 further including a notification unit that notifies a warning when the deformation image interferes with an image of another object.

Aspect D.4

The image generation application assistance module according to the aspect D.1, wherein the deformation image generation unit generates, as the deformation image, an image indicating the work machine or a movable area of the work machine including a hoisting load.

Aspect D.5

The image generation application assistance module according to the aspect D.4 further including a notification unit that notifies a warning when the deformation image interferes with an image of another object.

INDUSTRIAL APPLICABILITY

The present invention can be preferably used for design and work planning of a building in consideration of the work of a work machine such as a crane.

REFERENCE SIGNS LIST

BS BIM assistance system
A BIM application
M Assistance module
M1 to M4 Manufacturer
SP Start point
FP End point
C Crane
R1, R2 Image of movement route of hoisting load
T Client terminal
11 Input unit
12 Display unit
13 Communication unit
14 Storage unit
141 First storage unit
142 Second storage unit
143 Third storage unit
15 Control unit
16 First control unit
161 BIM control unit
162 Display control unit
17 Second control unit
171 Communication control unit
172 Assistance control unit
173 Information acquisition unit
174 Request issuance unit
175 Display assistance control unit
176 Area image processing unit
177 Deformation image processing unit
G1, G1A, G1B, G1C, G1D, G1E Building image
G2, G21, G2A, G21A, G2B, G21C, G22C, G22D Work machine image
G21D, G21E Work machine image
G3 Notification image G4, G4A Area image
G5, G5A Deformation image
G6, G6A Work site image
G72 Building
G73 Fence
G74 Outdoor unit
G75 Power pole
G76 Tree
G77 Opposite lane
G78 Steel structure
G79, G79A, G79B Image of boom
G79a Image of base end side boom
G79b, G79c Image of intermediate boom
G79d Image of tip end side boom
G80 Movable range of hoisting load
S1, S2, S3, S4 Server
21 Communication unit
22 Control unit
221 Request acquisition unit
222 Calculation unit
223 Response issuance unit
23 Storage unit
24 Performance data table
31 Request
32 Server specifying information
33 Performance information request
34 Parameter
35 Calculation expression
36 Specification data
37 Performance information
38 Response
4 Toolbar
41a, 41b Icon
42 Crane selection screen
42a Mode selection section
43 Condition selection section
43a First selection section
43b Second selection section
43c Third selection section
43d Fourth selection section
43e Fifth selection section
43f Sixth selection section
43g Seventh selection section
43h Eighth selection section
43i Ninth selection section
44 List display section
45 Crane adjustment screen
46 Attitude adjustment section
46a First adjustment section
46b Second adjustment section
46c Third adjustment section
46d Fourth adjustment section
46e First input section
46f Second input section
46g Third input section
46h Fourth input section
6 Travel body
61 Front tire
62 Rear tire
63 Outrigger
7 Turn body
71 Turn table
72 Boom
72a Jib
73 Actuator
731 Turn actuator
732 Hoist actuator
733 Telescopic actuator
734 Winch actuator
74 Operation input unit
75 Attitude detection unit
76 Load detection unit
77 Information input unit
78 Display unit
79 Communication unit
80 Storage unit
801 First storage unit
802 Second storage unit
81 Control unit
82 First control unit
821 Operation control unit
822 Display control unit
83 Second control unit
N Network
1001, 2001 Processor
1002 Input device
1003 Output device
1004, 2002 Memory
1005, 2003 Storage
1006, 2004 Communication interface
1007, 2005 Power supply circuit
1008, 2006 Bus

The invention claimed is:

1. A performance information system comprising:
a performance information server including:
a processor configured to acquire a request, the request including model information of a work machine and a performance information request that specifies performance information of the work machine; and
a storage that stores specification data of the work machine in association with a model of a work machine; and
a client terminal,
wherein the processor is further configured to:
calculate performance information of the work machine on a basis of the model information included in the request and the specification data corresponding to the model information; and
generate a response including the performance information, the performance information request including a request for a deformation image of a work machine,
wherein the storage stores an image calculation expression for calculating numerical data used for display of the deformation image of the work machine,
wherein the processor is further configured to generate the response by calculating the numerical data for generating the deformation image interfering with another image of an object different than the work machine, based on the image calculation expression stored in the storage,
wherein the deformation image is different from a work machine image of the work machine specified by the model information and for which the performance information is not reflected, and
wherein the client terminal includes a graphical computer display displaying an image of a scene including the work machine image with the another image the client terminal changes the work machine image to the deformation image generated based on the numerical data, the image of the scene is displayed on the graphical computer display including the deformation image interfering with the another image, and information indicating that the deformation image interferes with the another image is displayed on the graphical computer display based on the deformation image interfering with the another image.

2. The performance information system according to claim 1, wherein
the storage stores the specification data further including performance information of the work machine in association with a model of the work machine, and
the processor is further configured to acquire, from the storage, performance information of the work machine specified by the model information included in the request.

3. The performance information system according to claim 2, wherein
the processor is further configured to acquire the request further including an attitude condition defining an attitude of the work machine,
the storage stores the specification data further including performance information corresponding to an attitude condition of the work machine, and
the processor is further configured to acquire, from the storage, the model information included in the request and performance information of the work machine specified by the attitude condition.

4. The performance information system according to claim 3, wherein
the storage stores a performance table in which model information of the work machine, the attitude condition, and the performance information are associated, and
the processor is further configured to execute a calculation that interpolates performance data between adjacent data in the performance table.

5. The performance information server system according to claim 1, wherein
the processor is further configured to acquire the request further including an attitude condition defining an attitude of the work machine,
the storage stores a calculation expression for calculating performance information in accordance with an attitude condition of the work machine in association with a model of the work machine, and
the processor is further configured to calculate the performance information on a basis of the calculation expression corresponding to the model information, and the specification data and the attitude condition corresponding to the model information.

6. The performance information system according to claim 5, wherein the storage stores the calculation expression in association with required performance information.

7. The performance information system according to claim 6, wherein the storage stores at least one calculation expression of a calculation expression for calculating a rated total load, a calculation expression for calculating a moment load factor, a calculation expression for calculating a boom maximum lowering angle, and a calculation expression for calculating an operating radius.

8. The performance information system according to claim 5, wherein the processor is further configured to:
select the calculation expression on a basis of the performance information request included in the request, and
select the specification data on a basis of the model information included in the request.

9. The performance information system according to claim 1, wherein the processor is further configured to:
acquire the request further including work information indicating a work scheduled to be executed by the work machine;
determine whether or not execution of the work by the work machine is possible on a basis of the work information and the acquired performance information; and
present a response including a result of the determination.

10. The performance information system according to claim 5, wherein
the processor is further configured to present the response including the numerical data.

11. A client terminal comprising:
a graphical computer display;
a processor configured to receive selection of a work machine to be displayed on the graphical computer display from among a plurality of work machines; and
a storage that stores an address table in which model information of the plurality of work machines and a performance information server corresponding to the model information are associated,
wherein the processor is further configured to:
select the performance information server corresponding to the work machine having been selected with reference to the address table;
send a request including a performance information request specifying model information of the work machine having been selected and performance information of the work machine to a performance information server having been selected; and
receive a response including the performance information specified by the performance information request from the performance information server, the performance information request being a request for generating a deformation image of a work machine interfering with another image of an object different than the work machine,
wherein the response includes numerical data for displaying the deformation image, the response being generated by the performance information server by calculating the numerical data based on an image calculation expression stored in a storage of the performance information server,
wherein the deformation image is different from a work machine image specified by the model information and for which the performance information is not reflected,
wherein the processor is further configured to change the work machine image displayed on the graphical computer display to the deformation image based on receiving the response, and
wherein the graphical computer display displays an image of a scene including the deformation image interfering with the another image, and displays information indicating that the deformation image interferes with the another image based on the deformation image interfering with the another image.

12. A work machine comprising:
a graphical computer display;
a storage that stores an address table, in which model information of the work machine is associated with a performance information server corresponding to the model information; and
a processor configured to:
select, with reference to the address table and from a plurality of performance information servers, the performance information server corresponding to the work machine;

send a request including a performance information request specifying model information of the work machine having been selected and performance information of the work machine to the performance information server having been selected; and receive a response including the performance information specified by the performance information request from the performance information server, the performance information request being a request for a deformation image of the work machine, wherein the response includes numerical data for generating the deformation image interfering with another image of an object different than the work machine, the response being generated by the performance information server by calculating the numerical data based on an image calculation expression stored in a storage of the performance information server, wherein the deformation image is different from a work machine image specified by the model information and for which the performance information is not reflected, and wherein the processor is further configured to:
initiate display, on the graphical computer display, of an image of a scene including the work machine image with the another image;
change the work machine image to the deformation image based on receiving the response;
initiate display, on the graphical computer display, the image of the scene including the deformation image interfering with the another image; and
initiate display, on the graphical computer display, of information indicating that the deformation image interferes with the another image based on the deformation image interfering with the another image.

13. A method for acquiring performance information executed in a terminal, the method comprising:
receiving selection of a work machine to be displayed on a graphical computer display, the terminal having an address table in which model information of a work machine is associated with a performance information server corresponding to the model information;
selecting, from a plurality of performance information servers, the performance information server corresponding to the work machine having been selected with reference to the address table;
transmitting a request including a performance information request specifying model information of the work machine having been selected and performance information of the work machine to the performance information server having been selected;
receiving a response including the performance information specified by the performance information request included in the request from the performance information server, the performance information request being a request for a deformation image of a work machine,
wherein the response includes numerical data for generating the deformation image interfering with another image of an object different than the work machine, the response being generated by the performance information server by calculating the numerical data based on an image calculation expression stored in a storage of the performance information server, and
wherein the deformation image is different from a work machine image specified by the model information and for which the performance information is not reflected;

displaying, on the graphical computer display, an image of a scene including the work machine image with the another image;
changing the work machine image to the deformation image based on receiving the response;
displaying, on the graphical computer display, the including the deformation image interfering with the another image; and
displaying, on the graphical computer display, information indicating that the deformation image interferes with the another image based on the deformation image interfering with the another image.

14. A method for providing performance information executed in a performance information system, the method comprising:
acquiring, by a performance information server, a request including a performance information request specifying model information of a work machine and performance information of a work machine from a work machine or a terminal on which an image generation application operates, a storage of the performance information server storing specification data associated with a model of the work machine;
executing, by the performance information server, a calculation of the performance information having been specified by the performance information request on a basis of the model information and the performance information request acquired from the request and the specification data corresponding to the model information; and
generating, by the performance information server, a response including the performance information, the performance information request including a request for a deformation image of a work machine,
wherein the storage stores an image calculation expression for calculating numerical data used for display of the deformation image of the work machine,
wherein the response is generated by calculating the numerical data for generating the deformation image interfering with another image of an object different than the work machine, based on the image calculation expression stored in the storage, and
wherein the deformation image is different from a work machine image of the work machine specified by the model information and for which the performance information is not reflected;
displaying, by a graphical computer display included in a client terminal, an image of a scene including the work machine image and another image are;
changing, by the client terminal, the work machine image to the deformation image generated based on the numerical data;
displaying, by the graphical computer display, the image of the scene including the deformation image interfering with the another image, and
displaying, by the graphical computer display, information indicating that the deformation image interferes with the another image is displayed on the graphical computer display based on the deformation image interfering with the another image.

15. The method for providing performance information according to claim 14, wherein
the performance information server stores a calculation expression for calculating the performance information having been specified by the performance information request, the executing of the calculation includes
- selecting the calculation expression on a basis of the performance information request included in the acquired request,
- selecting the specification data on a basis of the model information included in the acquired request, and
- calculating the performance information having been specified by the performance information request on a basis of the calculation expression and the specification data that have been selected.

16. The method for providing performance information according to claim 15, wherein
- the performance information server stores a performance table in which model information, an attitude condition, and performance information of the work machine are associated, and an interpolation calculation expression corresponding to the performance information,
- the acquiring of the request includes acquiring the request further including an attitude condition of the work machine, and
- the executing of the calculation includes
  - selecting the interpolation calculation expression and the performance table on a basis of the performance information request included in the acquired request,
  - selecting the specification data on a basis of the model information included in the acquired request, and
  - calculating the performance information by executing an interpolation calculation for interpolating data between data of the performance table on a basis of the attitude condition included in the acquired request, the selected interpolation calculation expression, the selected specification data, and the selected performance table.

17. The method for providing performance information according to claim 16, wherein a communication protocol used in the acquiring of the request from the terminal and the presenting of the response to the terminal is an HTTPS protocol.

* * * * *